United States Patent
Dodman et al.

(10) Patent No.: US 8,469,381 B2
(45) Date of Patent: Jun. 25, 2013

(54) BICYCLE

(75) Inventors: Christopher P. Dodman, Basel (CH);
Erik Preston Eagleman, Basel (CH);
Zachary David Krapfl, Paonia, CO (US)

(73) Assignee: Cycling Sports Group, Inc., Bethel, CT (US)

( * ) Notice: Subject to any disclaimer, the term of this patent is extended or adjusted under 35 U.S.C. 154(b) by 0 days.

(21) Appl. No.: 13/217,660

(22) Filed: Aug. 25, 2011

(65) Prior Publication Data
US 2012/0049483 A1  Mar. 1, 2012

Related U.S. Application Data

(60) Provisional application No. 61/377,194, filed on Aug. 26, 2010.

(51) Int. Cl.
*B62K 3/02* (2006.01)

(52) U.S. Cl.
USPC ...................................... 280/281.1

(58) Field of Classification Search
USPC .............. 280/281.1; 180/207, 220, 205, 65.1, 180/206.1, 206.4, 207.1, 207.3; 475/149, 475/323, 324
See application file for complete search history.

(56) References Cited

U.S. PATENT DOCUMENTS

| | | | |
|---|---|---|---|
| 491,578 A * | 2/1893 | Mercer | 248/371 |
| 3,921,745 A | 11/1975 | McCulloch et al. | |
| 4,923,203 A * | 5/1990 | Trimble et al. | 280/288.3 |
| 5,370,200 A * | 12/1994 | Takata | 180/206.4 |
| 5,433,284 A | 7/1995 | Chou | |
| 5,618,052 A * | 4/1997 | Rendall | 280/288.4 |
| 5,788,007 A | 8/1998 | Miekka | |
| 5,789,898 A * | 8/1998 | Suzuki et al. | 320/104 |
| 5,975,551 A * | 11/1999 | Montague et al. | 280/287 |
| 6,016,882 A * | 1/2000 | Ishikawa | 180/207.3 |
| 6,131,683 A | 10/2000 | Wada | |
| 6,148,944 A * | 11/2000 | Adomi et al. | 180/220 |
| 6,158,881 A * | 12/2000 | Carne | 362/473 |
| 6,623,023 B2 | 9/2003 | Niitsu et al. | |
| 7,393,125 B1 * | 7/2008 | Lai | 362/473 |
| 7,547,021 B2 | 6/2009 | Bon | |
| 2002/0014366 A1 | 2/2002 | Turner | |
| 2005/0189157 A1 | 9/2005 | Hays et al. | |
| 2005/0280244 A1 * | 12/2005 | Watarai | 280/288.4 |
| 2011/0042156 A1 * | 2/2011 | Vincenz | 180/205 |

OTHER PUBLICATIONS

Flow Design Solutions, Electric Bike Concept, http://www.flowdesign.ch/fr/layout2/1 (printed Aug. 2, 2011).
Giant Bicycle Inc., City Speed—Bedienungsanleitung, Version 1.0, Brochure, 2008.

* cited by examiner

*Primary Examiner* — Tashiana Adams
(74) *Attorney, Agent, or Firm* — Cantor Colburn LLP

(57) ABSTRACT

A bicycle is provided having a frame with a seat tube and a bottom bracket coupled to one end of the seat tube. A pedal crank shaft is operably coupled to the bottom bracket. A motor is coupled to the bottom bracket and operably coupled to the pedal crank shaft. A battery is removably coupled to the frame and electrically coupled to the motor. A seat having a seat post is removably coupled to the seat tube, wherein the battery is disposed to remain coupled to the frame when the seat post is removed. In another embodiment, a sleeve is positioned with in the seat tube and the seat post is slidingly disposed in the sleeve. In another embodiment, the bicycle includes a clamp having a plurality of clamp pads that engage the seat post to hold the seat in the desired position.

24 Claims, 59 Drawing Sheets

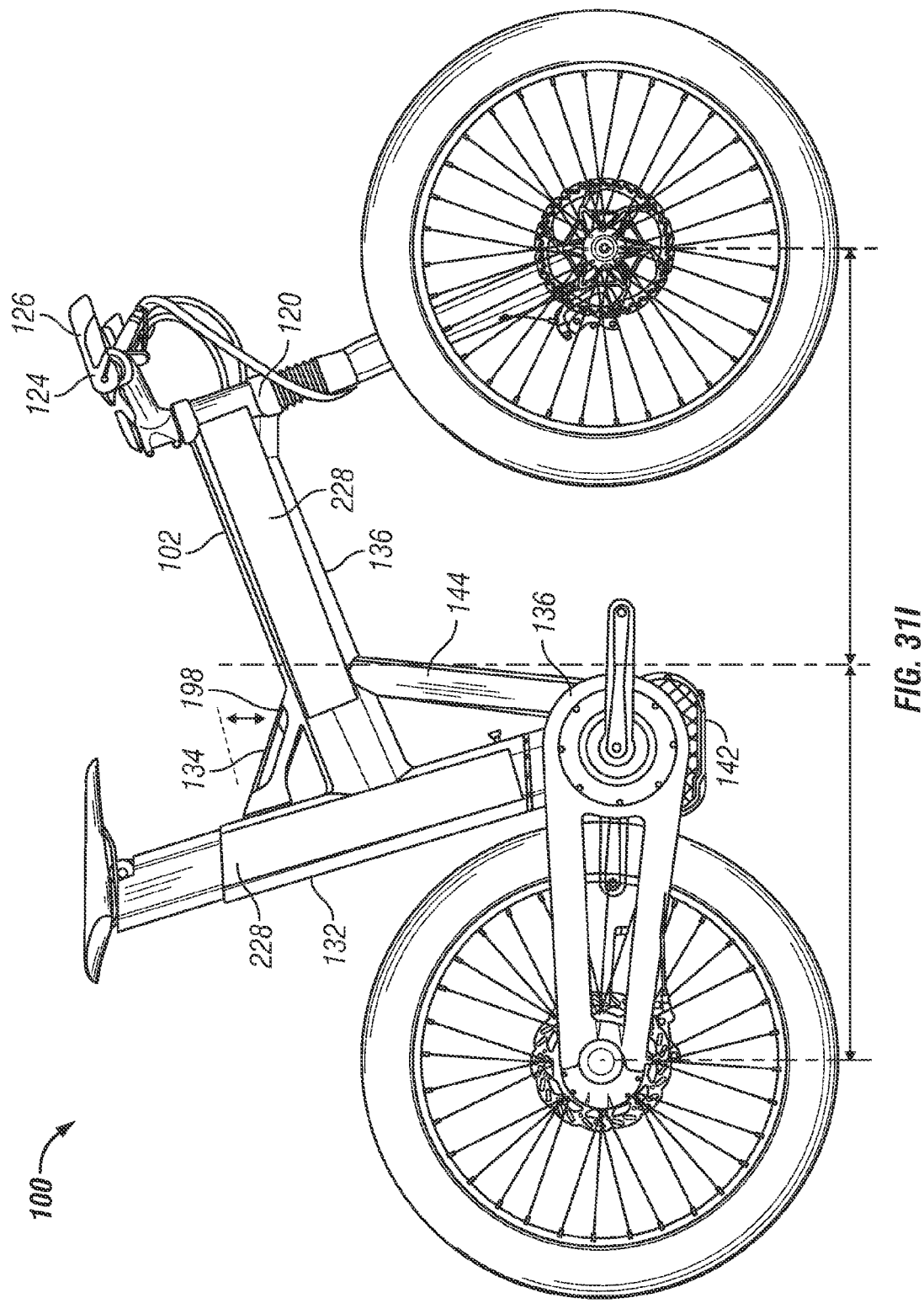

BICYCLE

BACKGROUND OF THE INVENTION

The present disclosure relates generally to a bicycle, and particularly to features of a bicycle, such as a motor assist, a battery arrangement and a clamp for a seat tube.

Bicycles are widely used for transportation as they provide a number of advantages in terms of cost, both for acquiring the bicycle and in fuel for example, and friendly to the environment. While bicycles are suitable for short distances, unless the rider is in good physical shape it may be less desirable for longer distances, in locations with steep hills, or where the rider is commuting to a place of employment.

Several systems have been proposed that utilize an electric motor to assist the rider. The electric motor generally works in parallel with the rider to allow the rider to either achieve higher speeds, thus getting to their destination faster, or able to ride for longer distances without tiring. This may be particularly beneficial with older or less physically fit riders or with persons who are commuting to work for example. Thus, the electrically assisted bicycle increases the versatility of the bicycle making it a more viable alternative to an automobile.

While existing propulsion systems are suitable for their intended purposes, there still remains a need for improvements particularly regarding bicycle propulsion systems having an electric motor and a battery system integrated onto the bicycle in an aesthetically pleasing manner.

BRIEF DESCRIPTION OF THE INVENTION

In accordance with an embodiment of the invention, a bicycle is provided. The bicycle includes a frame having a seat tube and a bottom bracket coupled to one end of the seat tube. A pedal crank shaft is operably coupled to the bottom bracket. A motor is coupled to the bottom bracket and operably coupled to the pedal crank shaft. A battery is removably coupled to the frame and electrically coupled to the motor. A seat having a seat post is removably coupled to the seat tube, wherein the battery is disposed to remain coupled to the frame when the seat post is removed.

In accordance with another embodiment of the invention, a bicycle is provided. The bicycle includes a frame having a seat tube and a bottom bracket coupled to one end of the seat tube. Apedal crank shaft is operably coupled to the bottom bracket. A motor is coupled to the bottom bracket and operably coupled to the pedal crank shaft. A battery is removably disposed within the seat tube and electrically coupled to the motor. A sleeve is at least partially disposed in the seat tube. A seat having a seat post is provided. At least a portion of the seat post is slidably disposed within the sleeve and between the seat tube and the battery.

In accordance with another embodiment of the invention, another bicycle is provided. The bicycle includes a frame having a seat tube, a bottom bracket coupled to one end of the seat tube, and a first frame member coupled to the seat tube. A seat post is at least partially disposed within the seat tube adjacent the first frame member. A pair of first clamp pad members is disposed between the seat post and the seat tube and being positioned substantially opposite the first frame member. A second clamp pad member is disposed adjacent the seat post opposite the pair of first clamp pad members, the second clamp pad member being movable between a first position and a second position. A clamp is operably coupled to the frame and the second clamp pad member, wherein the clamp is movable between an engaged and a disengaged position.

A product is further provided comprising any feature disclosed herein, either explicitly or equivalently, either individually or in combination with any other feature disclosed herein, in any configuration.

Other embodiments of the invention include a product having any feature disclosed herein, explicitly or equivalently, either individually or in combination with any other feature disclosed herein, in any configuration.

BRIEF DESCRIPTION OF THE DRAWINGS

Referring to the exemplary drawings wherein like elements are numbered alike in the accompanying Figures:

FIGS. 31A-31I are partial side views of different styles of bicycles having a battery housed within the bicycle frame in accordance embodiments of the invention;

DETAILED DESCRIPTION OF THE INVENTION

An embodiment of the invention, as shown and described by the various figures and accompanying text, provides a bicycle having one or more of the following features: a handle bar having an integrated accessory connector; a frame sized to house a battery in a seat tube; a frame sized to house a battery in a down tube; a frame sized to house a battery in a rack; a motor arranged coaxially with a crank shaft; a user interface for battery settings; a battery meter; a chain case that couples a rear wheel to a frame; a chain case having tension adjustment features; a battery having a plurality of sets of cells; a battery locking arrangement; a seat offset from the seat tube; and a seat post clamping arrangement.

Figure 1:
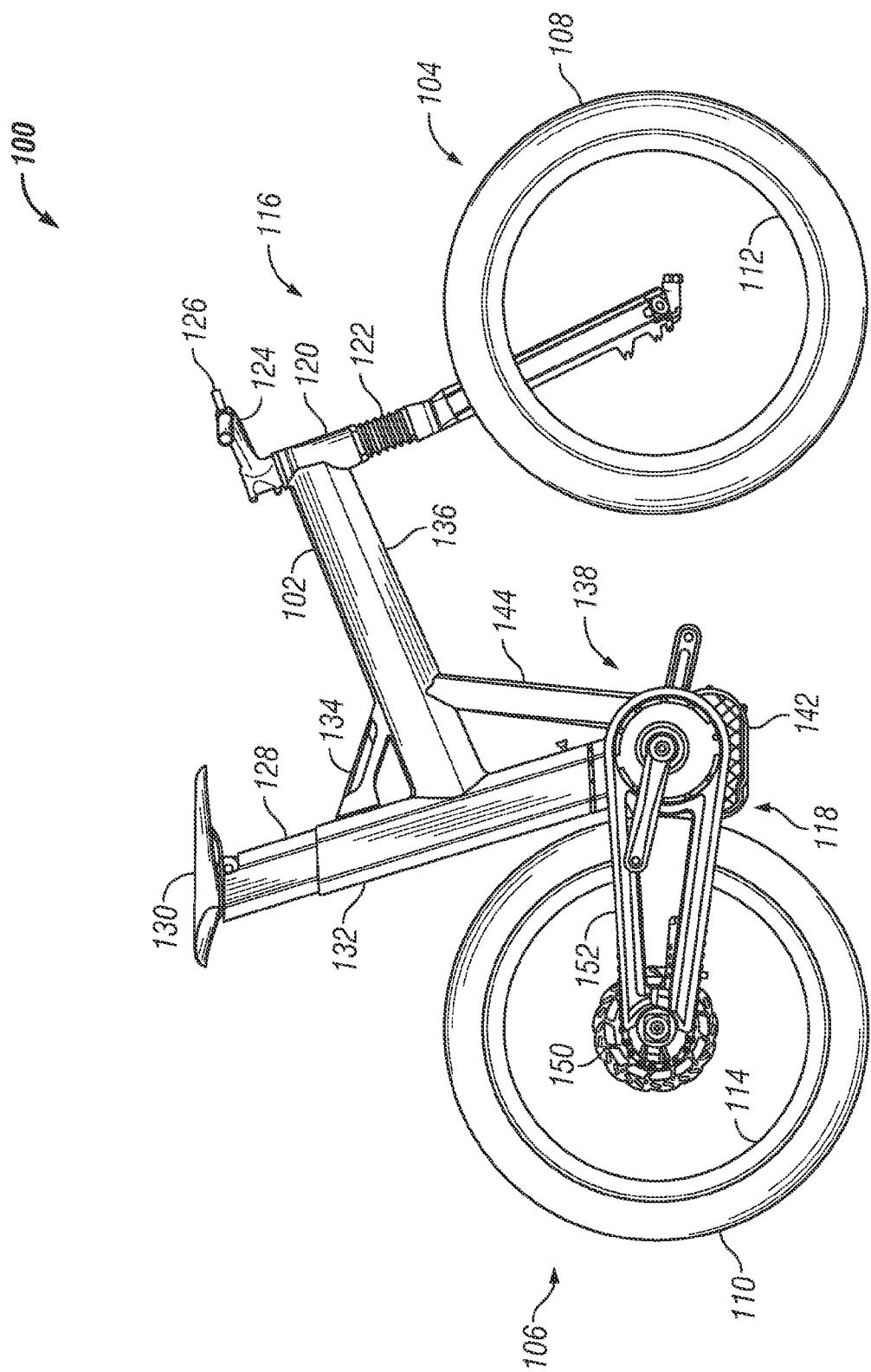
FIG. 1 illustrates a side view of an exemplary embodiment of a bicycle in accordance with an embodiment of the invention.
Figure 2:
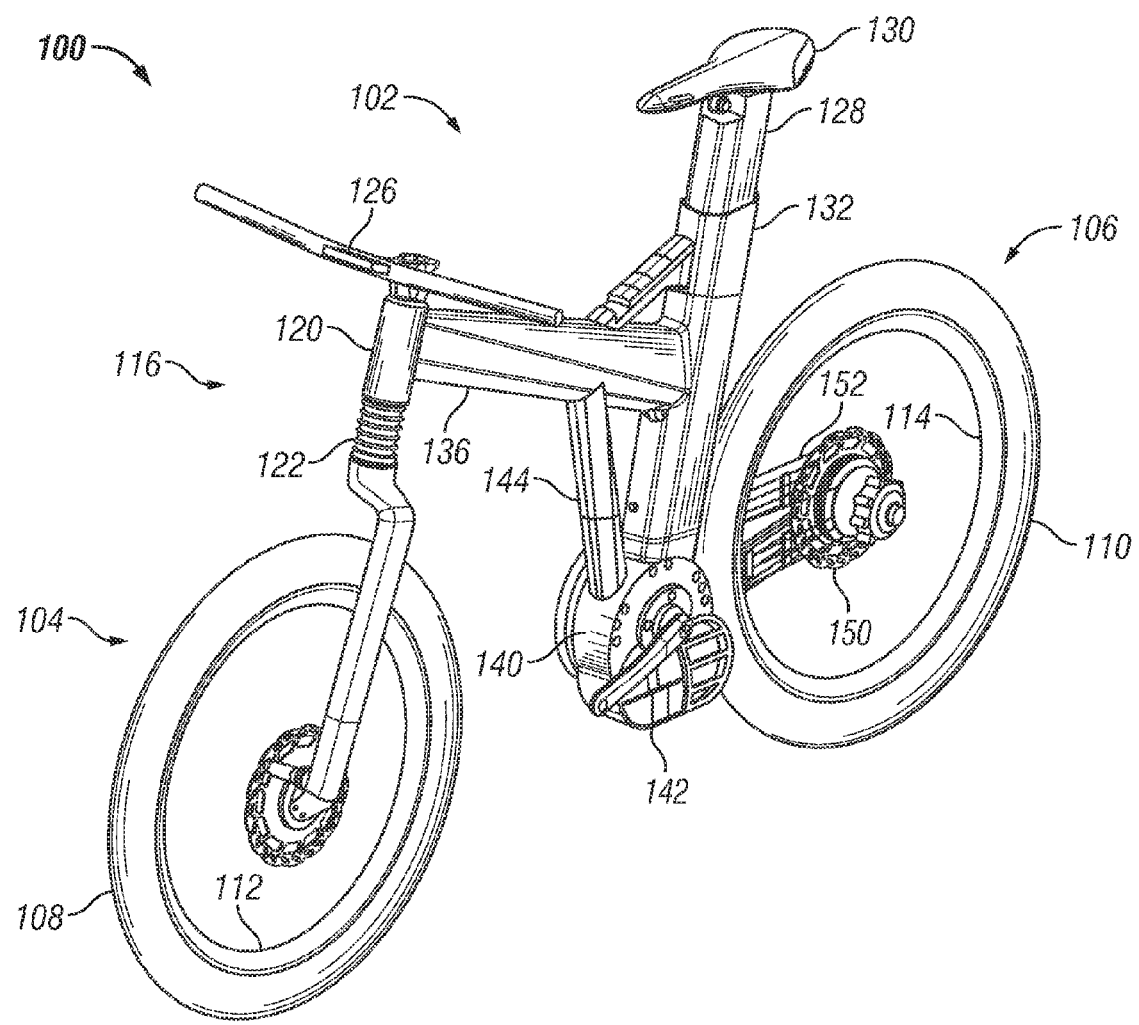
FIG. 2 illustrates a perspective view of a the bicycle of FIG. 1.

FIG. 1 and FIG. 2 show an exemplary embodiment of a bicycle 100 having a bicycle frame 102 configured to receive front 104 and rear 106 wheels. Each wheel includes an inflatable tire 108, 110 which is supported by a rim 112, 114, respectively. The frame 102 includes a front section 116 and a rear section 118. The front section 116 includes a head tube 120 that is configured and dimensioned to receive a suspension system 122 and to allow a rotational degree of freedom between the head tube 120 and the suspension system 122. The suspension system 122 couples the front section 116 to the front wheel 104. As will be discussed in more detail below, in one embodiment, the head tube 120 may also provide an entrance for insertion and removal of a battery stored in the frame 102.

A handle bar 124 is connected to the suspension system 122 via a steerer tube 320 (FIG. 34C) to allow the rider to rotate the front wheel 101 via the suspension system 122. The handle bar 124 typically has grips and hand brake actuators (not shown). An accessory, such as a user interface 126 is mounted to the handle bar 124. On the opposite end of the frame front section 116, a rear seat post 128 is removably coupled to a seat tube 132 portion of the frame 102 by a clamp 134. The rear seat post 128 is configured to provide support for seat 130. In the exemplary embodiment, the clamp 134 is mounted to a member that extends between the seat tube 132 and a frame member 136. A bottom bracket 140 is coupled to an end of the seat tube 132 opposite the seat 130. In one embodiment, a down tube 144 member extends between the bottom bracket 140 and the frame member 136. A crank assembly 138 is mounted to the bottom bracket 140. As will be discussed in more detail herein, the crank assembly 138 includes a gear assembly, pedals (not shown) and a drive motor 142.

Figure 3:
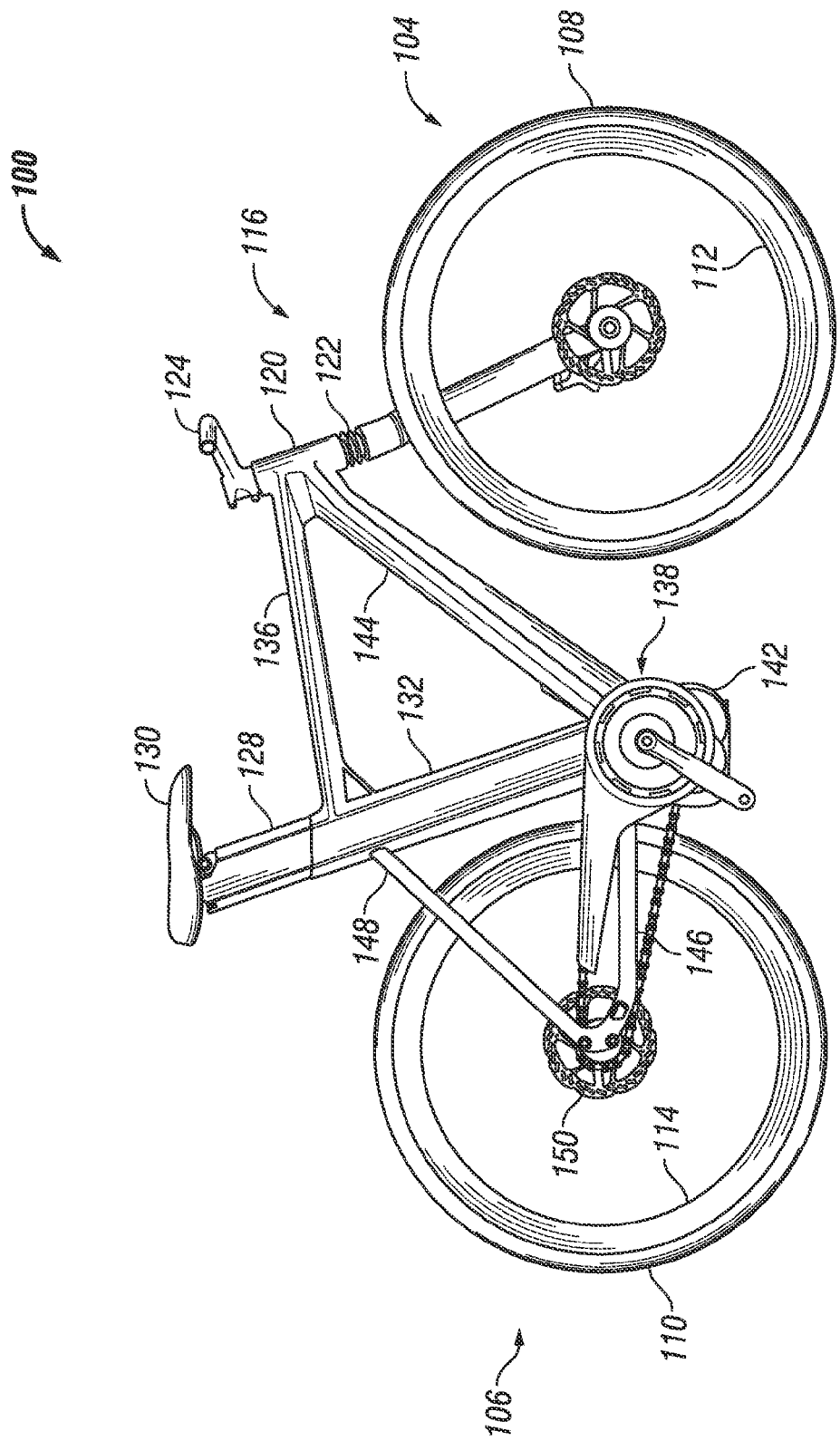
FIG. 3 illustrates a side view of a bicycle in accordance with another embodiment of the invention.
Figure 31A:
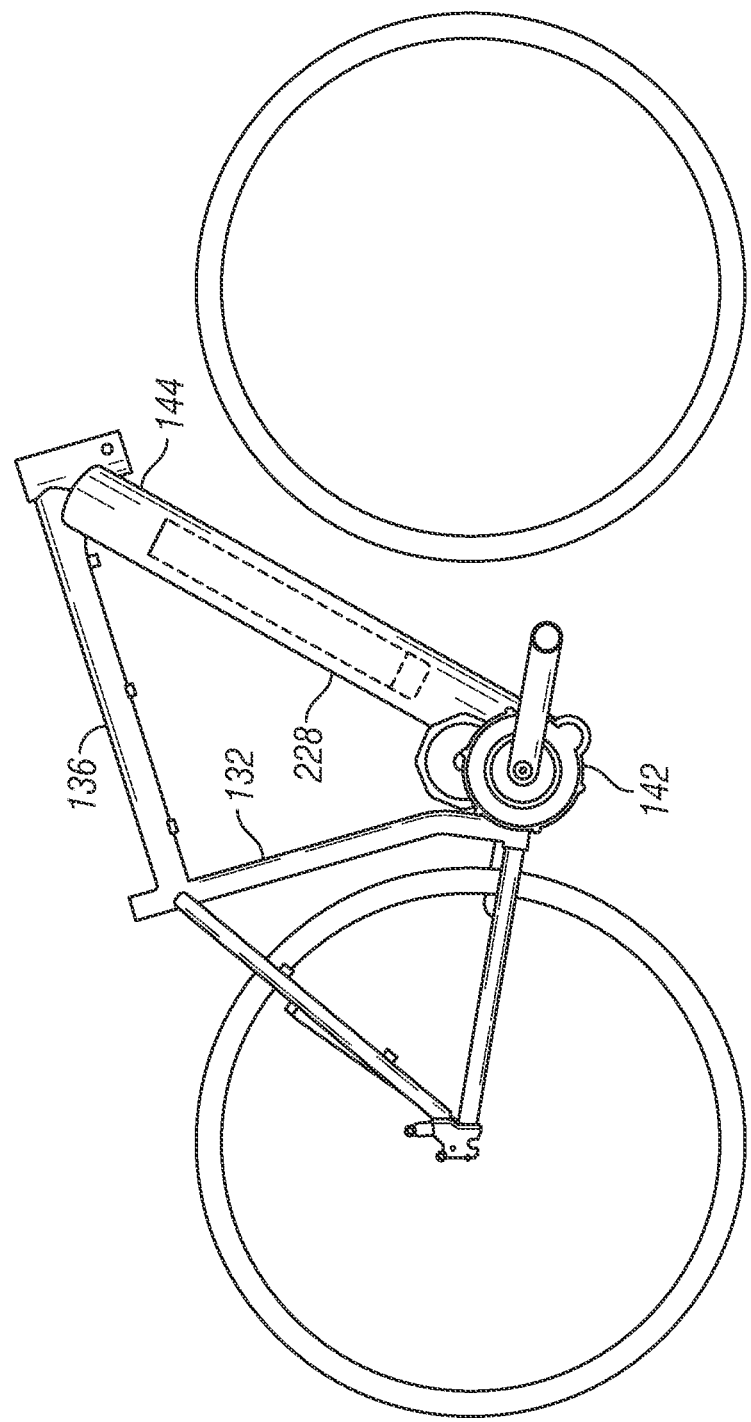
Figure 31B:
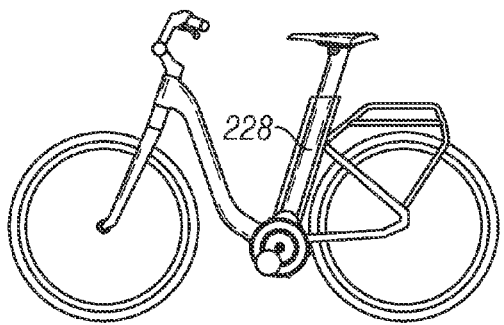
Figure 31E:
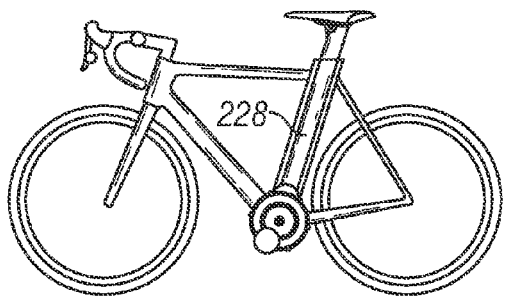
Figure 31C:
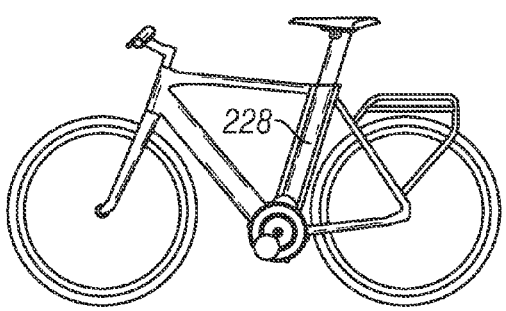
Figure 31F:
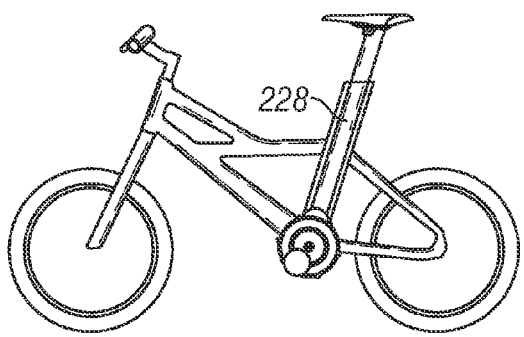
Figure 31D:
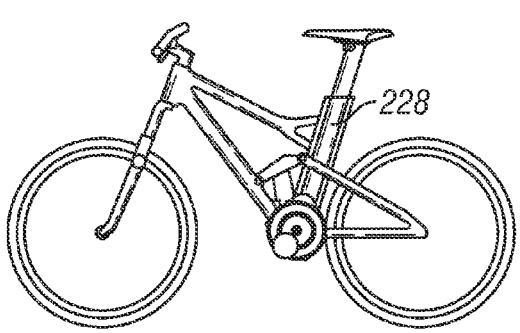
Figure 35:
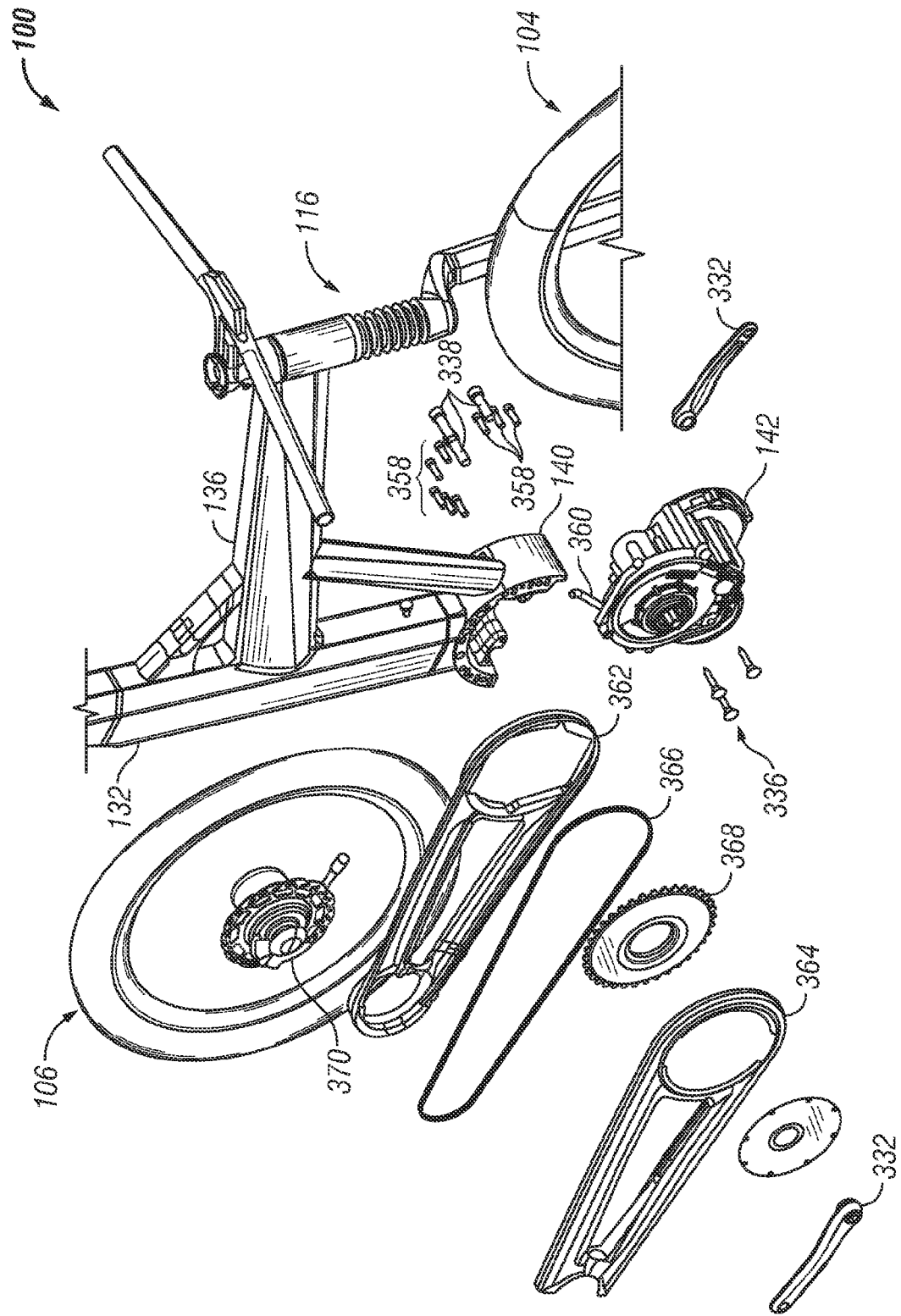
FIG. 35 is an exploded view illustrating the motor and rear section assembly for the bicycle of FIG. 1.
Figure 36:
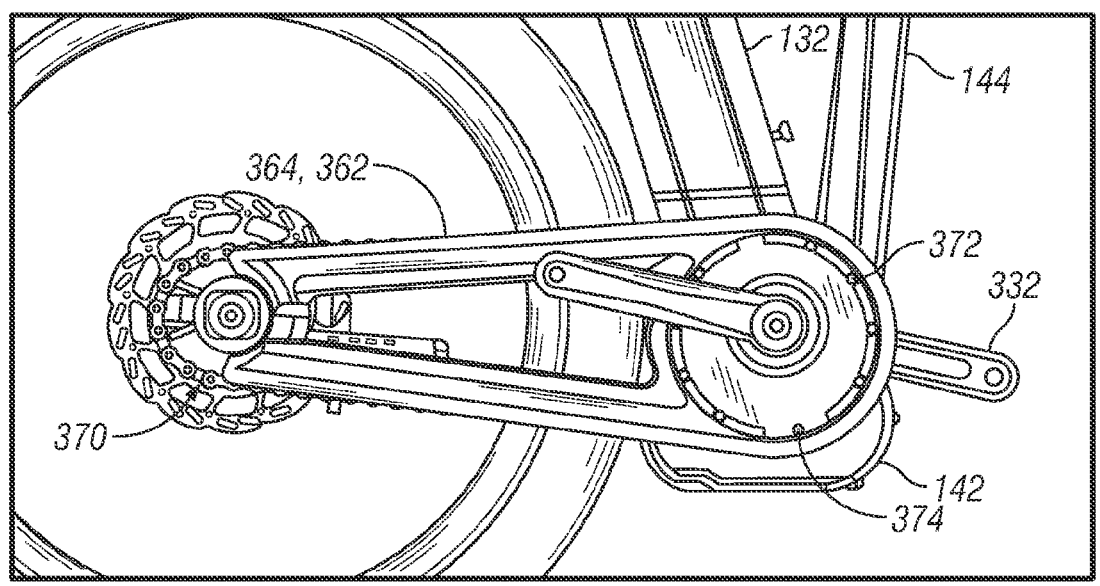
FIG. 36 is a partial side view illustration of the motor and rear section assembly for the bicycle of FIG. 35.
Figure 37:
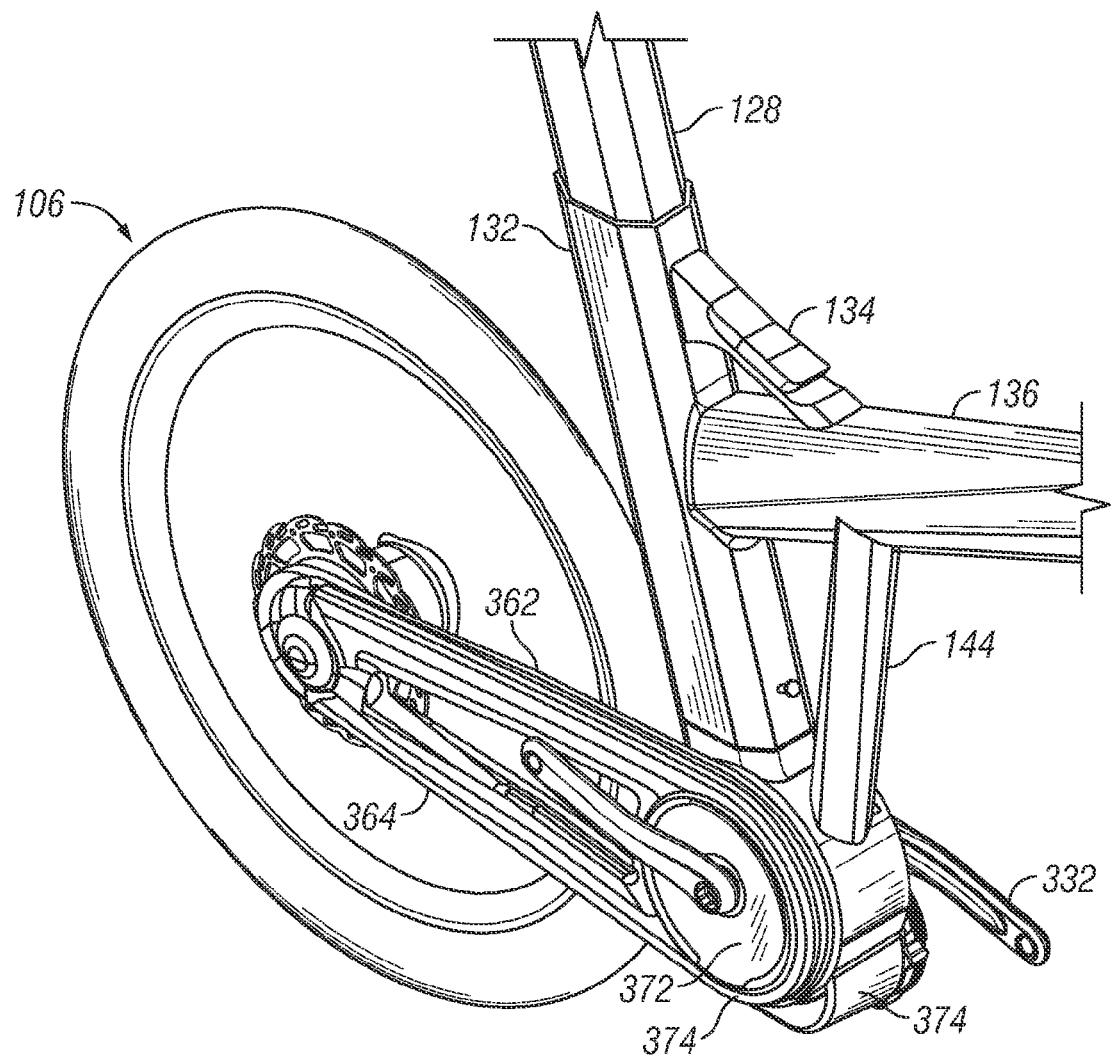
FIG. 37 is a partial perspective view illustration of the motor and read section assembly for the bicycle of FIG. 35.

In one embodiment, the rear section 118 includes a chain case 152 that is coupled to the bottom bracket 140 by a plurality of bolts (FIG. 35). The chain case 152 couples the rear wheel 106 to the front section 116. In another embodiment, the rear section 118 includes an upper tube member 148 and a lower tube member 146 that are coupled together at one end and at an opposite end to the seat tube 132 and bottom bracket 140 respectively as shown in FIG. 3. The embodiment of FIG. 3 is sometimes referred to as a hard tail. In yet another embodiment, the rear section 118 is coupled to the front section 116 by a pair of linkages and a rear suspension system (FIG. 31D). The linkages and rear suspension pivot, allowing the rear section 118 to move independently in the same plane as the front section 116. This type of bicycle, sometimes referred to as a full suspension type, provides energy absorption and damping for both wheels 104, 108 of the bicycle 100. The rear section 118 also includes a gearing system 150 and a chain 154. It should be appreciated that in the embodiment of FIG. 1 and FIG. 4 the chain 154 is housed within the chain case 152.

Figure 4:
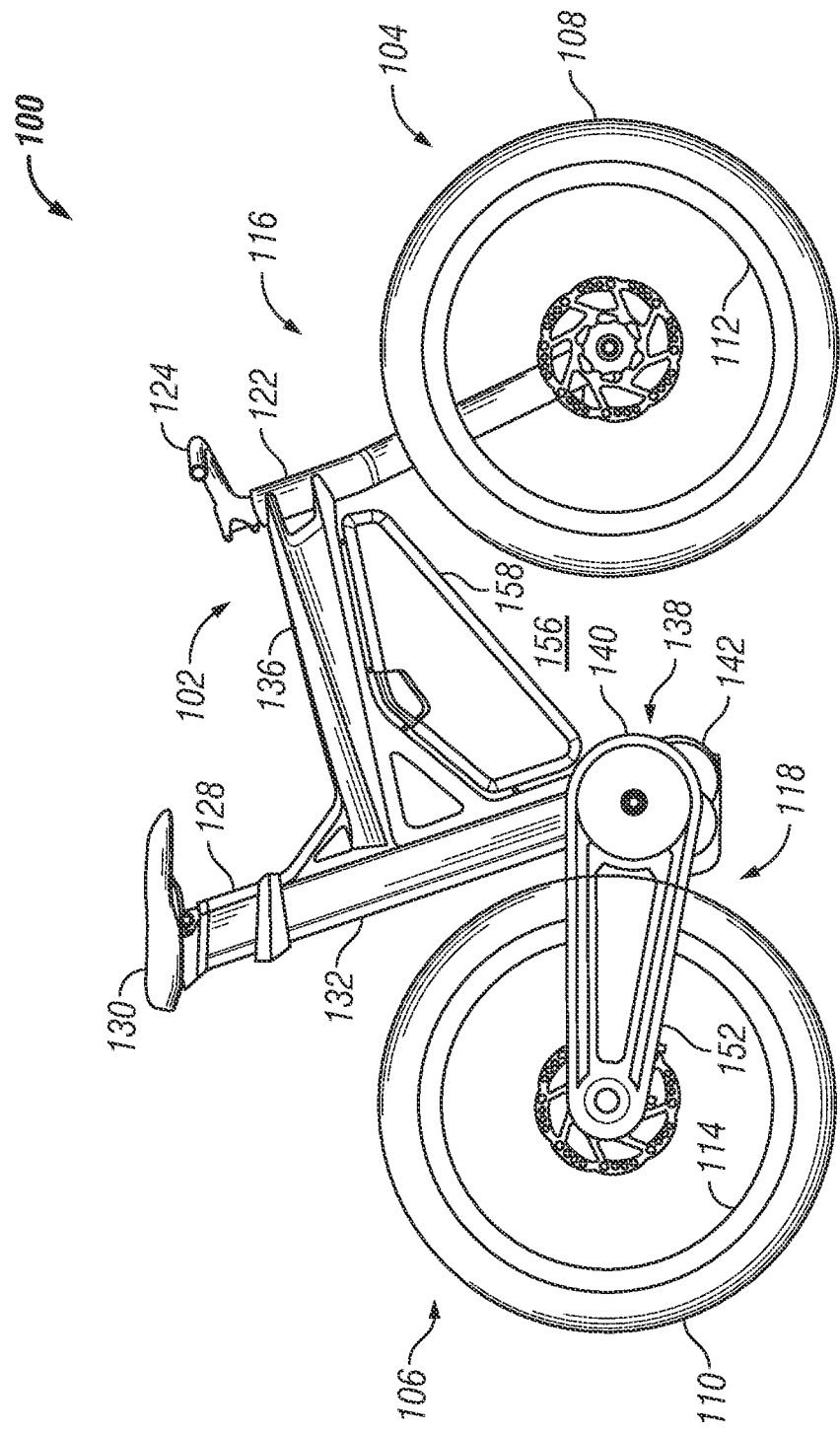
FIG. 4 illustrates a side view of a bicycle with a luggage compartment in accordance with another embodiment of the invention.

Referring now to FIG. 4, another embodiment of bicycle 100 is shown. In this embodiment, the bottom bracket 140 is coupled to the seat tube 132. The down tube 144 is coupled between the frame member 136 and the seat tube 132. This defines a space 156 between the front wheel 104 and the seat tube 132. Within the space 156, a luggage member 158. The luggage member 158 is removably coupled to the frame member 136 and the seat tube 132. The luggage member 158 is suitably sized to fit within the space 156 and not interfere with the legs of the bicycle rider. It should be appreciated that the luggage 158 includes an interior compartment that provides storage for the rider.

Figure 5A:
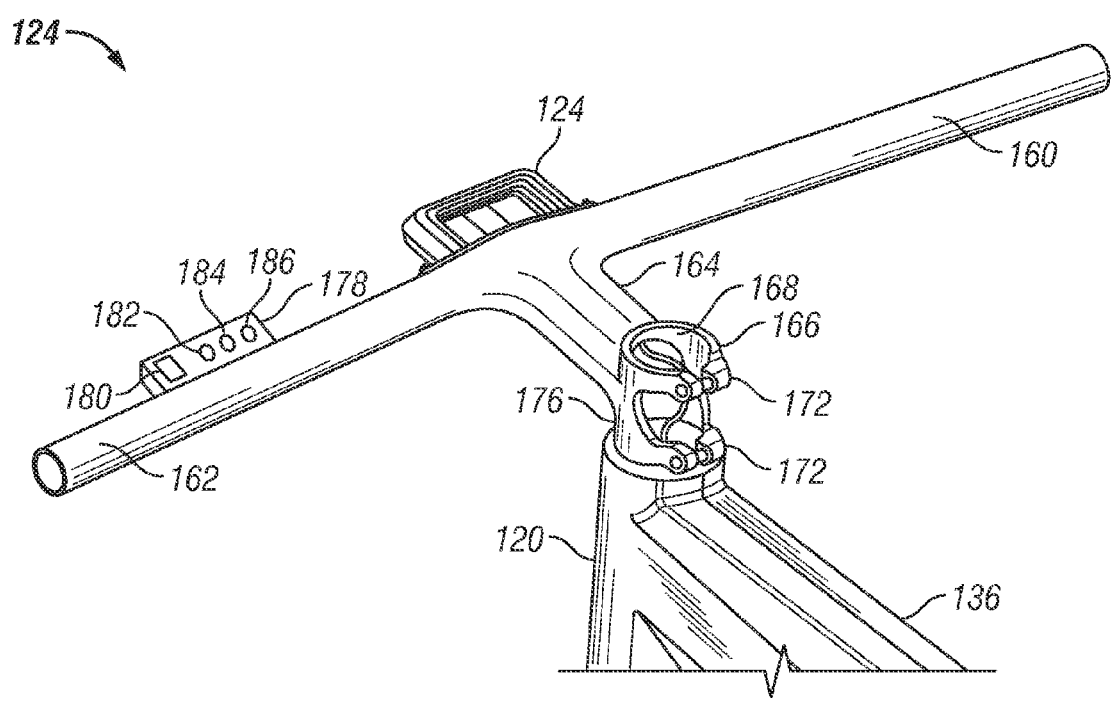
FIG. 5 is a partial isometric view of the bicycle of FIG. 1.
Figure 5B:
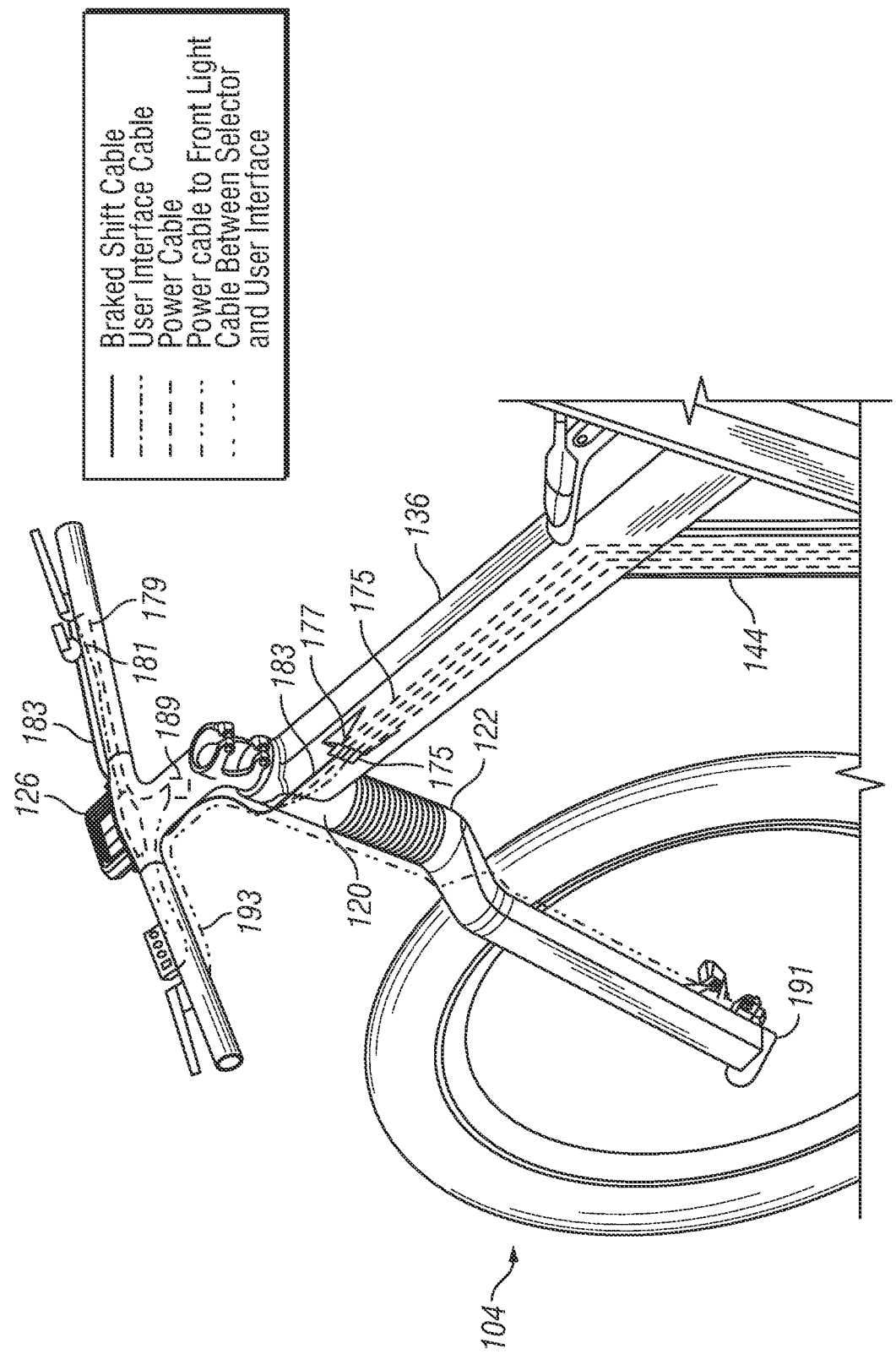
Figure 6:
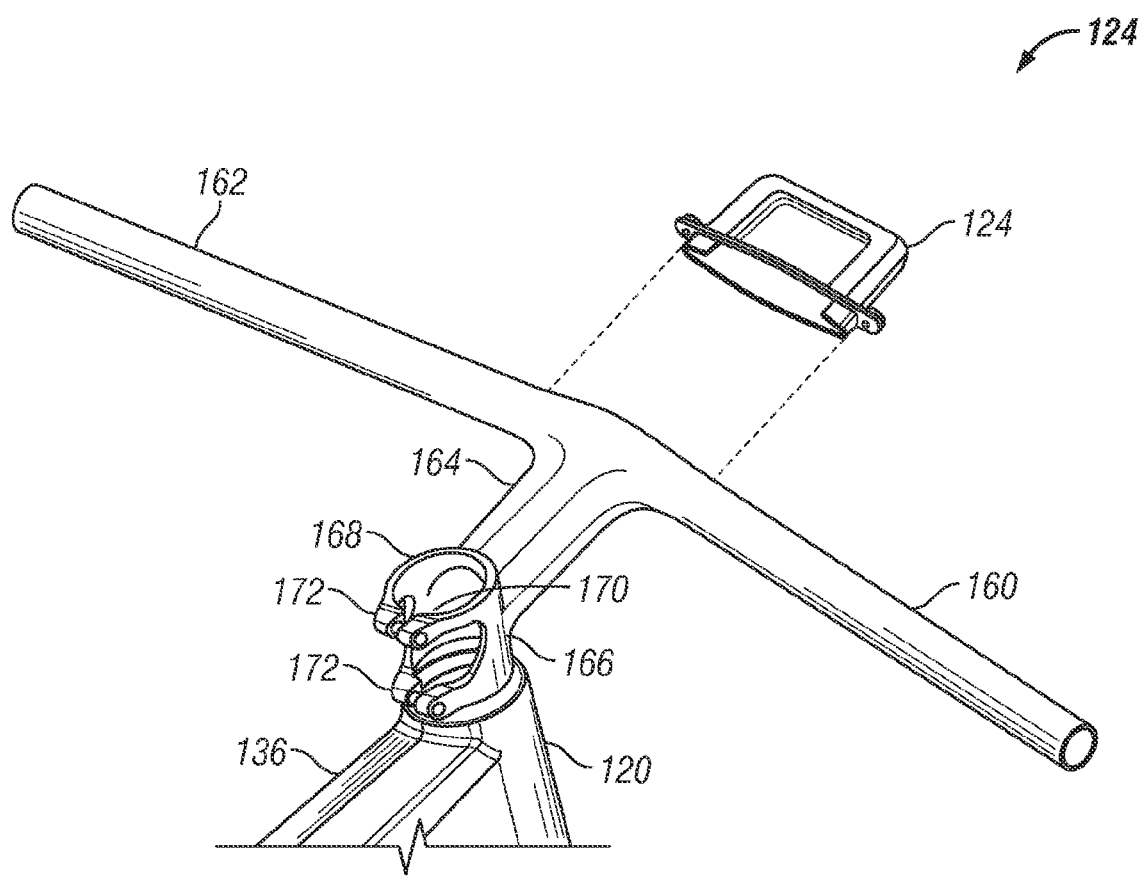
FIG. 6 is a partial exploded perspective view of the handle bars of FIG. 5.
Figure 7:
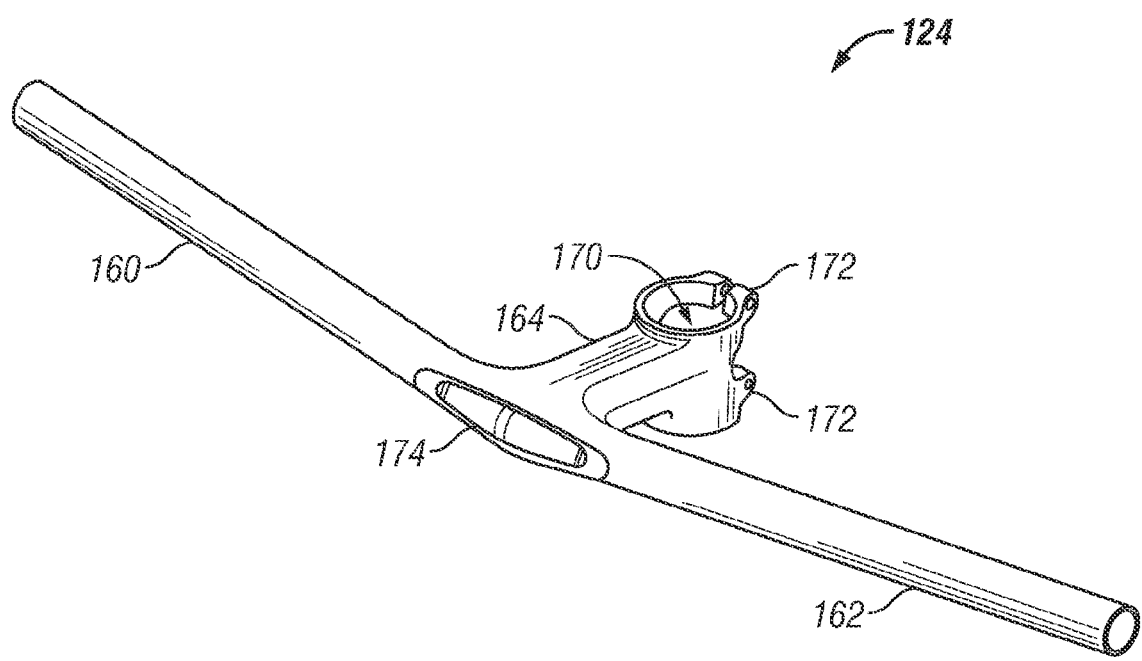
FIG. 7 illustrates a perspective view of the handle bar of FIG. 5.
Figure 8:
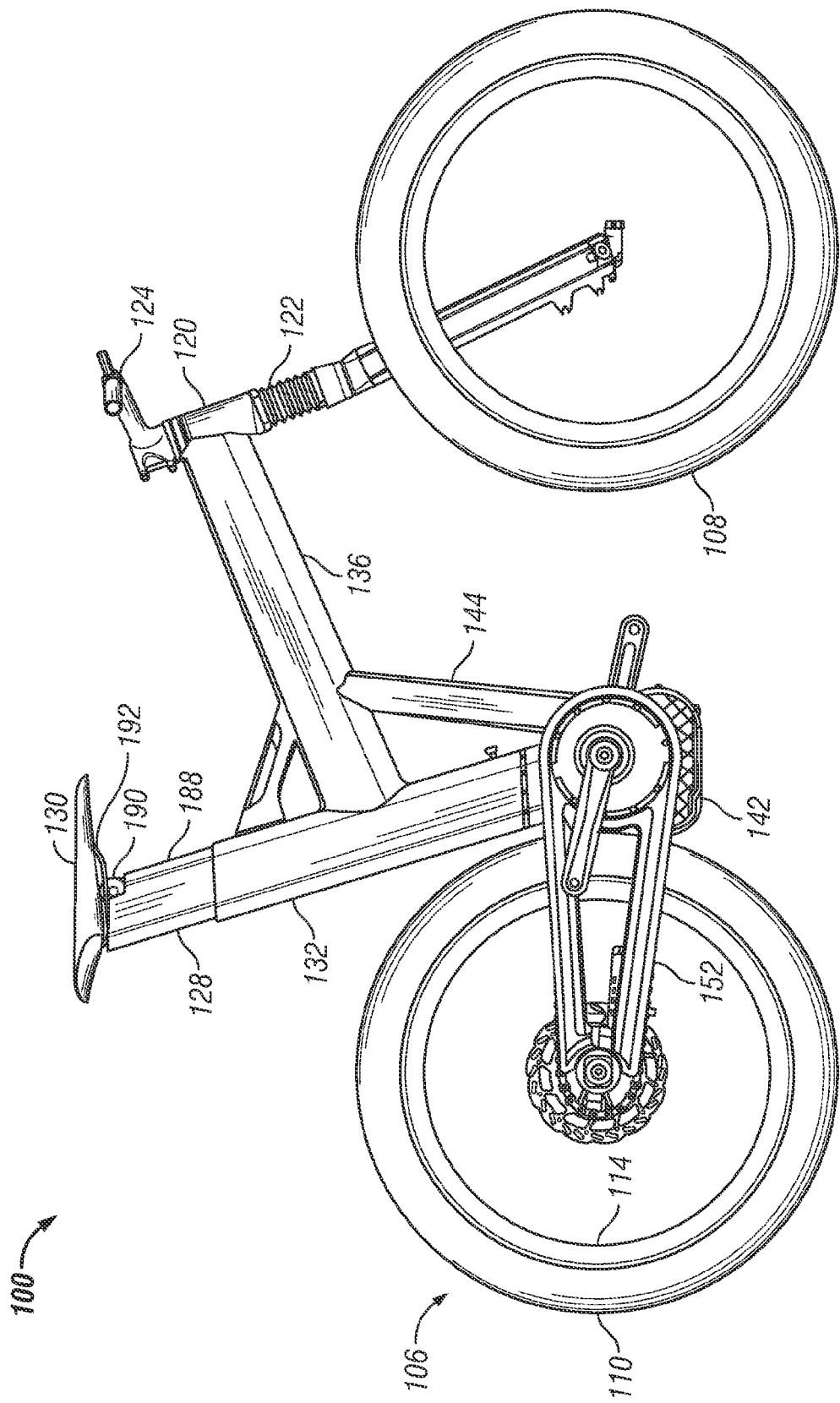
FIG. 8 is a partial side view of the bicycle of FIG. 1.
Figure 9:
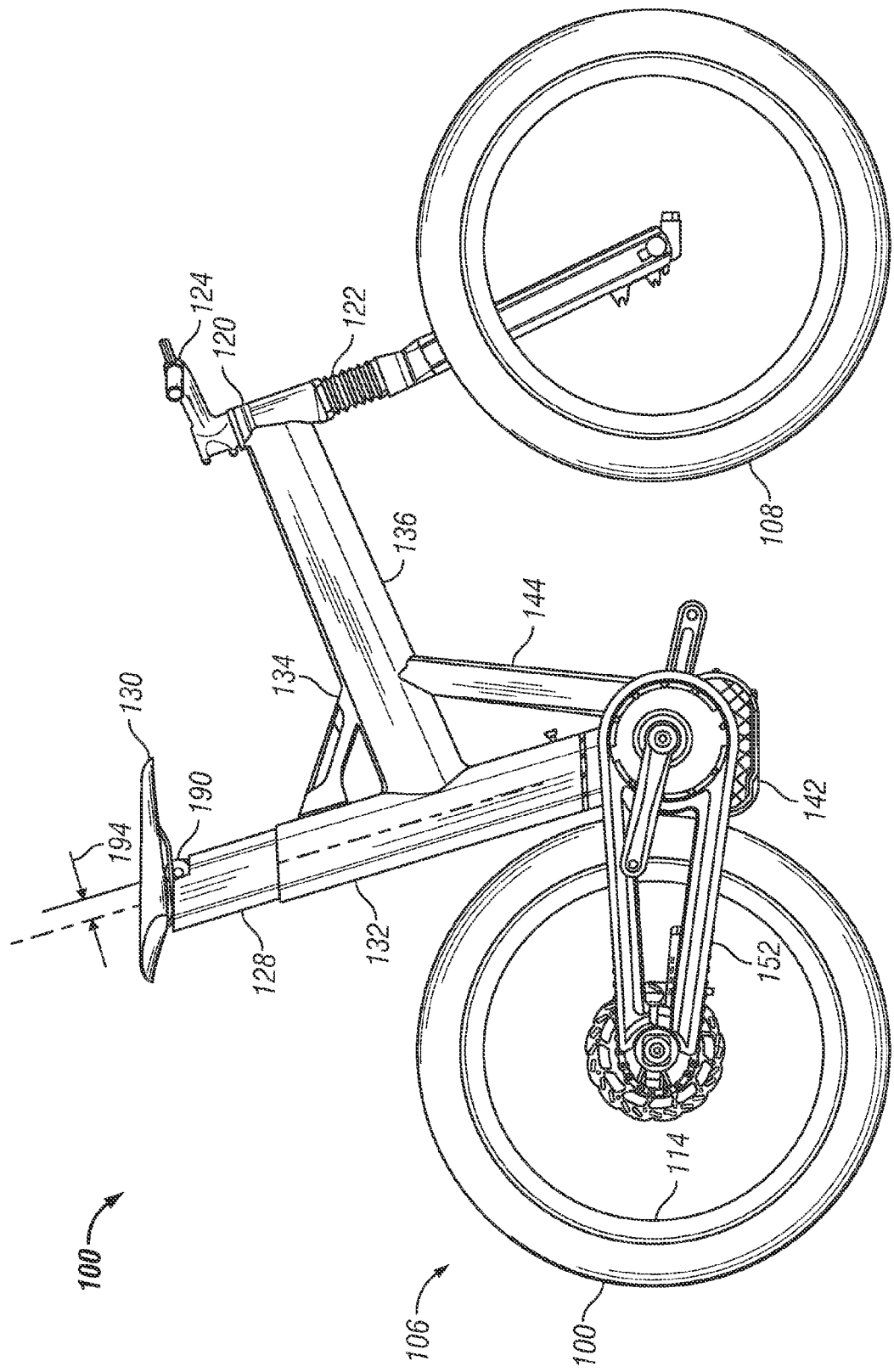
FIG. 9 is another partial side view of the bicycle of FIG. 1.

One embodiment of handle bar 124 is shown in more detail in FIGS. 5-7. In this embodiment, the handle bar 124 includes a first and second handle portion 160, 162. The handle portions 160, 162 may include one or more components, such as grips, brake levers and gear selectors (not shown) for example, as is known in the art. The handle portions 160, 162 are coupled to a first end of a stem portion 164. On a second end of the stem 164, a clamp portion 166 extends from the stem 164. The stem 164 includes a bore 168 that extends between the first end and the second end of the stem 164. The clamp 166 includes an opening 170 that is sized to receive a steerer tube that couples the handle bar 124 to the front suspension system 122. The clamp 166 also includes a pair of projections 172 that are sized to receive a bolt (not shown). When the bolt is tightened, the projections 172 reduce the size of the opening 170 to form a substantially rigid connection between the handle bar 124 to the steerer tube. In the exemplary embodiment, the handle bar 124 is forged as a single unitary member.

In one embodiment, the handle bar 124 includes a connector 174. The connector 174 provides a means for electrically and mechanically coupling accessories, such as user interface 126 for example, to the handle bar 124. The connector 174 is arranged an end of the stem 164 and cooperates with the center bore 168 to allow wiring 176 to pass from the accessory to a bike controller, such as a controller located on motor 142 or a battery controller for example. The wiring 176 allows signals and power to pass between the accessory, the battery or a controller without having wiring external to the frame 102. In one embodiment, the steerer tube also includes an opening or a slot, which allows the wiring to pass through into the frame member 136 without interfering with the steering of the front wheel 104. The connector 174 provides additional advantages in providing a standard interface for accessories. These accessories may be a powered accessory, such as but not limited to: a control computer; a light, an LED light; a global positioning satellite (GPS) device; or an air pump for example. The connector 174 may also connect with non-powered accessories such as but not limited to: a basket; a reflector; or a water bottle holder for example. The accessories may couple to the connector 174 by a clip or with a fastener such as a bolt. In one embodiment, the accessory couples to the connector with thumb-screws.

In one embodiment, the user interface 126 includes a display that provides the rider with information. The handle bar 124 may further include a second user interface 178. In this embodiment, the second user interface 178 includes a battery indicator 180 and a plurality of selectors. The selectors allow the rider to adjust the amount of assistance that is provided by motor 142. In one embodiment, the selectors include a sport selector 182, a touring selector 184, and an economy selector 186. The sport selector 182 adjusts the motor 142 to provide a high level of assistance, such as when the rider desires to increase their speed or is in hilly terrain for example. The economy selector 186 provides a lower level of assistance to the rider to increase the life of the battery. The touring selector 184 provides a motor 142 setting that is between the sport and economy settings.

It should be appreciated that while the user interface 178 is illustrated and described as being on the left side of the handle bar 124, it may be mounted on either side as desired by the rider. Further, rather than being a selector, the user interface 178 may include a joystick interface wherein the rider selects a desired setting by moving the joystick in a particular direction. For example, by moving the joystick to the left may initiate sport settings, moving the joystick away from the rider may result in a touring setting, while moving the joystick to the right may result in an economy setting. In another embodiment, the joystick interface may be coupled with a display that allows the rider to further adjust the settings and amount of assistance provided by the motor 142.

Another embodiment for the routing of power and data cables is illustrated in FIG. 5A. In this embodiment, a plurality of conduits 175 are arranged within the frame member 136 and the down tube 144. The conduits 175 allow power, data, brake and shifting cables and wiring to be routed between the bottom bracket 140 and the front of the bicycle 100. In this embodiment, the conduits 175 terminate either at or adjacent to a projection 177 in frame member 136. At the termination of the conduits 175, the power cable 179, data cable 181 and brake cable 183 are coupled together, such as with a shrink-wrap material for example, and along the head tube 120 to the handle bar 124. At the location of rear brake 185 and 187, the data cable 181 and power cable 179 are separated and routed to the user interface 126 and an optional power converter 189. In one embodiment, the optional power converter 189 adapts the electrical characteristics of the power, such as from 6 volts to 3.7 volts for example, to that suitable for an optional front light 191. In embodiments having a front light 191 coupled to the end of the suspension system 122, the electrical power is then transferred from the power converter 189 through cable 193. The cable 193 passes internal to the handle bar 124 to the location of the front brake 195 where it exits the handle bar 124 and is routed with the front brake cable along the handle bar 124, head tube 120 and into the fork leg of suspension system 122 to the front light 191.

Figure 38A:
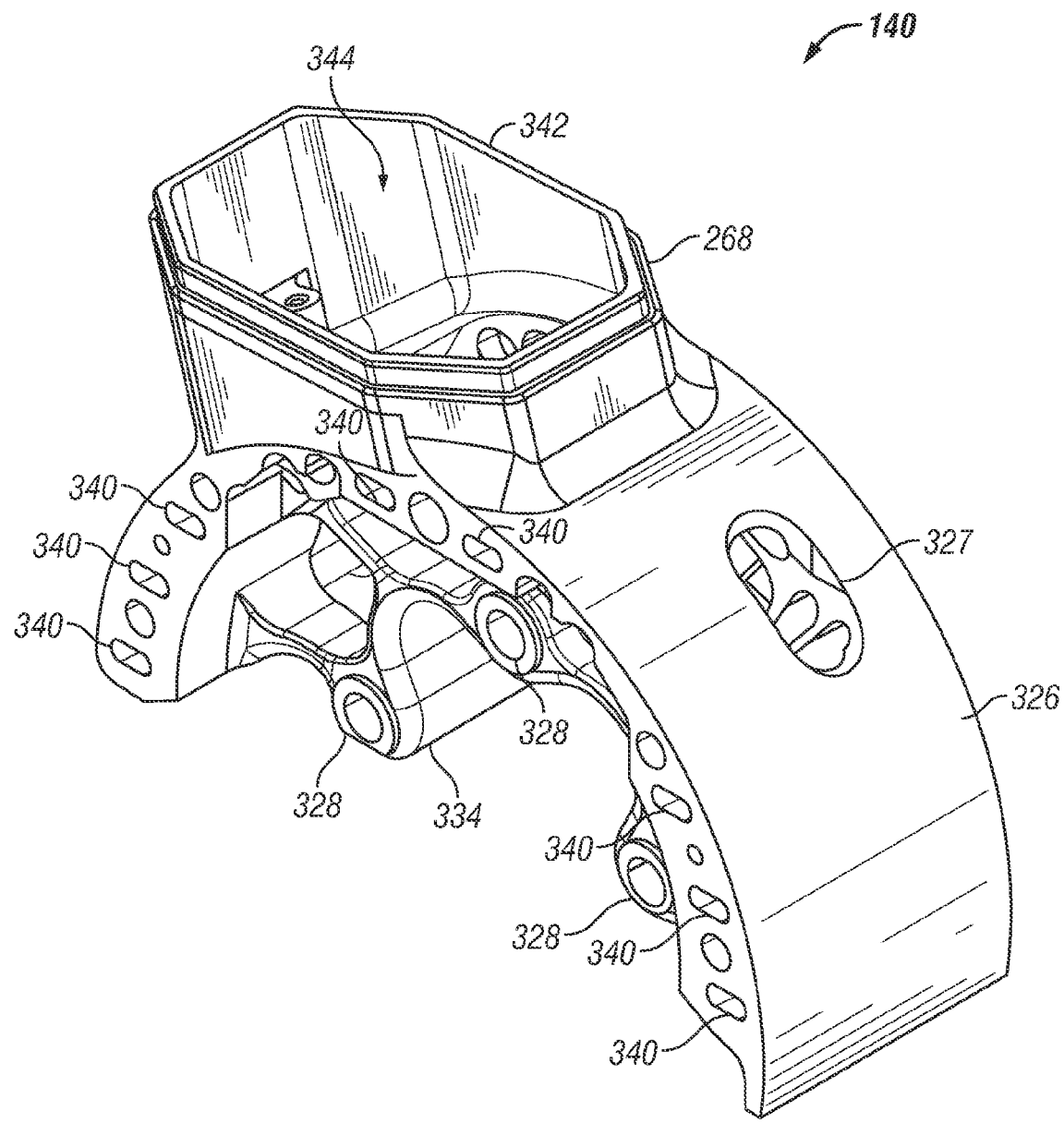
FIGS. 38A-39B illustrate a bottom bracket for the bicycle of FIG. 1.
Figure 38B:
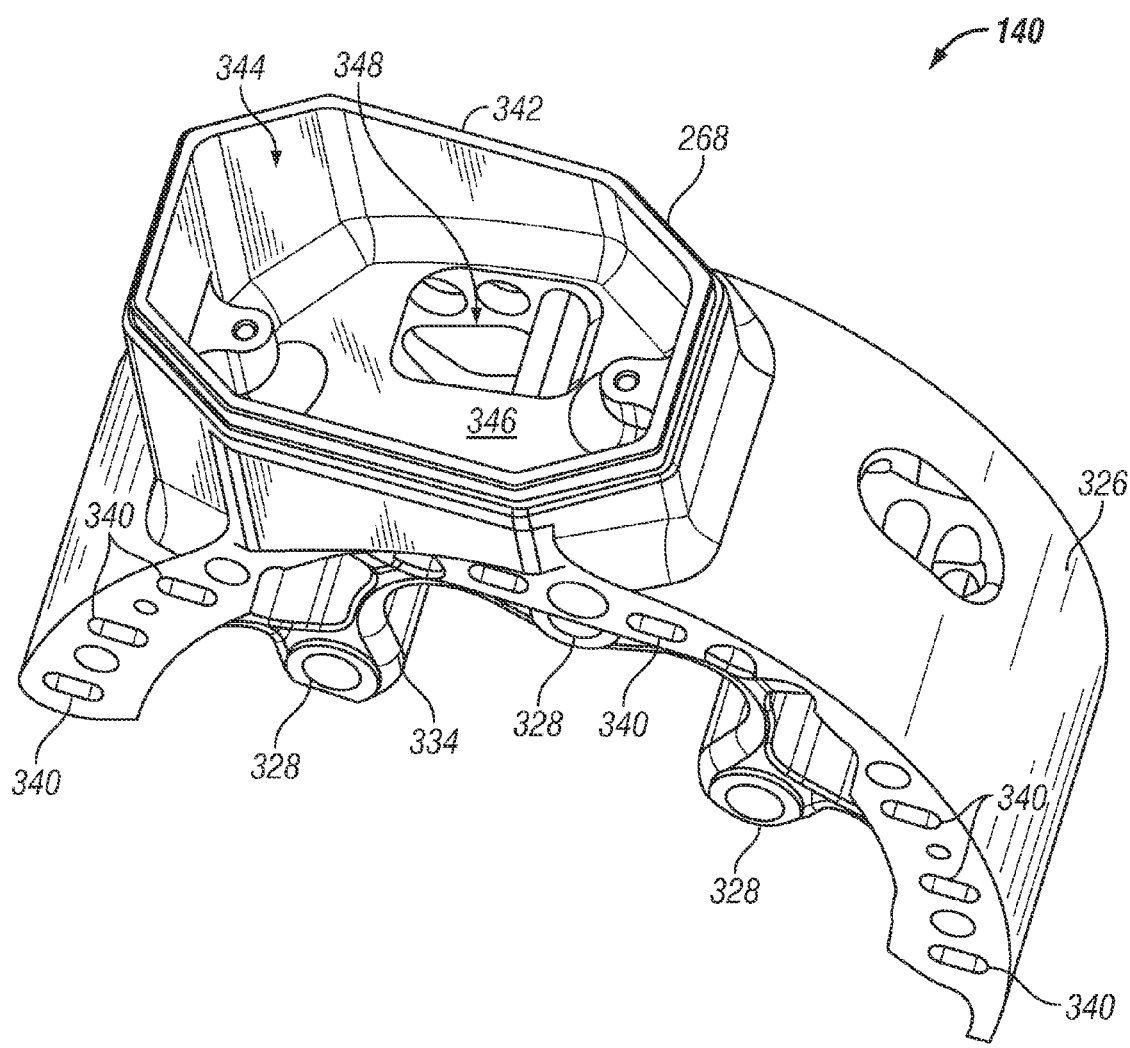
Figure 38C:
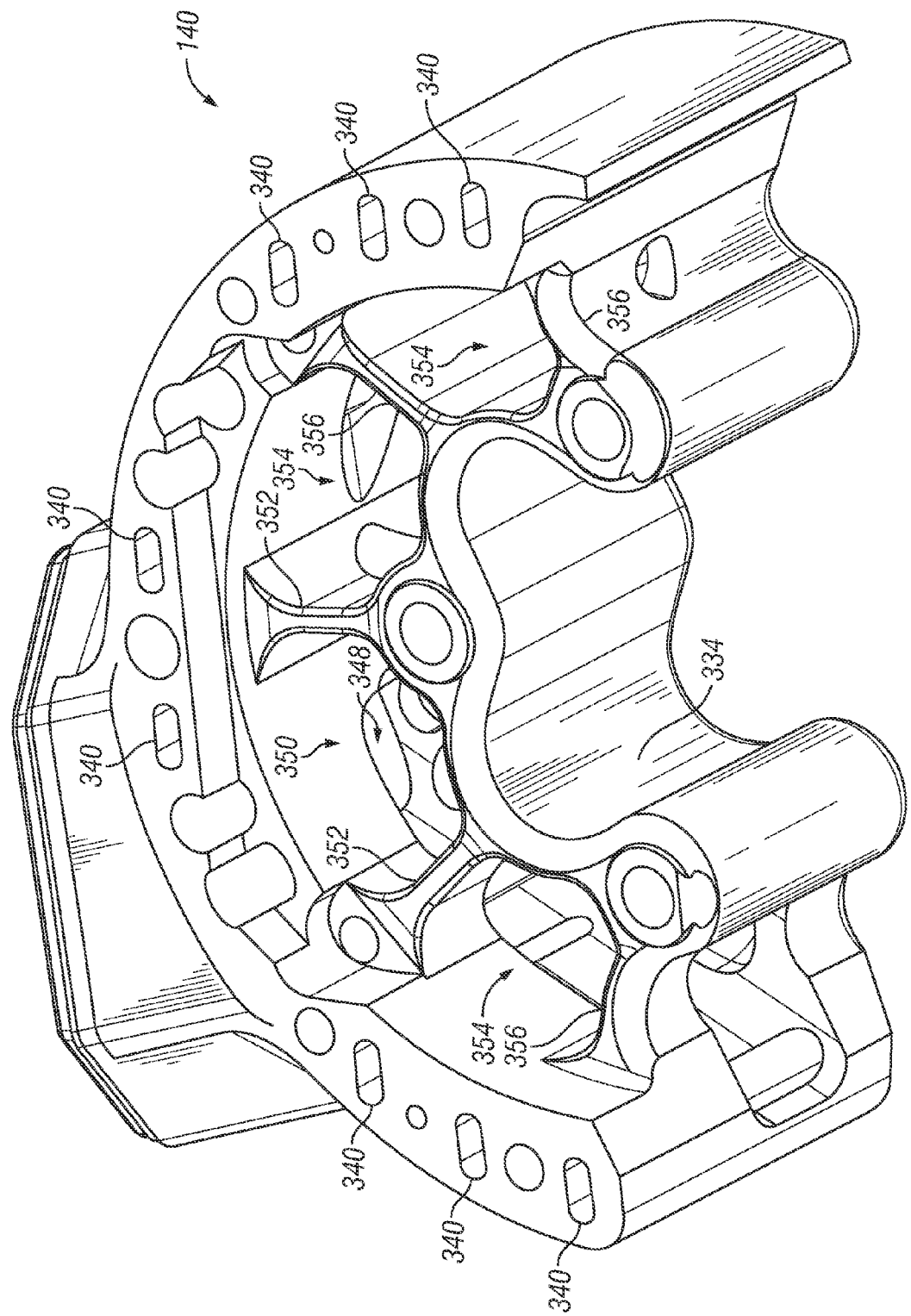
Figure 39A:
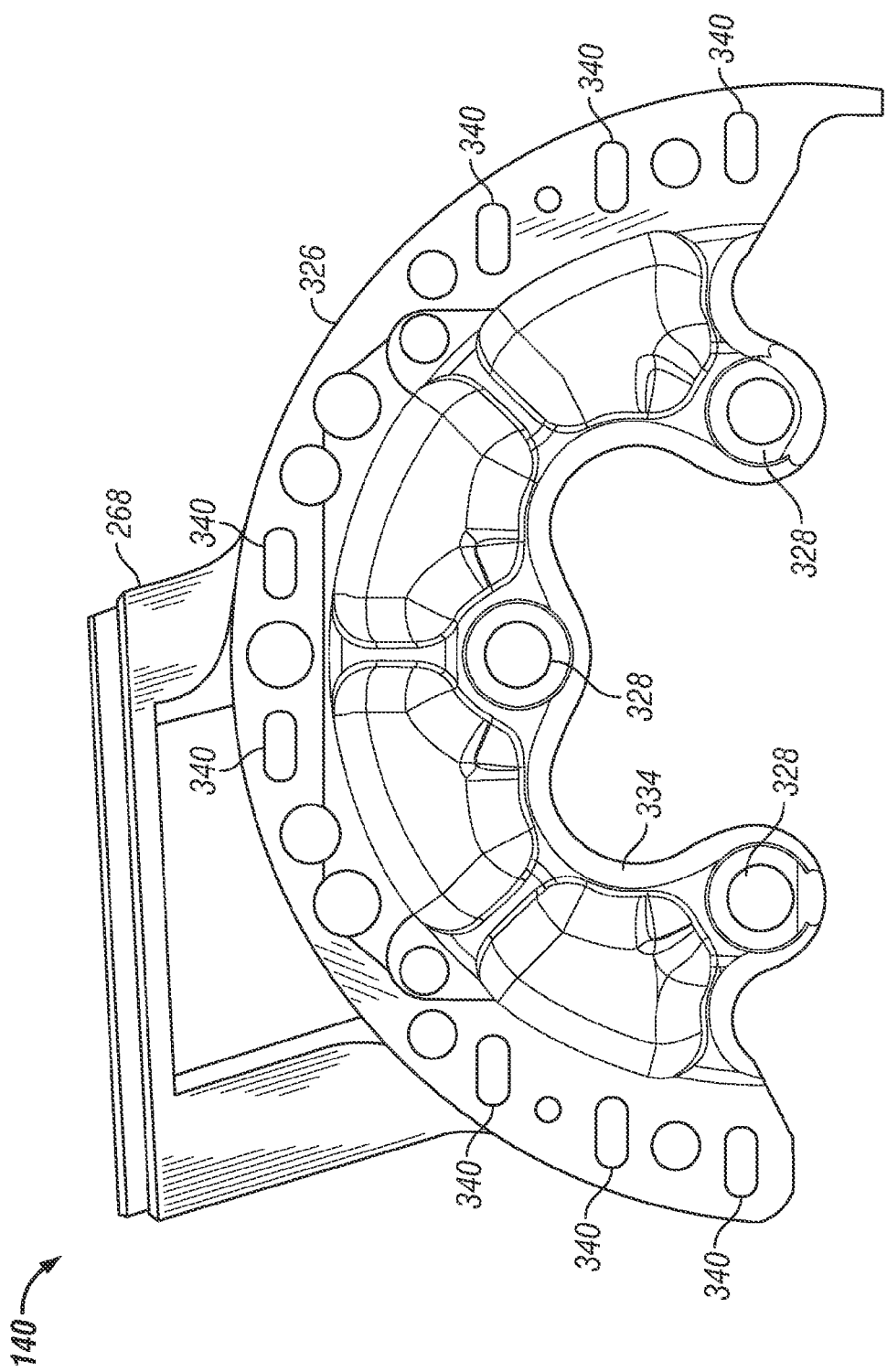
Figure 39B:
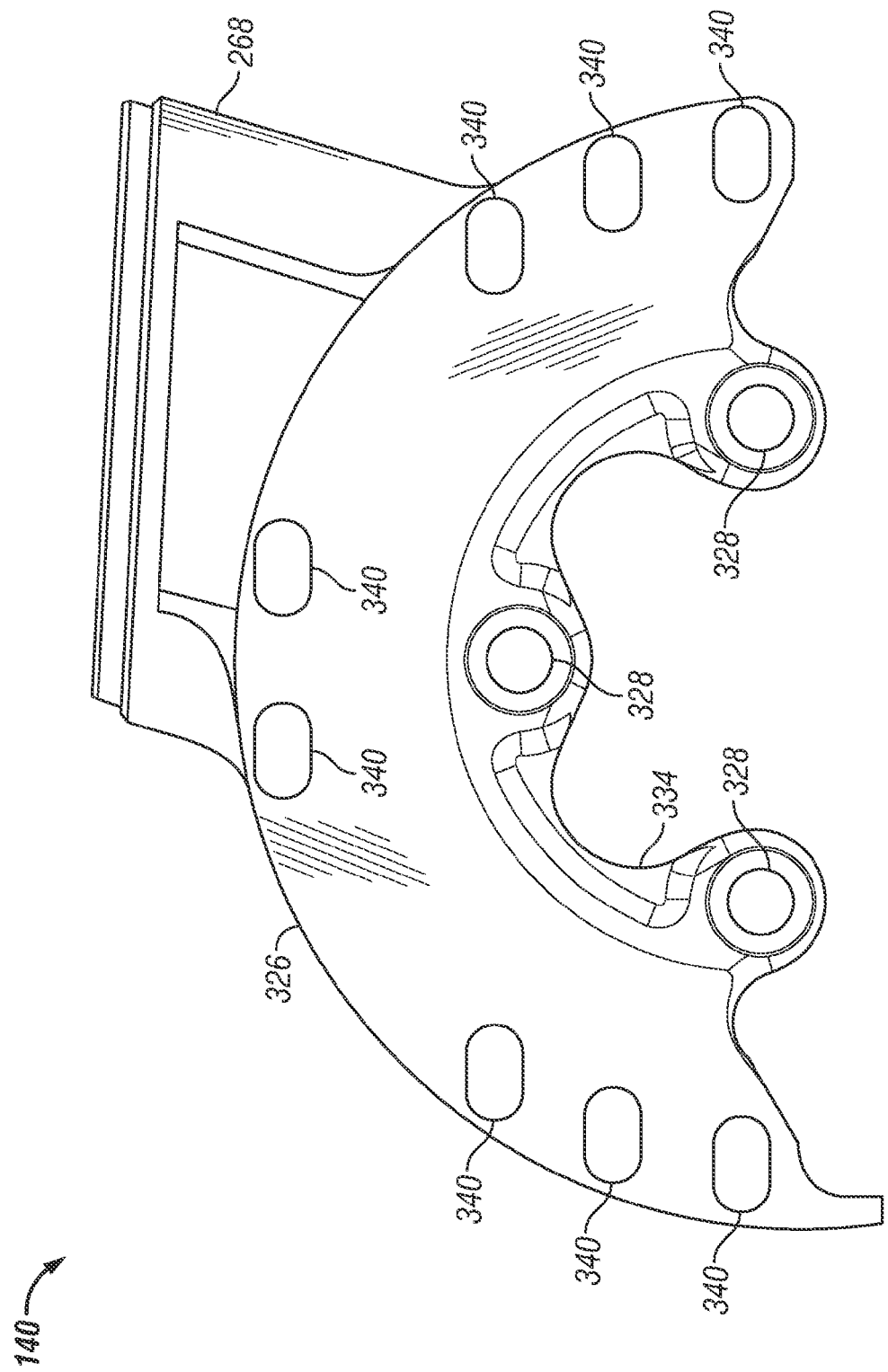
Figure 40:
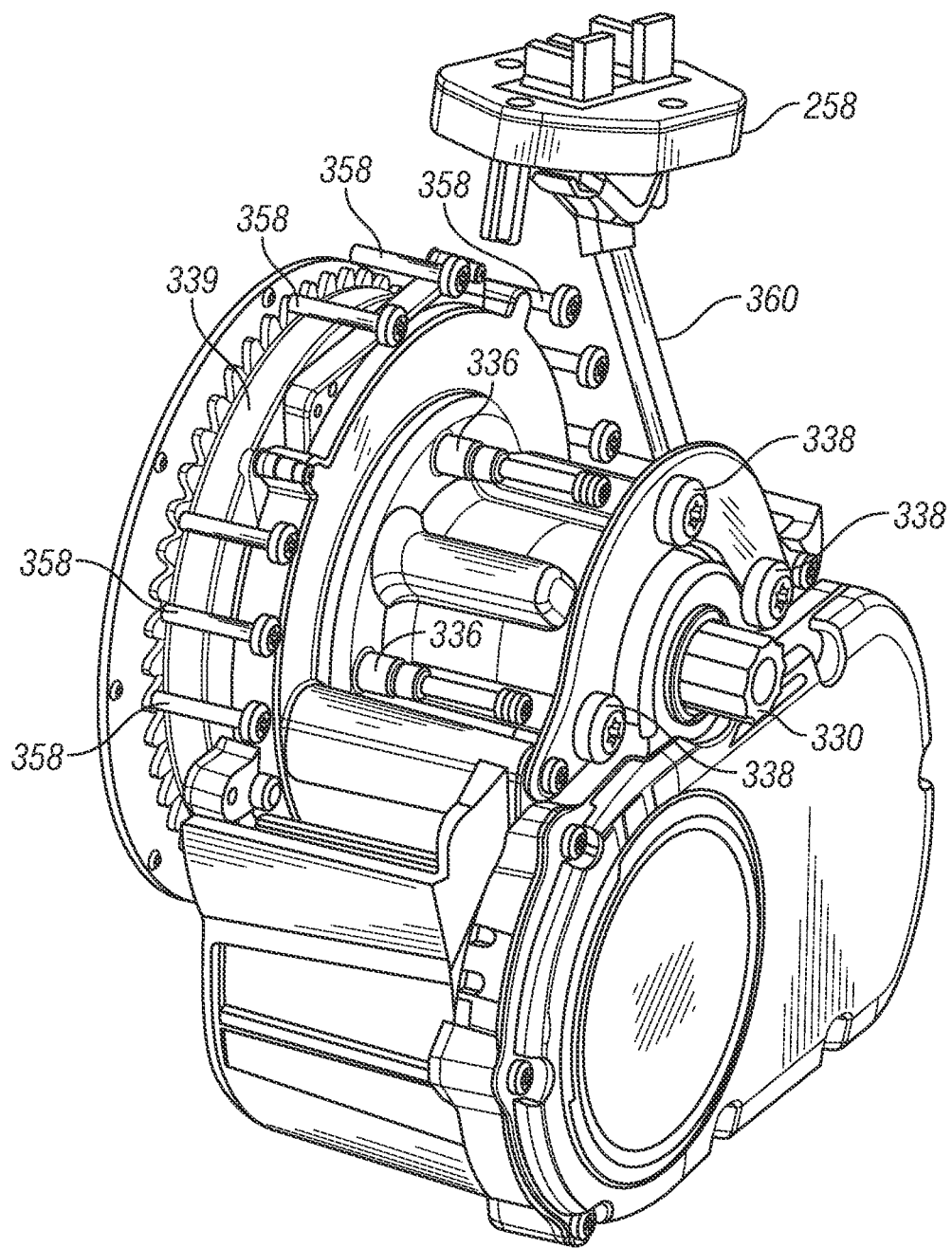
FIG. 40 is a perspective view of the motor assembly for the bicycle of FIG. 1.
Figure 41:
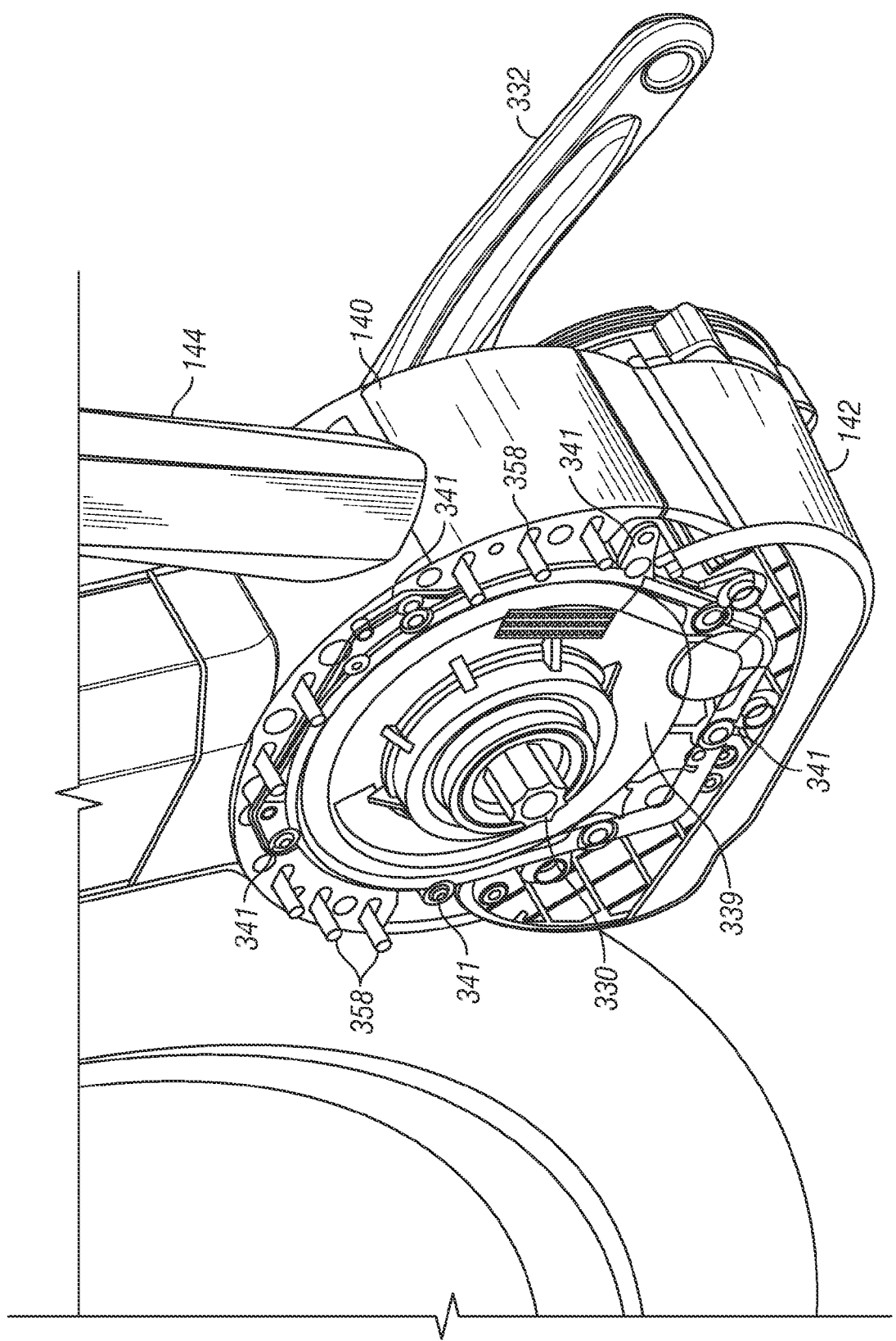
FIG. 41 is a partial perspective view of the motor assembly and bottom bracket for the bicycle of FIG. 1.
Figure 42:
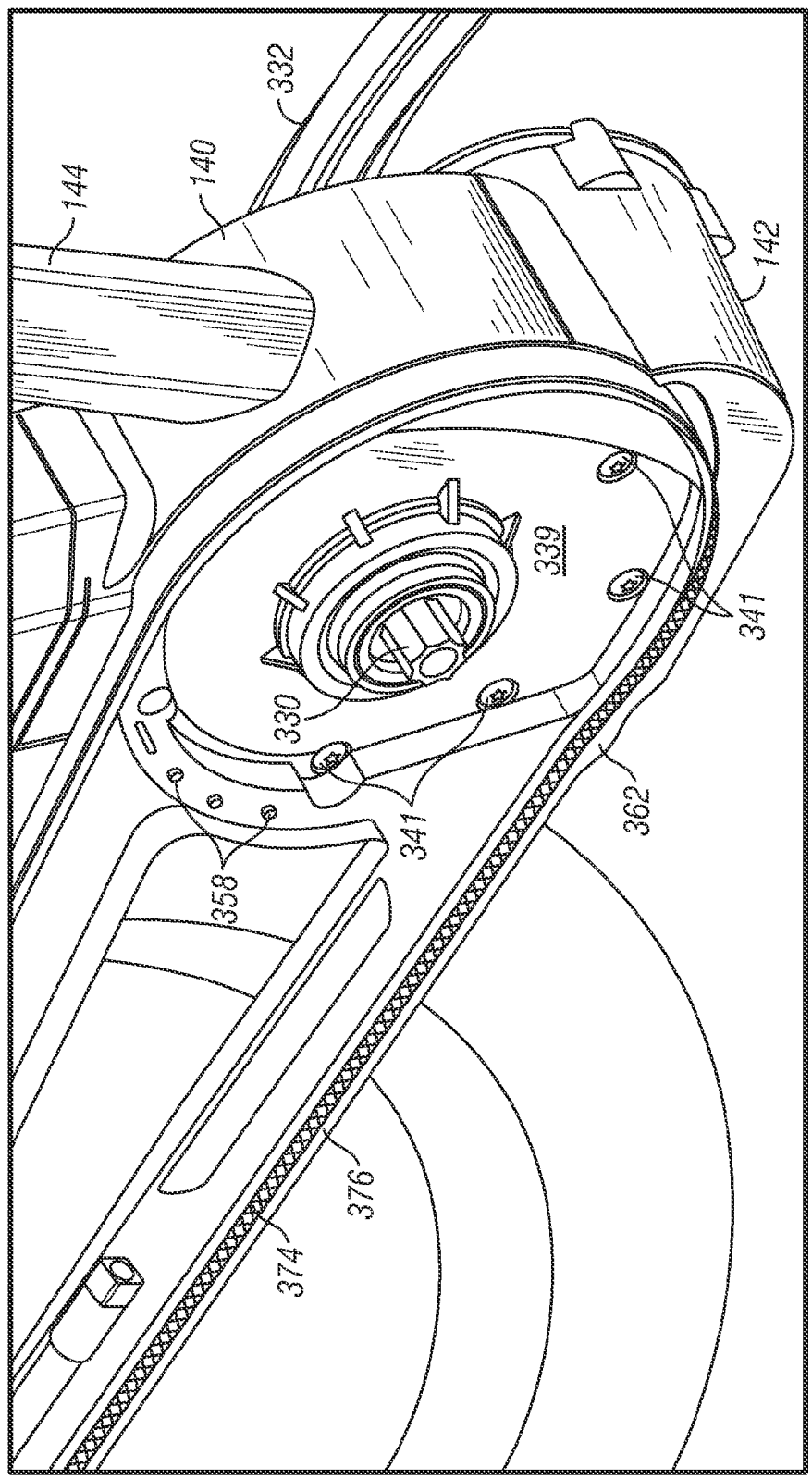
FIG. 42 is a partial perspective view of the chain case and bottom bracket for the bicycle of FIG. 1.

In one embodiment, the conduits 175 terminate on an opposite end from the projection 177 adjacent the bottom bracket 140. The cables 184, 179, 181 enter the bottom bracket via an opening 327 (FIG. 38A). From opening 327, the brake and shifter cables 183 are routed towards the rear wheel 106 and along the chain case to their final terminations. The conduits 175 may be made from a suitable metal, such as aluminum or copper, which provides the desired heat resistance to withstand the welding of frame 102 and the desired ductility.

Figure 10A:
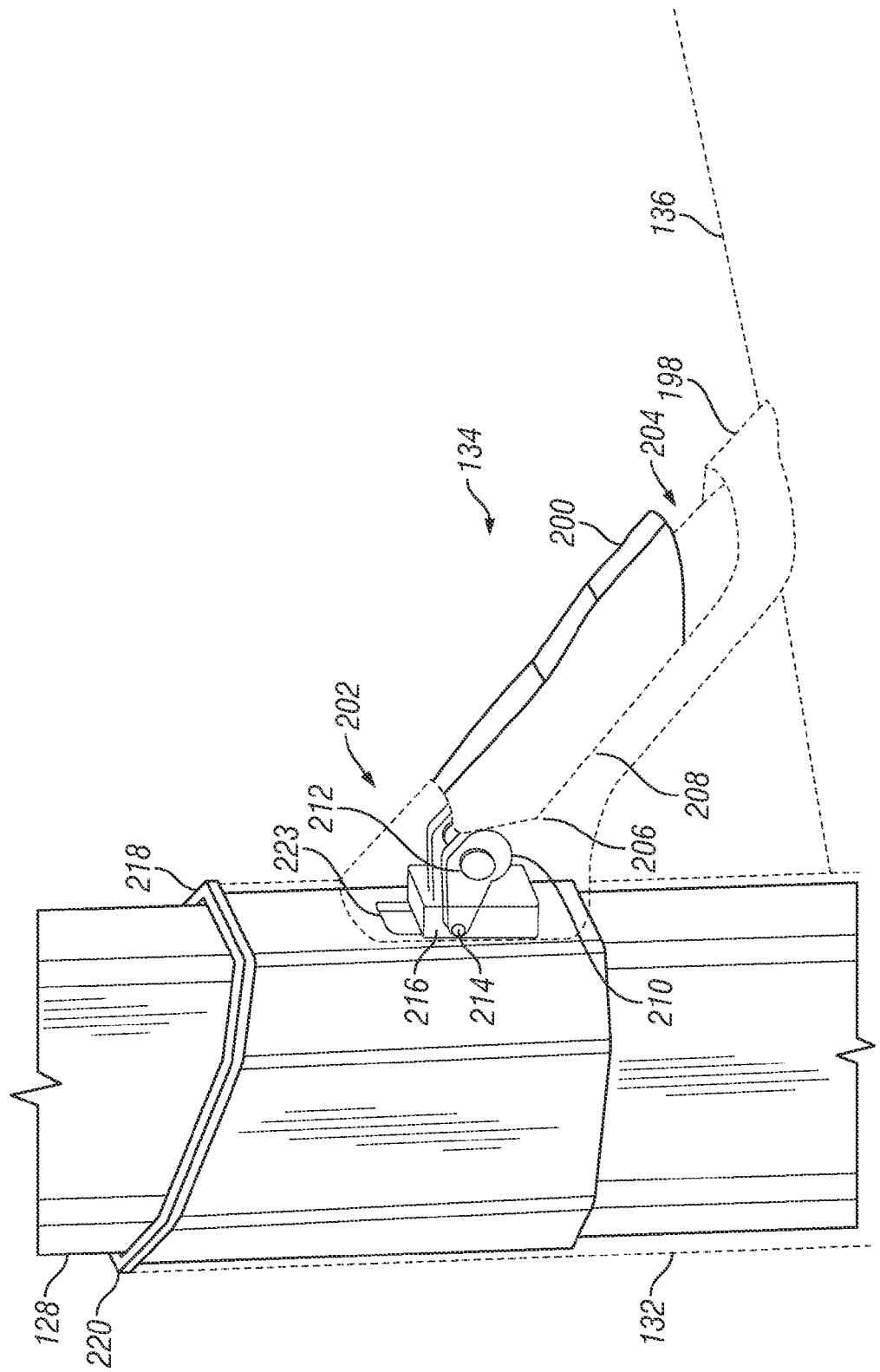
FIG. 10A is a partial perspective view of an embodiment of a seat clamp for the bicycle of FIG. 1.
Figure 10B:
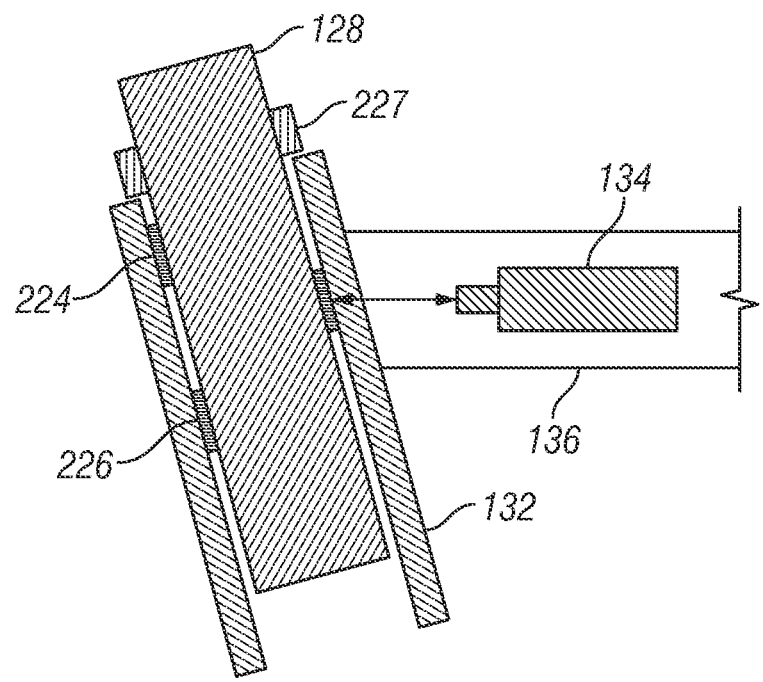
FIG. 10B is a schematic side view of another embodiment of a seat clamp for the bicycle of FIG. 1.
Figure 11:
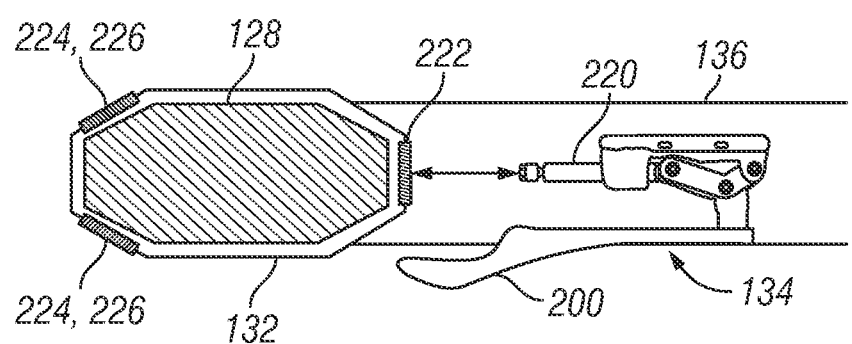
FIG. 11 is a schematic top view of the seat clamp of FIG. 10B.
Figure 12:
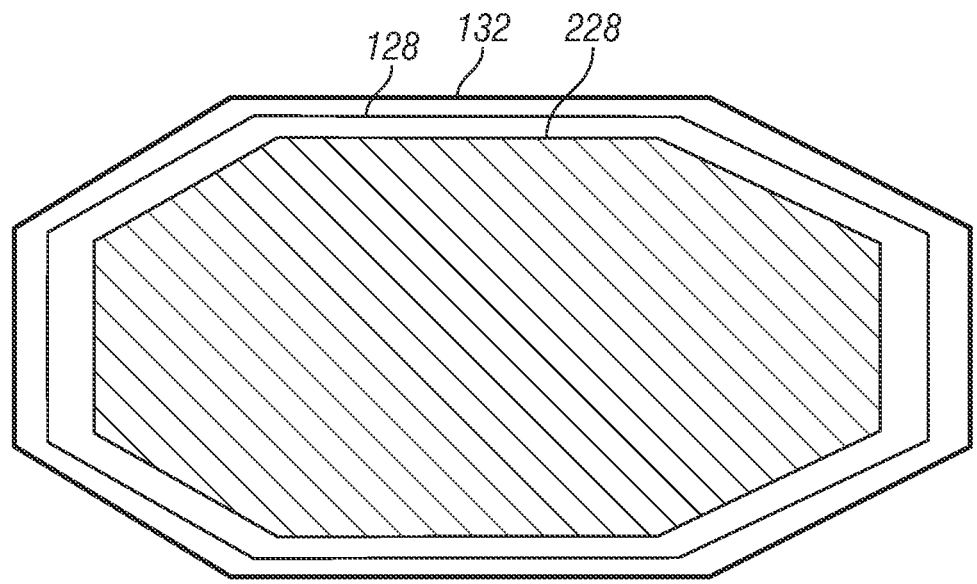
FIG. 12 is a partial cross-sectional view of the seat tube of the bicycle of FIG. 1.

Referring now to FIGS. 8-12 an exemplary embodiment of a seating arrangement is shown. The bicycle 100 includes a seat tube 130 that is sized to receive a seat post 128. In the exemplary embodiment, the seat tube 130 and post 128 are an elongated octagonal shape (FIG. 12). As will be discussed in more detail below, in one embodiment the elongated seat post 128 is sized to receive a battery for powering the motor 142. It should be appreciated that while embodiments herein describe the seat tube 132 as being octagonal, the claimed invention should not be so limited and the seat tube 132 may be round, square, hexagonal, or rectangular for example. The seat post 12 includes a recessed portion 188 on one end. Within the recessed portion 188, a clamping member 190 is arranged and adapted to couple with rails 192 on the seat 130. By loosening the clamping member 190, the position of the seat 130 may slide along the rails 192 and adjusted as desired by the rider. In the exemplary embodiment, the distance 194 between a centerline 196 of the seat post 128 and the location of the clamping member 190 is 30% of the width of the seating post 128. It has been found that with an elongated seat tube 130, that a 30% offset from the centerline 196 reduces the interference between the rider's legs and the seat tube 130 while pedaling to provide advantages in pedaling efficiency and rider comfort.

The seat post 128 is sized to fit and translate freely within the seat tube 133 to allow the adjustability of the height of seat 130. Once the rider positions the seat 130 at the desired height, a clamp 134 holds the seat 130 in position. In one embodiment, illustrated in FIG. 10A, the clamp 130 is coupled to a frame member 198 that extends between the frame member 136 and the seat tube 132. The clamp 134 includes a lever 200 coupled to a mechanism assembly 202. The lever 200 is sized to fit within a recess 204 in member 198 and has an outer surface that substantially conforms to the outer surface of member 198 to provide a generally smooth outer surface when the lever is in the closed or locked position.

The mechanism assembly 202 includes clamp arm 206 that has first portion 208 and a second portion 210. The clamp arm 206 is configured to rotate about a pivot 212 in response to the rotation of the lever 200. As the second portion 210 rotates, a clamp bearing 214 coupled to a pad 216 moves into or out of contact with the seat post 128. It should appreciated that the clamping force applied by the pad 216 pushes the seat post against the seat tube 132 and is of a suitable magnitude to for maintain the seat 130 in the desired position under the riders weight and riding conditions. In one embodiment, the pad 216 and the seat post 128 have corresponding serrated surfaces that cooperate to inhibit slippage of the seat post 128 when the clamp is locked. In another embodiment, a sleeve 218 is arranged in the top of the seat tube 132. The sleeve 218 includes a lip 220 that is arranged over the top of the seat tube 132 that engages the tope of the seat tube 132 and prevents the sleeve 218 from sliding into the seat tube 132. The sleeve 218 further includes an opening 223 that allows the pad 216 to engage the seat post 128. The sleeve 218 may be made from a low friction material, such as a plastic, composite, or a coated metal for example. The low friction sleeve 218 provides advantages in eliminating or reducing the need for grease. The sleeve 218 provides further advantages in protecting the seat post 128, the seat tube 132, and battery from being damaged during assembly and disassembly.

In some embodiments, the clamp may include a locking mechanism that is movable between a locked position and an unlocked position to secure and release the clamp from the engaged position. In one embodiment, the clamp may include features that allow an external lock to be coupled to the clamp.

In another embodiment of a clamp 134 for the bicycle 100 is illustrated in FIG. 10B and FIG. 11. In this embodiment, the clamp 134 is arranged in the frame member 136. The clamp 134 includes a handle 200 coupled to a mechanism assembly 202. The handle 200 is disposed within a recess 204 and the outer surface of the handle 200 is substantially contiguous with the surface of the frame member 198. The mechanism assembly 202 includes a plunger 220 that movable between a first open or disengaged position to a second locked or engaged position wherein the plunger 220 engages a first pad 222. The first pad 222 is oriented on a surface of the seat post 128 that is substantially perpendicular to the longitudinal axis of the plunger 220. The engagement of the plunger 220 on the first pad 222 moves the seat post 128 away from the clamp 134 and into engagement with a set of four pads 224, 226 to provide five points of contact in the clamping of the seat post 128. In one embodiment, the pads 224, 226 are arranged on surfaces that are angled relative to the first pad 222 and are vertically spaced apart from the line of force defined by the plunger 220. The arrangement of the pads 224, 226 provide advantages in maintaining the seat post 128 centered within the seat tube 132. It should be appreciated that in other embodiments, the pads 224, 226 may be arranged on other surfaces, such as a surface parallel to first pad 222. Further, in other embodiments, the clamping arrangement may have a single pad 224 arranged opposite the first pad 222. In one embodiment, the pads 222, 224, 226 are formed from a stamped sheet metal material. In another embodiment, a collar 227 is arranged on the seat post 128 adjacent the seat tube 132. The collar 227 provides a shield to minimize the migration of environmental contaminants into the seat tube 132. In one embodiment, the collar 227 may be movably attached to the seat post 128 to provide a stop so that the seat 130 may be repeatedly set to the same position when removing and inserting the seat post 128.

In one embodiment, the bicycle 100 is an electrically assisted bicycle or e-bike that includes a motor 142. In the exemplary embodiment, the motor 142 is mounted to the bottom bracket 140 and coupled provide assistance to the rider while pedaling. The motor 142 is powered by a battery 228. It should be appreciated that it is desirable to provide a battery that provides a high level of energy storage and arranged in an aesthetically desirable manner. In one embodiment, the battery 228 is arranged within one or more members of frame 102. In another embodiment, the battery 228 is arranged within a frame of a rack 304 (FIG. 32) coupled adjacent the seat 130. The arrangement of the battery 228 within the frame 102 or a rack frame 304 protects the battery 228 from environment effects, such as water for example, while also concealing the battery 228 to provide a more desirable appearance.

Figure 13:
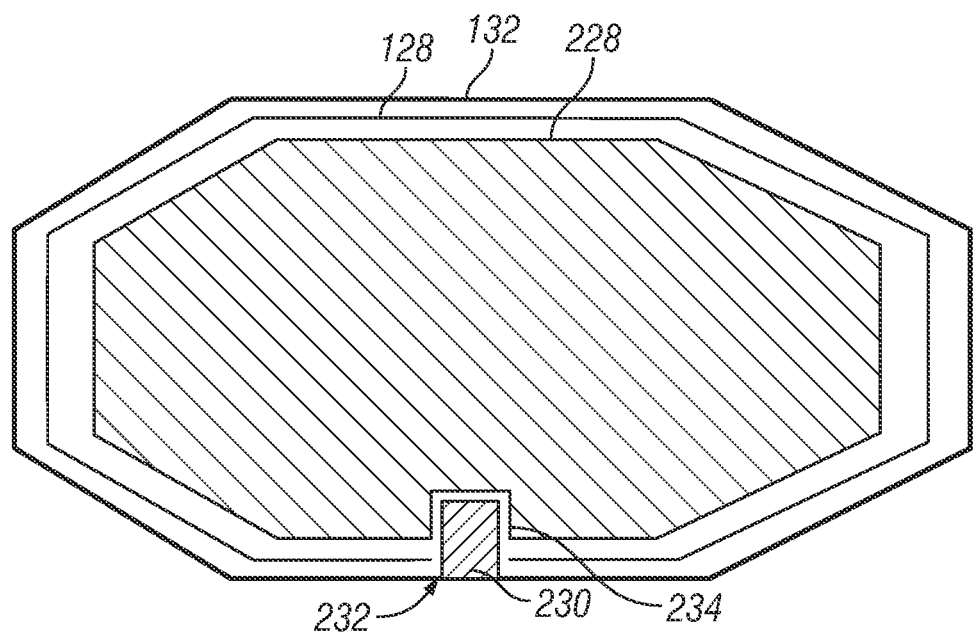
FIG. 13 is a partial cross-sectional view of another embodiment of a seat tube for the bicycle of FIG. 1.
Figure 14:
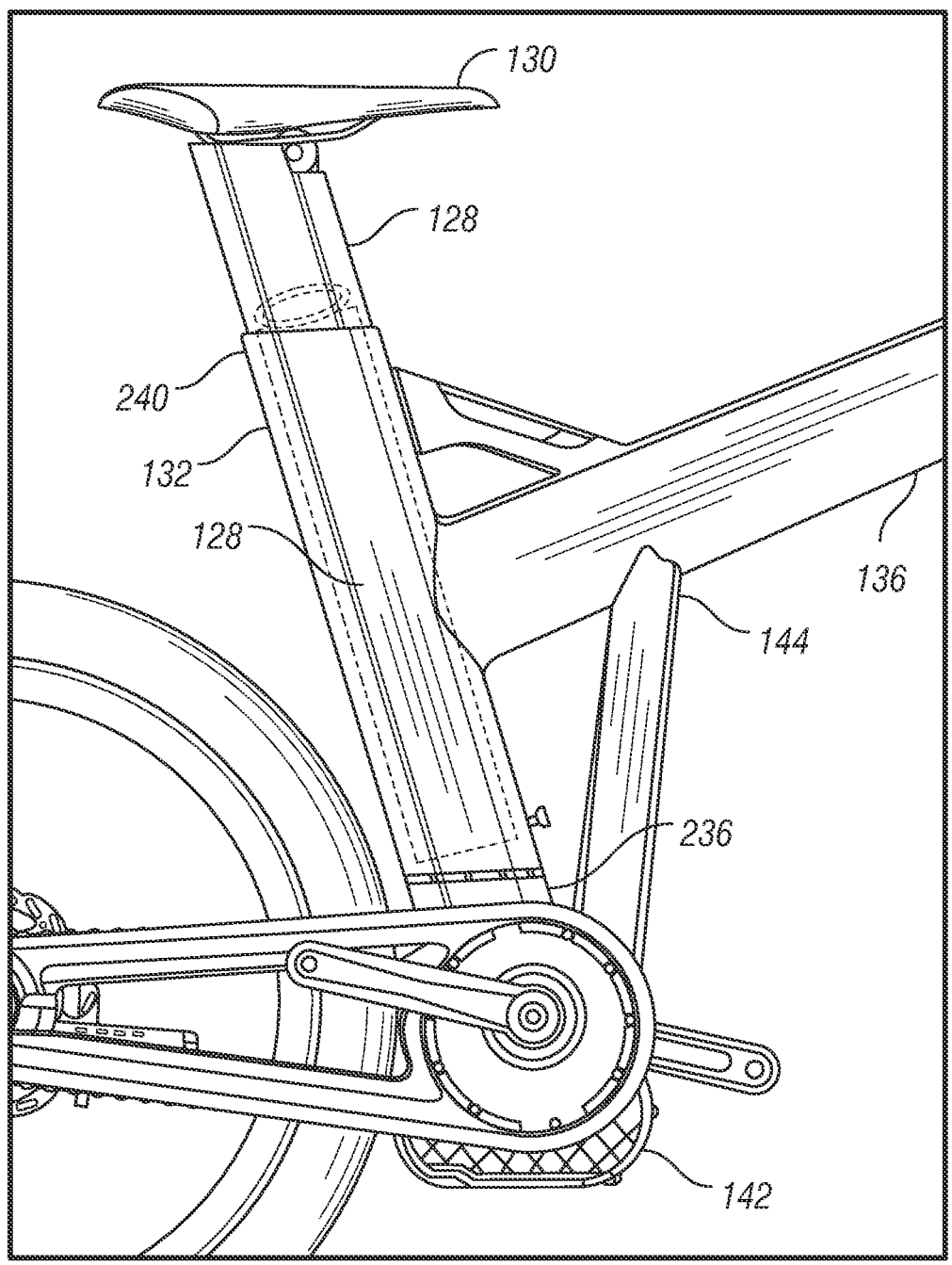
FIG. 14 is a partial side view of the bicycle of FIG. 1.
Figure 15:
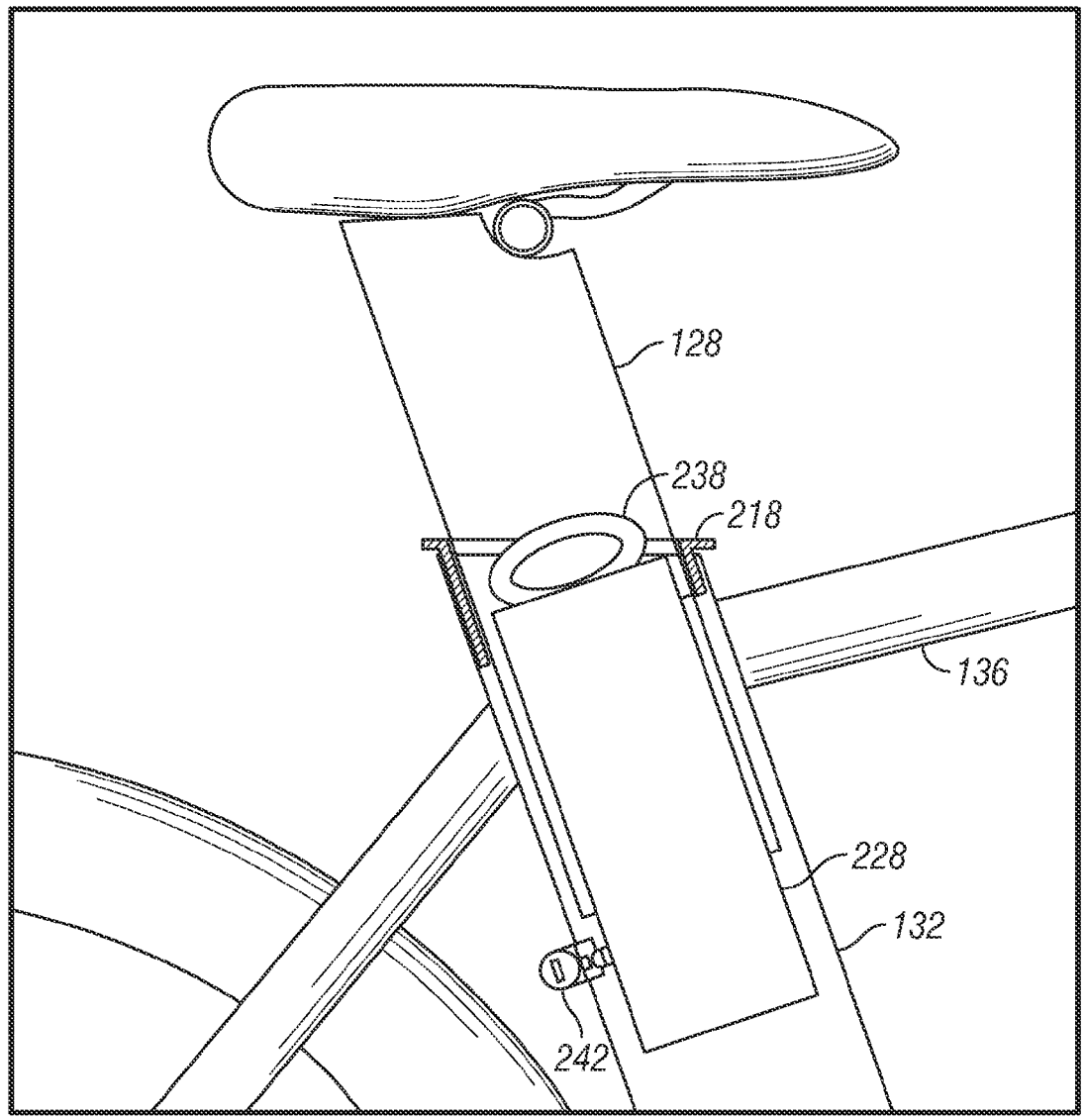
FIG. 15 is a partial side view of another embodiment of a seat tube assembly for the bicycle of FIG. 1.

Referring now to FIGS. 12-16, embodiments of a battery 228 arranged in the seat tube 132 is shown. In the exemplary embodiment, the battery 228 is coupled to a connector 258 (FIG. 19) arranged at an end 236 of the seat tube 132 opposite the seat 130. The seat post 128 has an opening on one end and a substantially hollow interior. The opening is sized to fit over the battery 228 such that the seat post 128 is arranged between the battery 228 and the seat tube 132 when installed on the frame 102. In one embodiment, the seat tube 132 includes a key 230. The key 230 cooperates with a slot 232 in the seat post 128 and a keyway 234 in the battery 228 as shown in FIG. 13 to facilitate correct installation of the battery 228 and seat post 128. The battery 228 may include a handle 238 that is positioned adjacent an end 240 of seat tube 132. The battery 228, the handle 238 and the seat tube 132 are configured such that at least a portion of the handle 238 remains above, or adjacent to, the end 240 to facilitate removal of the battery 228 when the seat post 128 is removed.

As will be discussed further herein, the battery 228 may also be positioned within other frame 102 members of bicycle 100. In on embodiment, the battery 228 is arranged within down tube 144, frame member 136, or a rack frame member. In other embodiments, multiple batteries 228 are provided, with each battery 228 arranged in a different frame 102 member. These multiple batteries 228 may be electrically coupled in parallel or in series to provide increased capacity or power. In another embodiment one or more frame 102 members, such as down tube 144 for example, include a compartment for storing a spare battery 228. In one embodiment, the seat tube 132, the frame member 136 and/or the down tube 144 are configured with substantially the same cross sectional shape to allow the same battery 228 to be utilized in each of the frame members.

It should be appreciated that high energy density batteries, such as lithium ion batteries for example, may be costly. As such, it is desirable to secure the battery 228 to the bicycle 100 to inhibit theft. In one embodiment, the bicycle 100 includes a locking mechanism 242. The locking mechanism 242 cooperates with a member 244, such as a spring loaded detent for example, on the battery 228. The member 244 is in a first retracted position as the battery 228 slides into seat tube 132. As the member 244 passes an opening in a frame 246. Since the member 244 is captured by the frame 246 preventing the battery 228 from being removed from the seat tube 132. In one embodiment, the locking mechanism 242 includes a plunger 248 that moves to push or retract the detent member 244 in response to the activation of locking mechanism 242 by a key. With the detent member 244 retracted, the battery 228 may be removed. It should be appreciated that other locking mechanisms may also be utilized. Further, the locking mechanism 242 may be arranged in other positions along the seat tube 132.

Figure 16A:
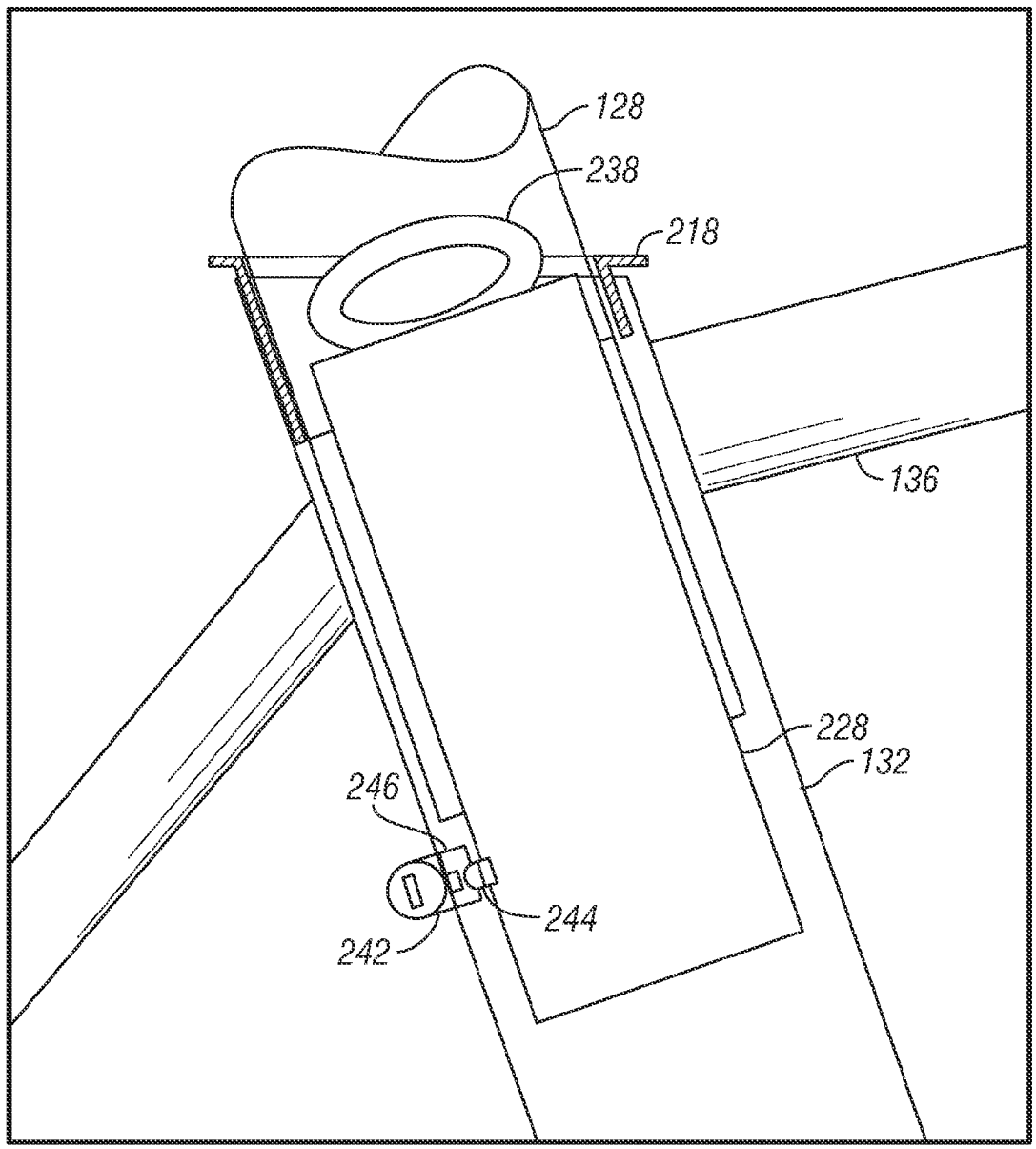
FIG. 16 is a partial side view of a battery locking arrangement for the bicycle of FIG. 1.

Another embodiment of locking mechanism 242 is illustrated in FIG. 16A. In this embodiment, a plunger 243 is coupled to extend through an opening in the seat tube 132. A biasing member, such as spring 245 for example, is coupled to the plunger 243 to bias the plunger 243 into the seat tube 132. The plunger has a body 247 that engages a hole or a recess 249 in the battery 228. As the battery 228 is inserted into the seat tube 132, the battery 228 engages the body 247 causing the spring 245 to compress. As the battery 228 continues to be inserted, the body 247 under the biasing forces of spring 245 causes the body 247 to move into the recess 249. Once the body 247 is positioned within the recess 249, the battery 228 is locked in place. To remove the battery 228, the rider pulls the plunger 243 to compress the spring 245. Once the body 247 is clear of the recess 249, the battery 228 may be removed. It should be appreciated that the locking mechanism 242 of FIG. 16A does not provide security for the battery 228, but rather maintains the battery 228 in the desired location under riding conditions.

Figure 16B:
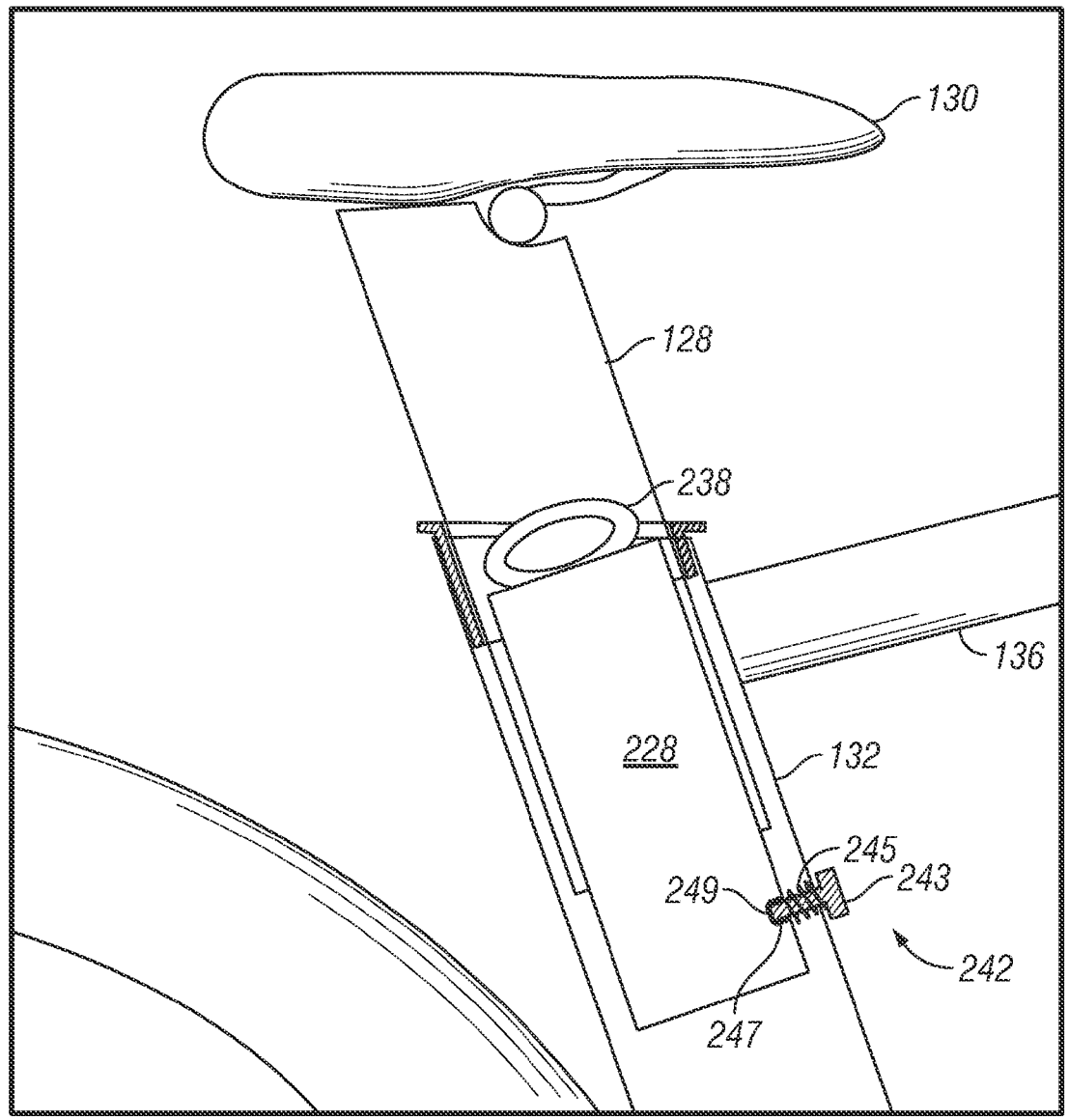

Another embodiment of locking mechanism 242 is illustrated in FIG. 16B. In this embodiment, the locking mechanism 242 is integrated into the clamp 134. The locking mechanism includes a lock cylinder 251 that engages the mechanism assembly 202 and the handle 200 to prevent the handle 200 from disengaging the clamp 134 while the locking mechanism is locked. The locking mechanism includes a clamp pad 216 that operably engages both the seat post 128 and the battery 228 when the clamp 134 is engaged. When the rider inserts and rotates a key within the lock cylinder 251 to release the clamping mechanism 134. With the clamping mechanism disengaged, the handle 200 may be rotated to release the battery and the seat post 128. This embodiment provides advantages in that the seat 130, the seat post 128 and the battery 228 may be secured or released with a single mechanism.

Figure 16C:
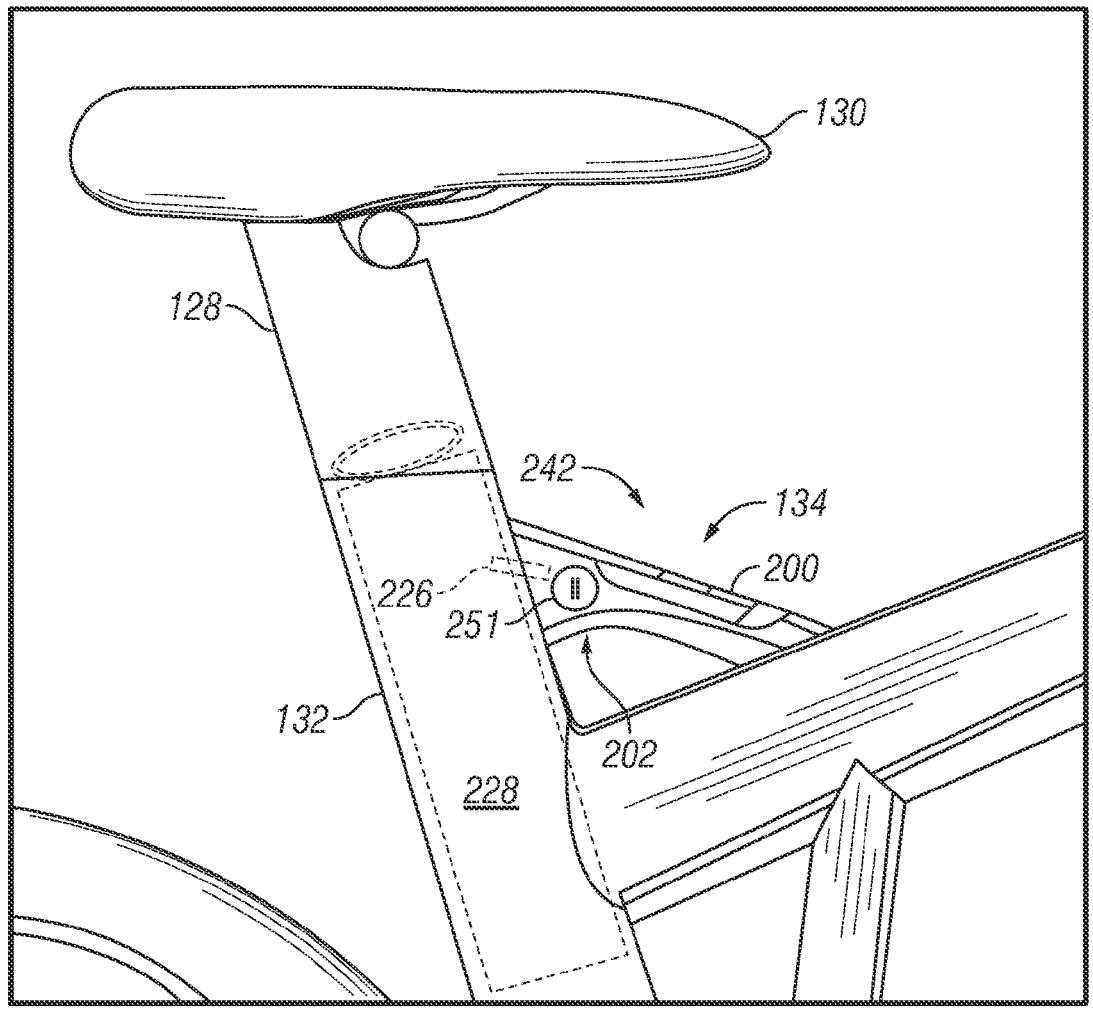
Figure 16D:
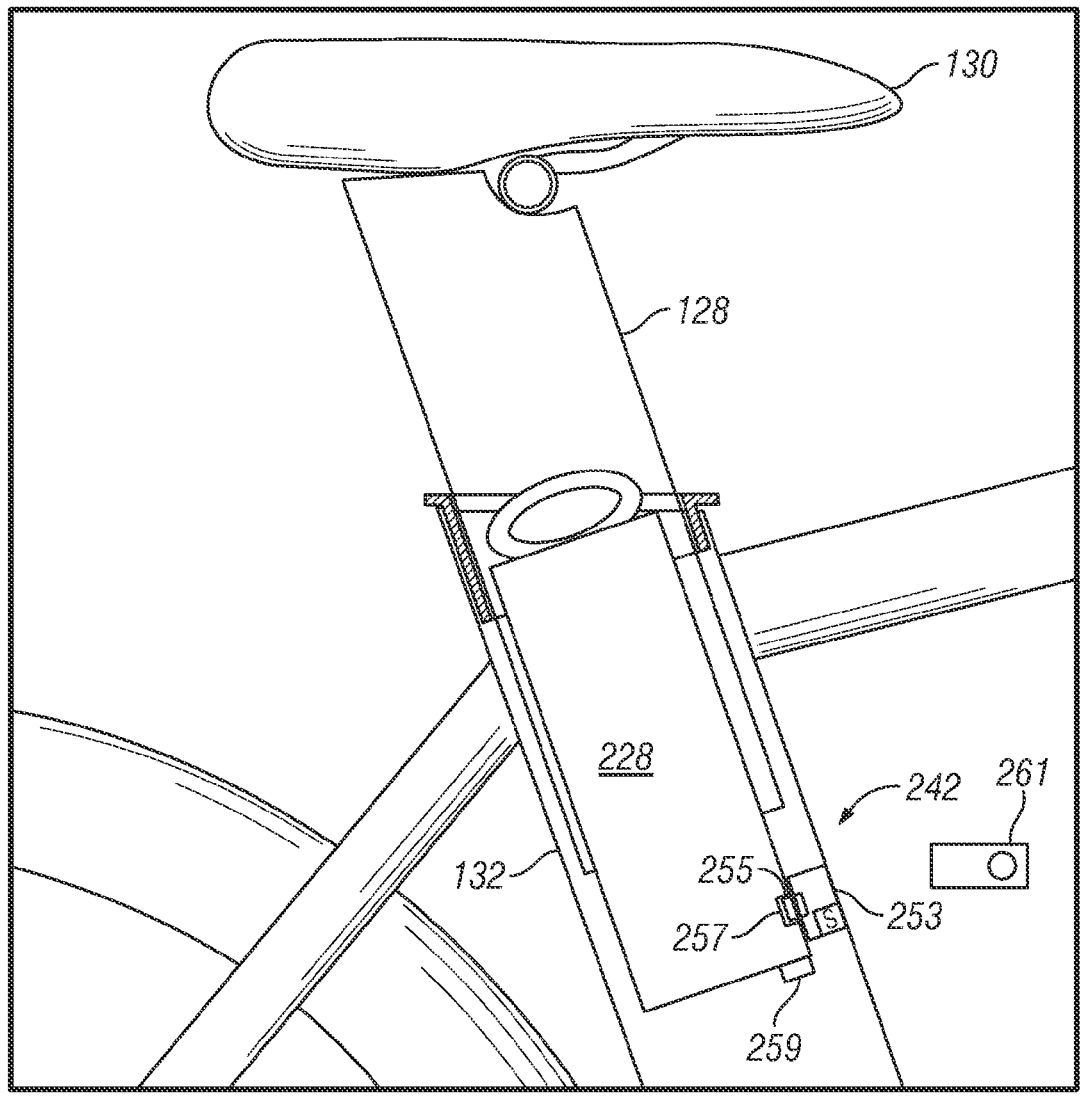

Yet another embodiment of locking mechanism 242 is illustrated in FIG. 16C. In this embodiment, the locking mechanism 242 includes a solenoid 253 with a plunger 255 biased towards the battery 228. The plunger 255 engages a hole or recess 257 in the battery 228 to retain the battery 228 within the seat tube 132. In one embodiment, the solenoid 253 is a "normally open" type of solenoid, meaning that the plunger 255 is in a retracted position (e.g. not engaging recess 257) and that the solenoid 253 is energized to extend the plunger 255 into the recess 257. An optional sensor or switch 259 provides a means for determining when the battery 228 is in position and the solenoid 253 may be energized. This prevents the battery 228 from being locked in the seat tube 132 in the event of energy loss. In another embodiment, the solenoid 253 is a "normally closed" type of solenoid, meaning that the plunger is biased towards the recess 257 when the solenoid 253 is not energized. The plunger 255 in this embodiment engages the recess 257 in a substantially similar manner to that described above with respect to FIG. 16A. When a normally closed solenoid is used, the locking mechanism 242 may include an override feature (not shown) that allows the rider to manually retract the plunger 255 with a tool in the event of energy loss to prevent the battery 228 from being locked in the seat tube 132. In the exemplary embodiment, the locking mechanism 242 cooperates with a wireless key 261, such as a passive radio frequency identification (RFID) key for example, to unlock the locking mechanism 242.

Figure 17:
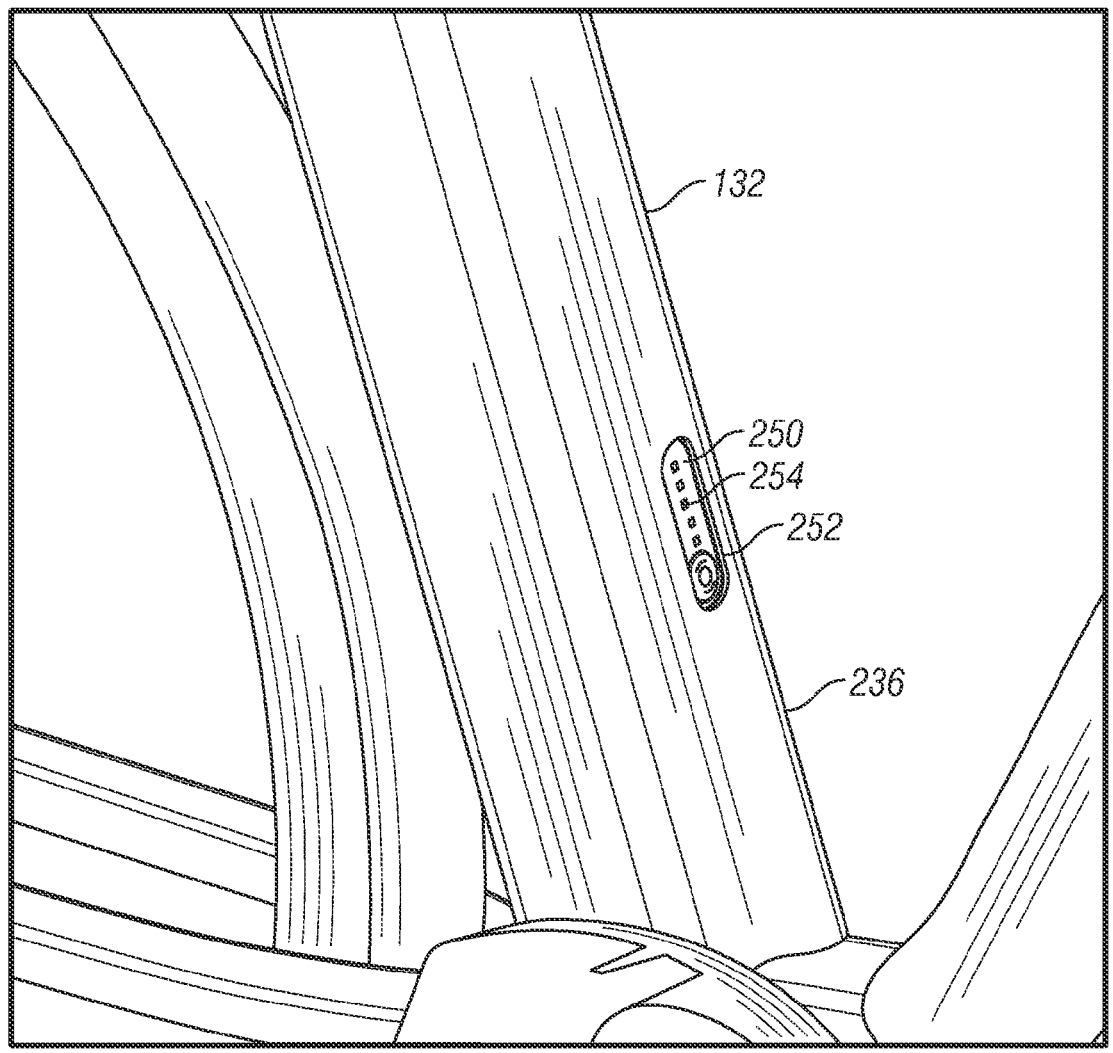
FIG. 17 is a partial perspective view of a battery meter for the bicycle of FIG. 1.
Figure 18:
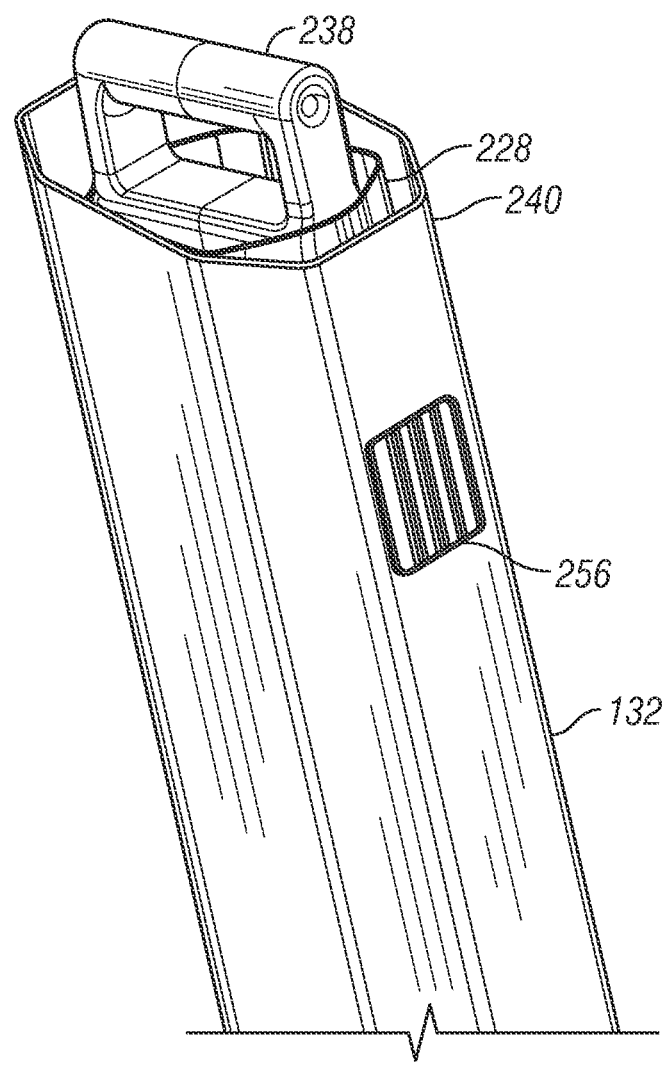
FIG. 18 is a partial perspective view of another battery meter for the bicycle of FIG. 1.
Figure 19:
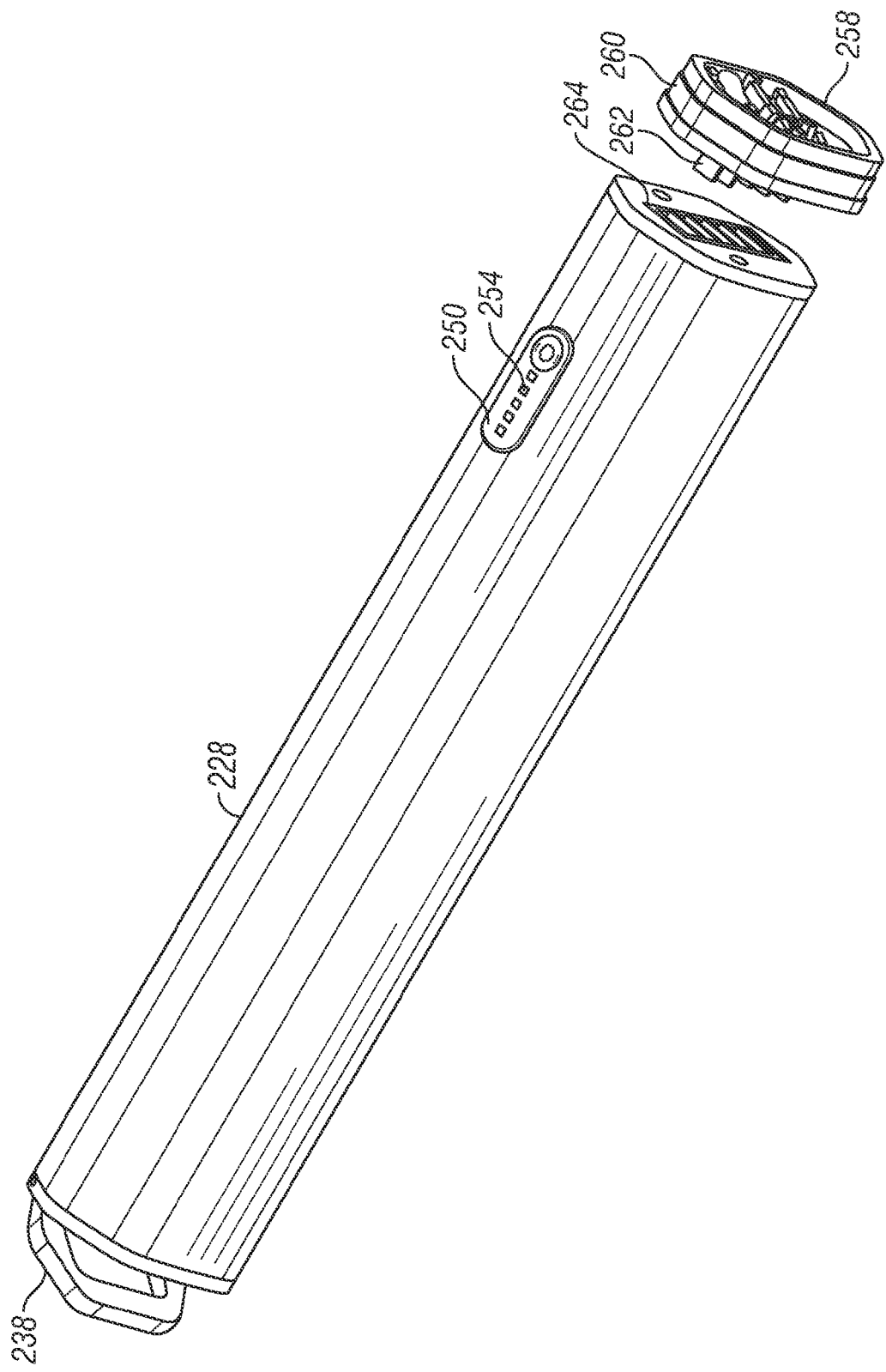
FIG. 19 is a perspective view of a battery for use with the bicycle of FIG. 1 in accordance with an embodiment of the invention.
Figure 20:
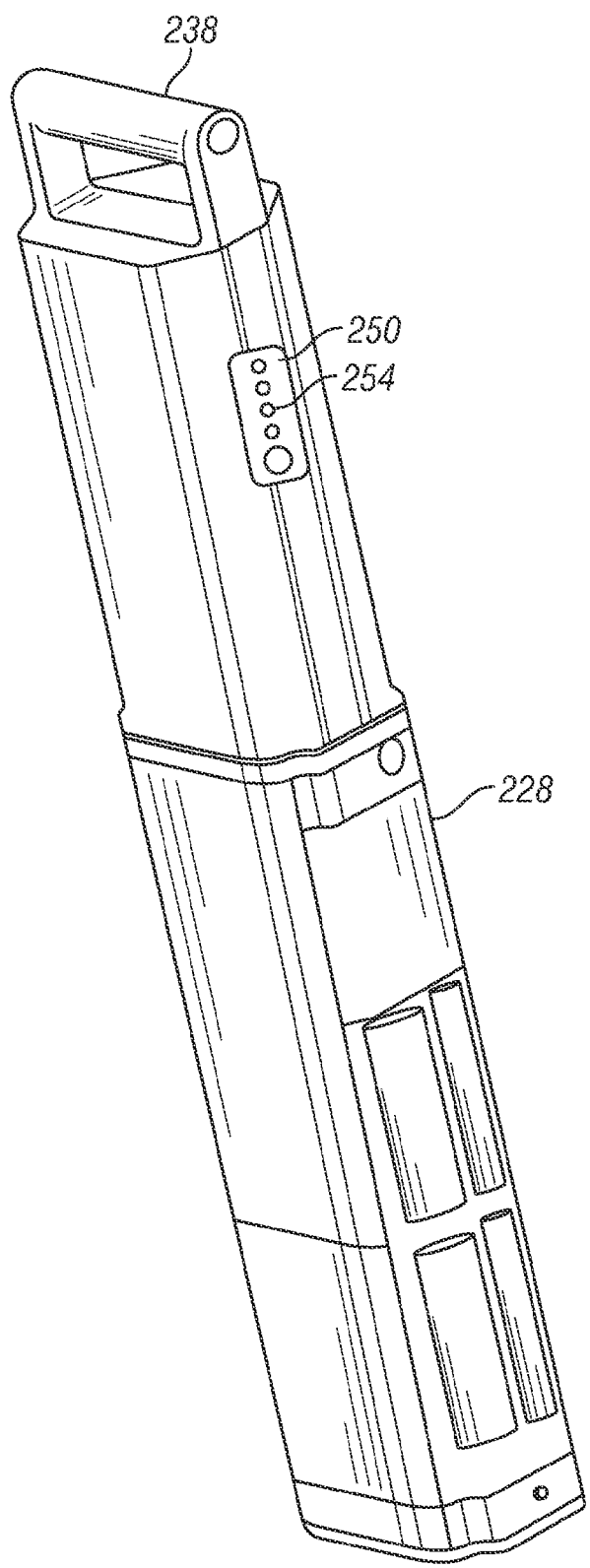
FIG. 20 is a perspective view of a battery for use with the bicycle of FIG. 1 in accordance with another embodiment of the invention.

It should be appreciated that it is desirable for the rider to know the level of charge in the battery 228. In one embodiment, the battery 228 includes a meter 250 that provides a visible indication of the level of charge remaining in the battery 228. The meter 250 may include a plurality of light emitting diodes 254 (LED's) that illuminate based on the level of charge. For example, when the battery 228 is fully charged, all of the LED's 254 are illuminated and as the battery becomes depleted, one or more LED's are deactivated. Thus with a quick glance, the rider may ascertain the level of charge. In one embodiment, the meter 250 is arranged adjacent end 236 and is viewable via an opening 252 in seat tube 132 as shown in FIG. 17 and FIG. 19. In another embodiment, the meter 250 is arranged adjacent end 240 and is viewable via an opening 256 as shown in FIG. 18 and FIG. 20.

In other embodiments, the meter 250 may be integrated into the user interfaces 126, 178 or into the handle bar 124, such as in the handle portion 160, 162.

As discussed herein above, the battery 228 is electrically coupled to the motor 142 via a connector 258. In one embodiment, the connector 258 includes a body portion 260 having a plurality of male terminals 262 arranged on one side (FIG. 19). The terminals 262 are electrically coupled to transfer electrical energy from the battery 228 to the motor 142. The terminals 262 are arranged to cooperate with a corresponding plurality of contacts 264 on one end of the battery 228. As discussed above, when the battery 228 is inserted into the seat tube 132, the contacts 264 engage the terminals 262 to electrically couple the battery 228 to the motor 142.

Figure 21:
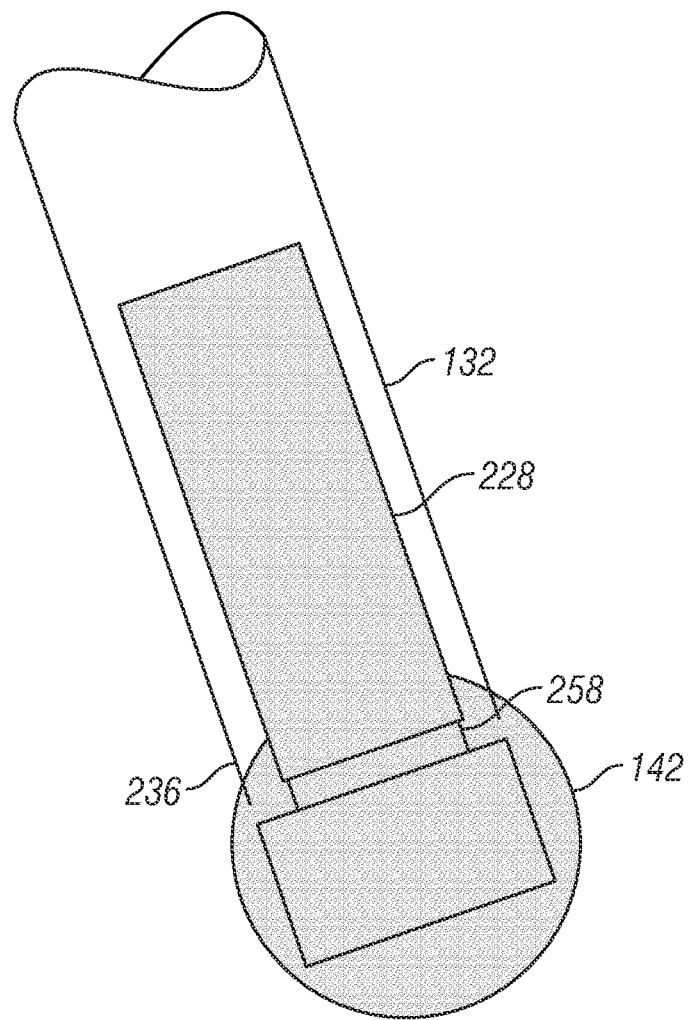
FIG. 21 is a schematic illustration of a battery connector arrangement in accordance with an embodiment of the invention.

The connector 258 may be arranged within the seat tube 132 in several different configurations. In the exemplary embodiment, the connector 258 is directly mounted to the motor 142 as shown in FIG. 21 and FIG. 24. The connector 258 extends through a projection 268 in the bottom bracket 140. After the motor 142 and connector 258 are assembled onto the bottom bracket 140, the seat tube 132 is joined to the projection 258 such as by welding for example. This embodiment provides advantages in increasing the reliability and decreasing costs by minimizing the number of wired connections.

Figure 22:
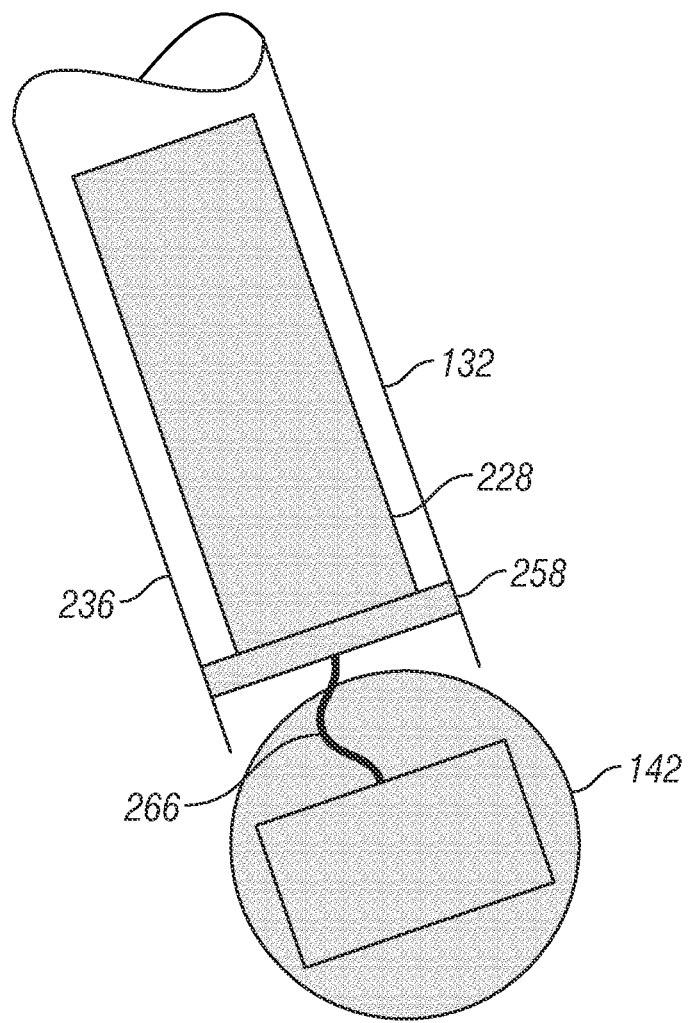
FIG. 22 is a schematic illustration of a battery connector arrangement in accordance with another embodiment of the invention.
Figure 23:
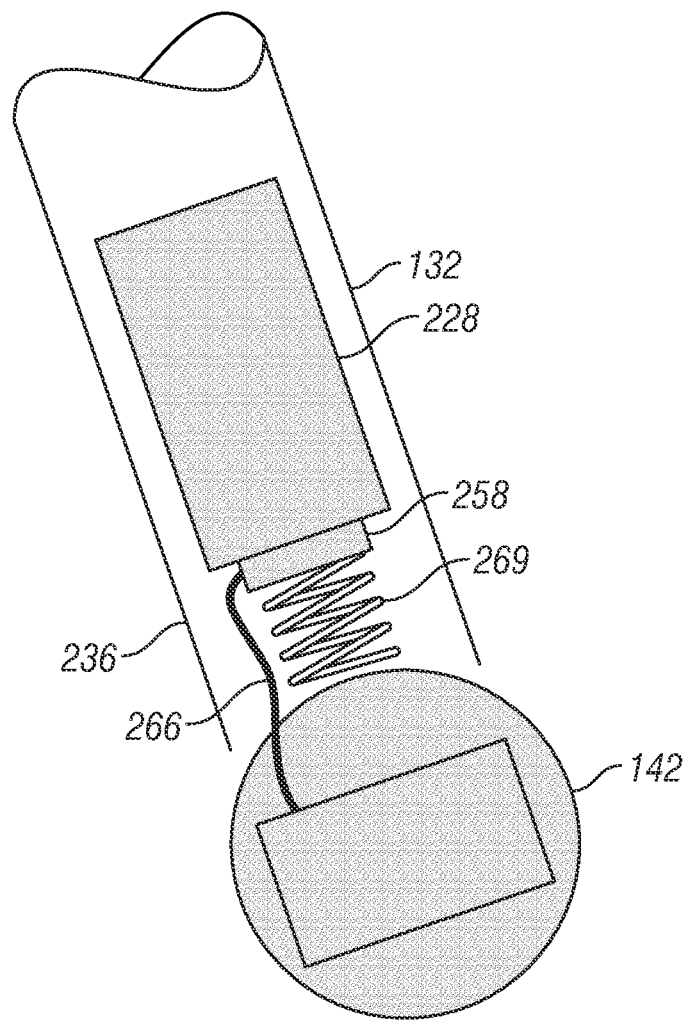
FIG. 23 is a schematic illustration of a battery connector arrangement in accordance with an embodiment of the invention.

In another embodiment, the connector 258 is fixedly mounted within the seat tube 132 and spaced apart from the motor 142 as shown in FIG. 22. The connector 258 is coupled to the motor 142 by a wired connection 266. The wired connection 266 may be in the form of a plurality of conductors with a terminal block on the end that couples to the connector 258. This embodiment provides advantages in providing a reliable and connection between the battery 228 and the motor 142 when the geometry of a particular bicycle style does not permit a direct connection. A third embodiment for mounting the connector 258 to bicycle 100 is shown in FIG. 23. In this embodiment, a biasing member such as spring 269 is arranged adjacent the end 236 of seat tube 132. One end of the spring 269 is fixedly mounted within the seat tube 132 with the connector 258 coupled to an opposite end. This arrangement allows the connector to float within the seat tube 132 and provides advantages in flexibility that may accommodate tolerance differences from unit to unit while maintaining a positive bias of the contact 258 against the battery 228.

Figure 24A:
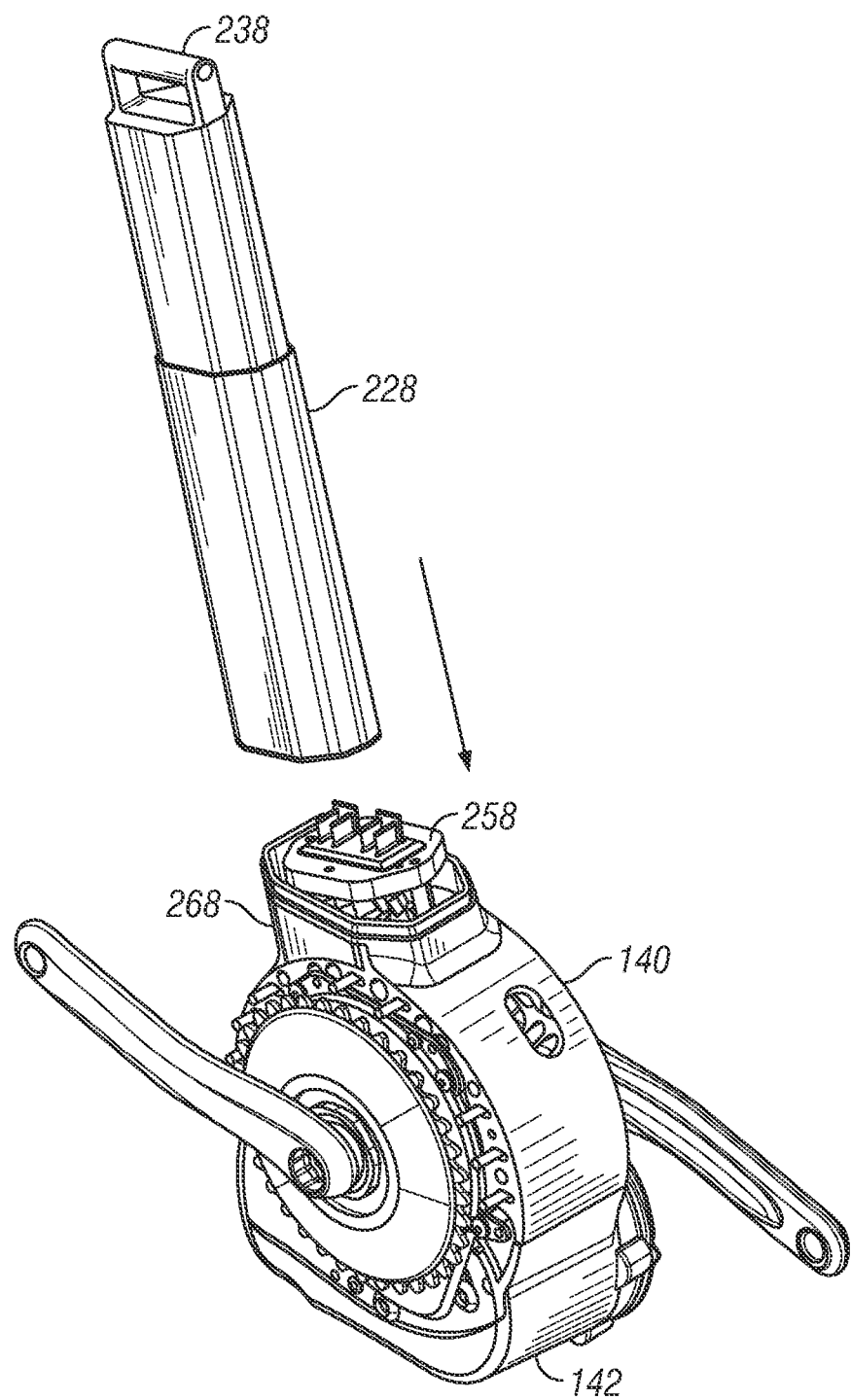
FIG. 24 is a partial exploded view of a battery being inserted onto a connector in accordance with one embodiment of the invention.
Figure 24B:
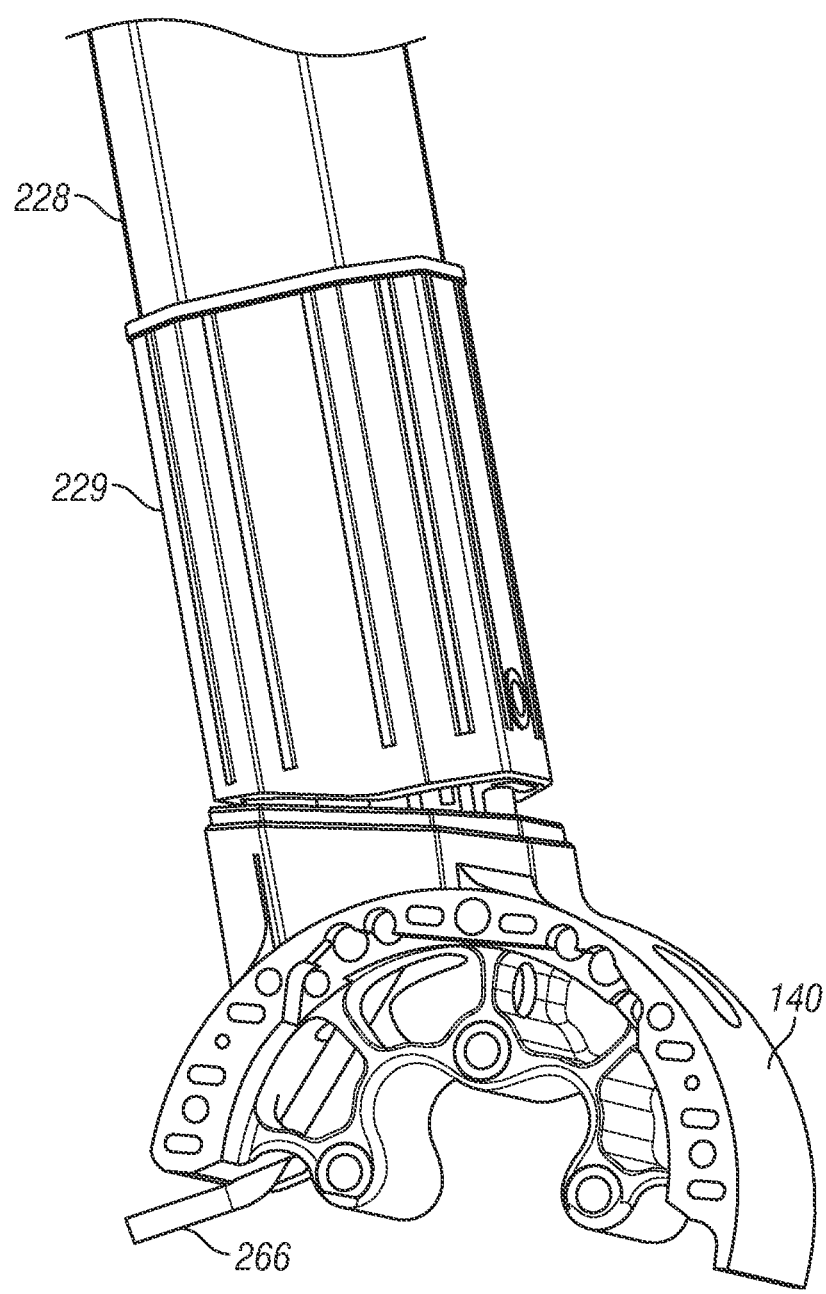
Figure 24C:
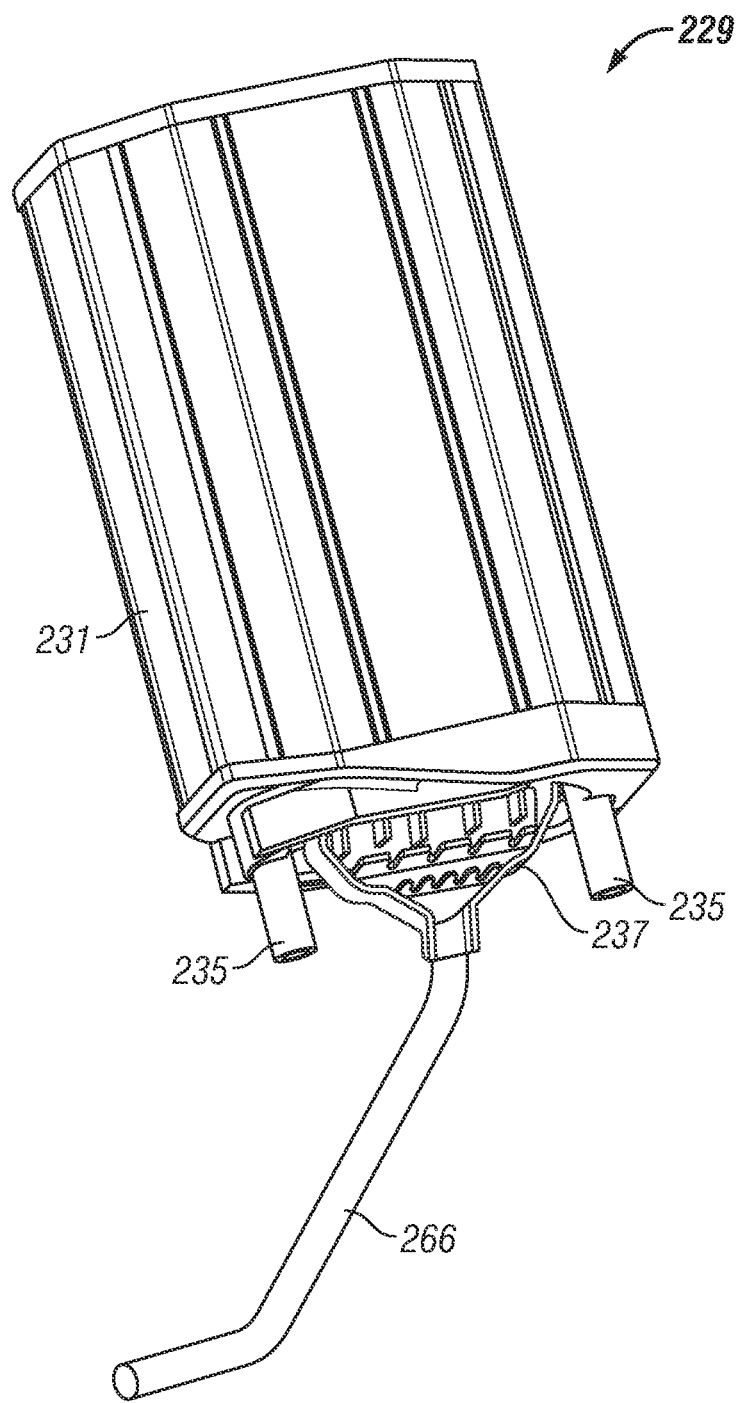
Figure 24D:
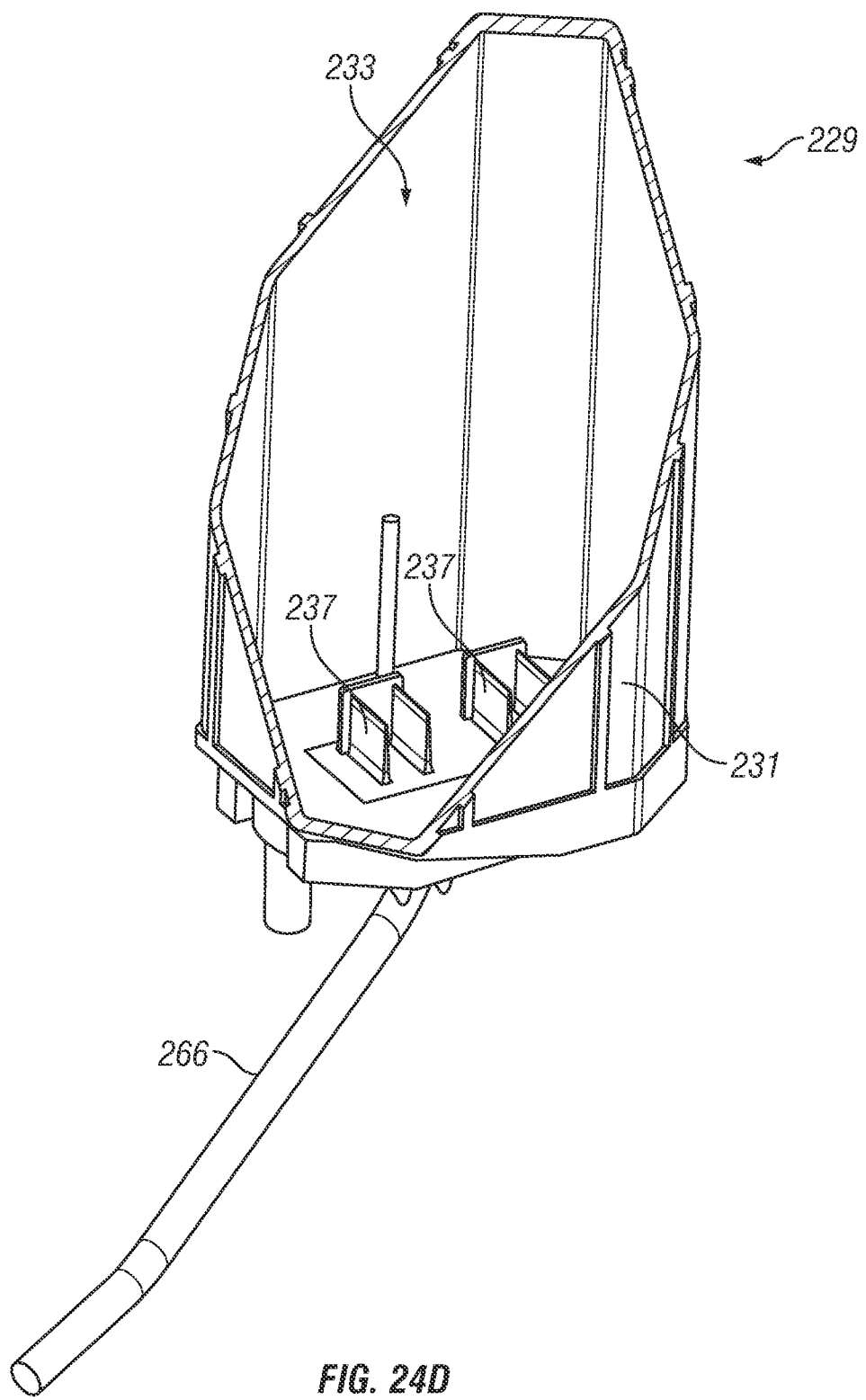

Referring now to FIGS. 24B-24D, another embodiment is shown of a connection arrangement having a sleeve 229 for coupling the battery 228 to the motor 142. A pair of pins 235 extend from the bottom of the sleeve 229 and engage a pair of openings (not shown) in the bottom bracket 140. In one embodiment, the pins 235 have a center bore that is sized to allow a bolt to extend therethrough to couple the sleeve 229 to the bottom bracket 140. The sleeve 229 includes a wall 231 that defines a hollow inner area 233 that is sized to receive the battery 228. A connector 237 extends through the bottom of the inner area 233 to allow the battery 228 to be electrically coupled to the wired connection 266. The sleeve 229 cooperates with the upper sleeve 218 in keeping the battery 228 aligned and provides advantages in allowing the seat post 128 to slide over the batter 228.

Figure 25A:
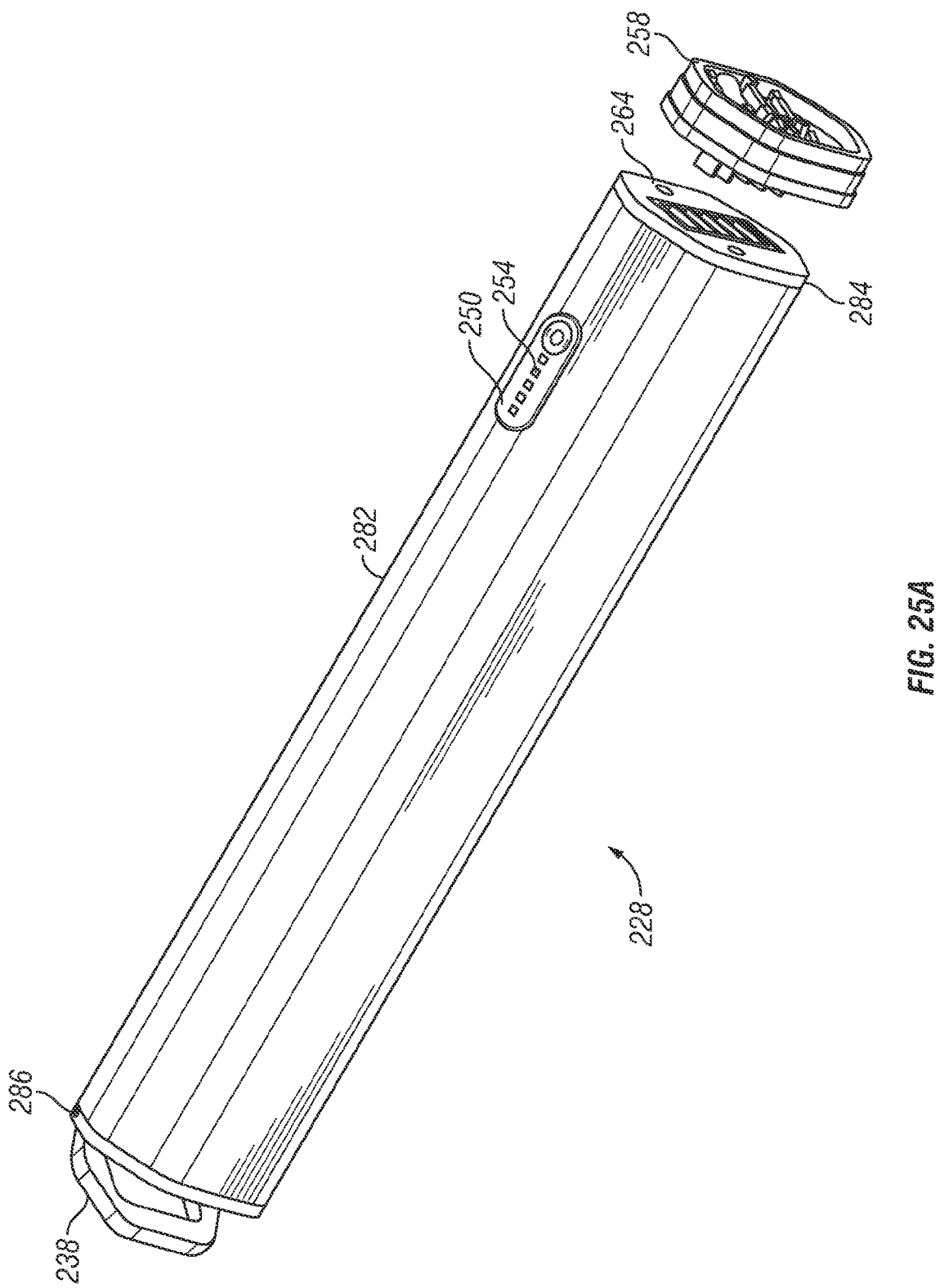
FIG. 25A-26 are a partial perspective view illustration a battery in accordance with an embodiment of the invention.
Figure 25B:
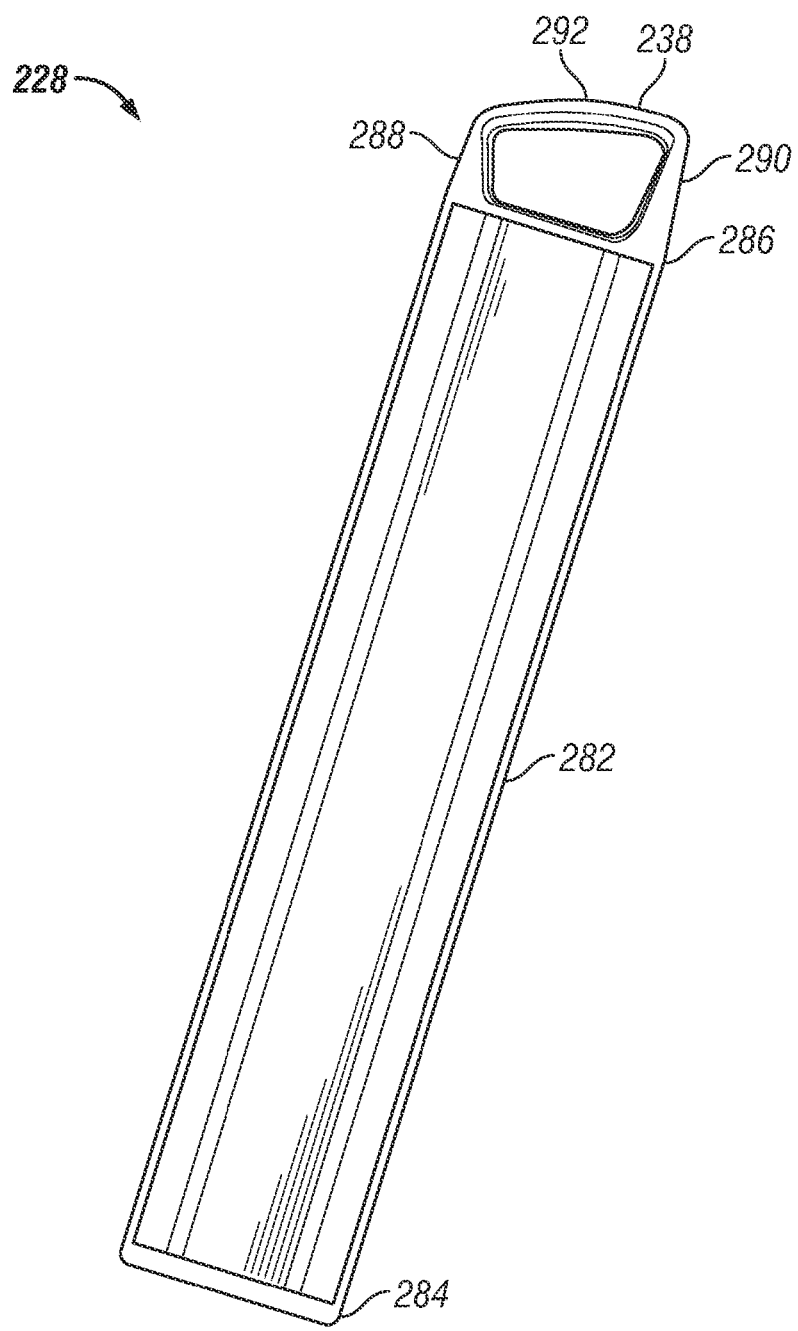
Figure 26:
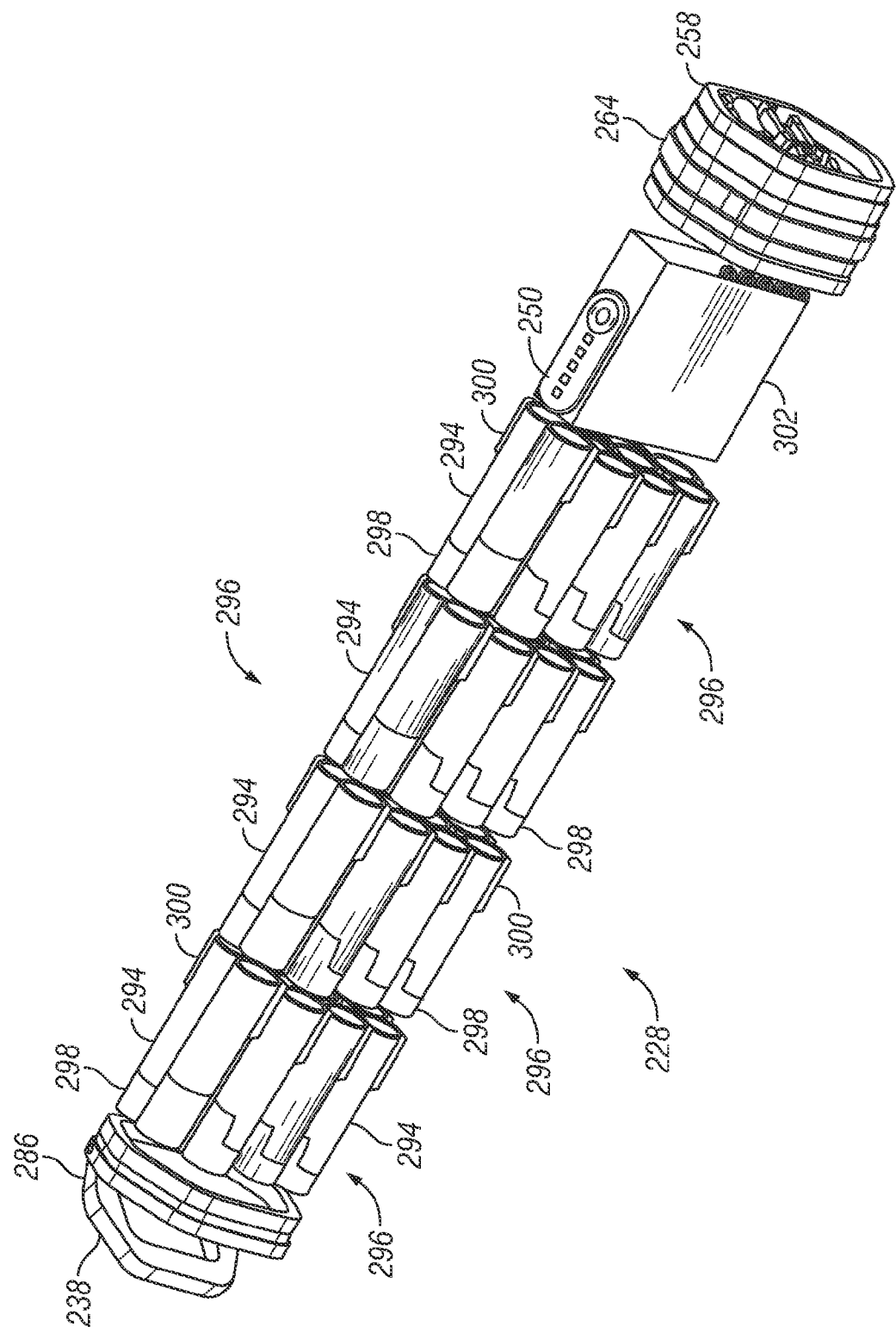
Figure 27:
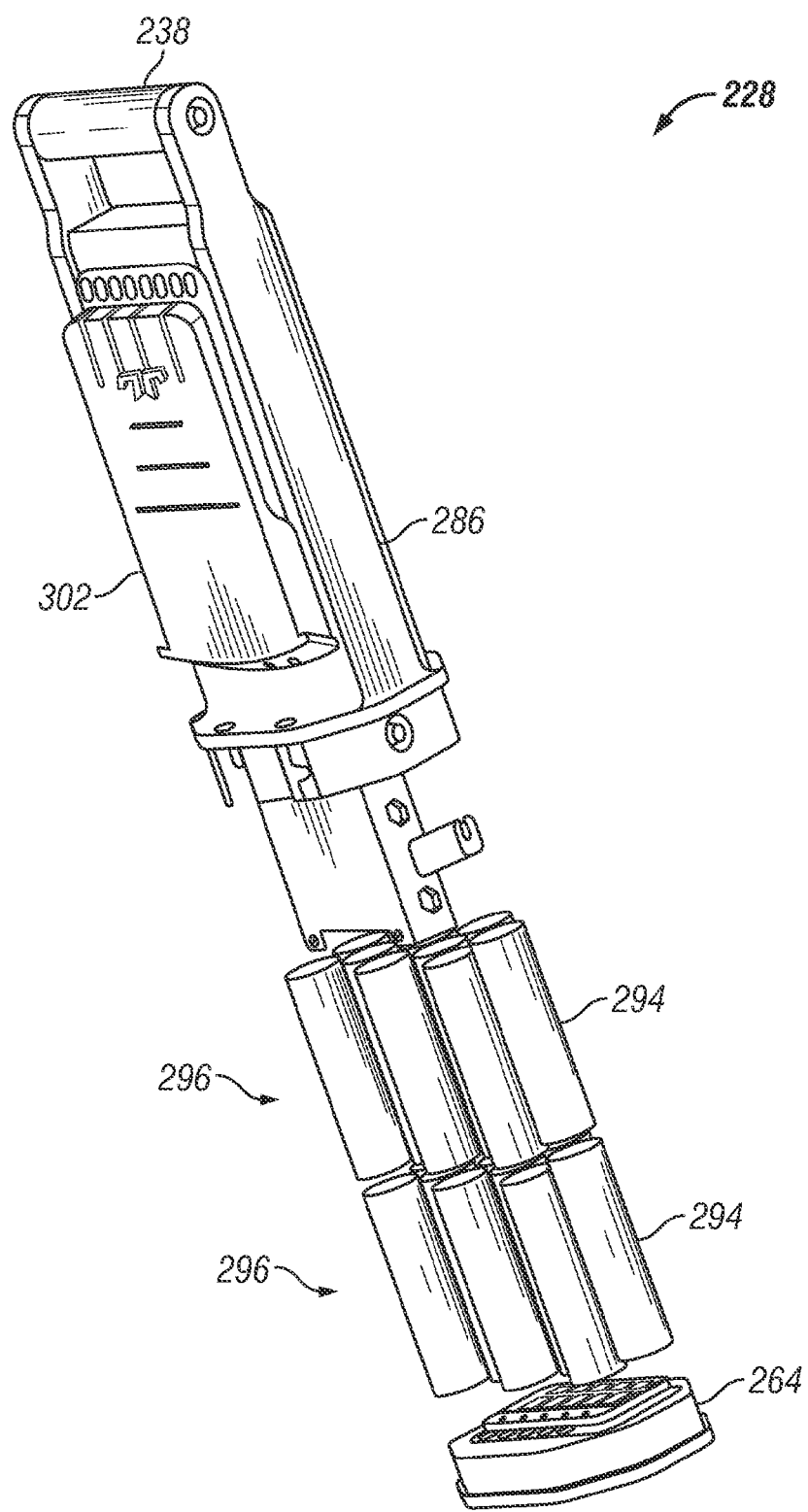
FIG. 27 is a partial perspective view illustration of a battery in accordance with another embodiment of the invention.
Figure 28:
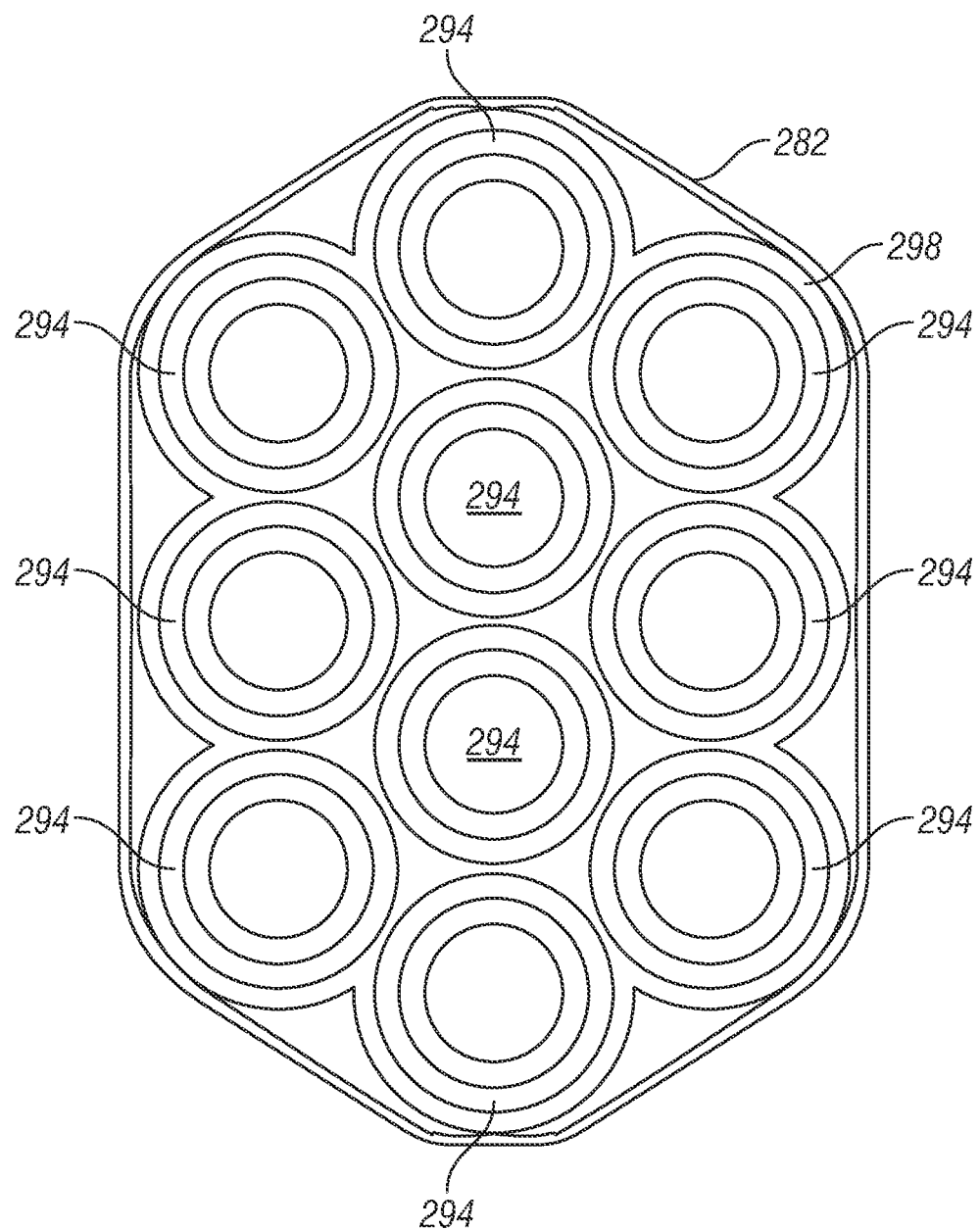
FIG. 28 is a partial top cross sectional view of a 3-4-3 cell arrangement for the battery of FIGS. 25A-26.

Referring now to FIGS. 25-30 embodiments of the battery 228 will be described. An exemplary embodiment of a 40-cell battery 228 is illustrated in FIG. 25, FIG. 26 and FIG. 28. In this embodiment, the battery 228 includes a housing 282 with a terminal cap 284 containing the terminals 264 on one end and a handle cap 286 on an opposite end. The handle 238 is coupled to the handle cap 286. In one embodiment, the handle 238 is coupled to the handle cap 286 by a hinge connection that allows the handle to fold against the handle cap 286 when not in use. In another embodiment shown in FIG. 25B, the handle 238 is integral with the handle cap 286. In this embodiment, the handle 238 includes a first stem 288, a second stem 290 and a handle portion 292. The second stem 290 is longer than the first stem 288 such that the handle portion 292 is angled relative to the top plane of the battery 228. Since the second stem 290 is longer, at least part of handle portion 292 will extend past the end of the top end 240 of the seat tube 132. In one embodiment, the angle of the handle portion 292 is arranged such that the handle portion 292 is parallel with the ground when installed in the seat tube 132.

Mounted within the housing 282, the battery 228 includes a plurality of cells 294. In the exemplary embodiment, the cells 294 are grouped in a set 296 of ten cells. The cells 294 are coupled by a first frame 298 and a second frame 300. In the exemplary embodiment, the frames 298, 300 arrange the cells 294 in a 3-4-3 pattern as shown in FIG. 28. The 3-4-3 pattern allows a stack of four sets 296, providing 40 cells 294 in total, to be arranged serially within the housing 282 with a height that is less than the height of the seat tube 132. In one embodiment, the housing 282 is made from a high modulus unidirectional carbon fiber material. It is expected that 40 cells will provide 45 kilometers of operation on average for bicycle 100. In one embodiment, the bicycle 100 will achieve 5 to 30 kilometers of operation per 100 watt-hours of battery capacity. The operational distance will vary based on a variety of factors, such as but not limited to rider fitness, rider weight, bicycle battery assistance settings, terrain, wind, ambient temperature and battery age for example. In one embodiment the first frame 298 and the second frame 300 include features, such as a rib and a recess or a snap-fit arrangement for example, that cooperate to align a first frame 298 from a first set 296 with a bottom frame 300 on a second set 296.

Adjacent the second set 296 and opposite the handle 238, the battery 228 includes a battery controller 302. The battery controller 302 includes the meter 250 and circuitry for controlling the flow of electrical energy from the cells 294 to the connector 264. The battery controller 302 includes a battery management system that monitors the battery 228 during charge and discharge for temperature and disconnects the cells 294 an over charging condition is detected. The battery management system further performs cell balancing during charging wherein each group of four cells are charged separately to ensure that each of the cells 294 reach a desired voltage. The battery management system may further include functionality to place the batter in a low power setting (e.g. "sleep" mode) to reduce battery discharge and increase the life of the battery 228. In one embodiment, that battery controller 302 communicates with other controllers on the bicycle 100, such as the user interface 126, 178 for example, using a communications protocol such as Controller Area Network ("CAN") bus for example.

Another embodiment of battery 228 is shown in FIG. 27. In this embodiment, the handle cap 286 is elongated to provide a space to mount the battery controller 302 adjacent the handle 238. Arranged opposite the handle 238, two sets 296 of cells 294 are arranged in series. A terminal connector 264 is coupled to the cells 294.

Figure 29:
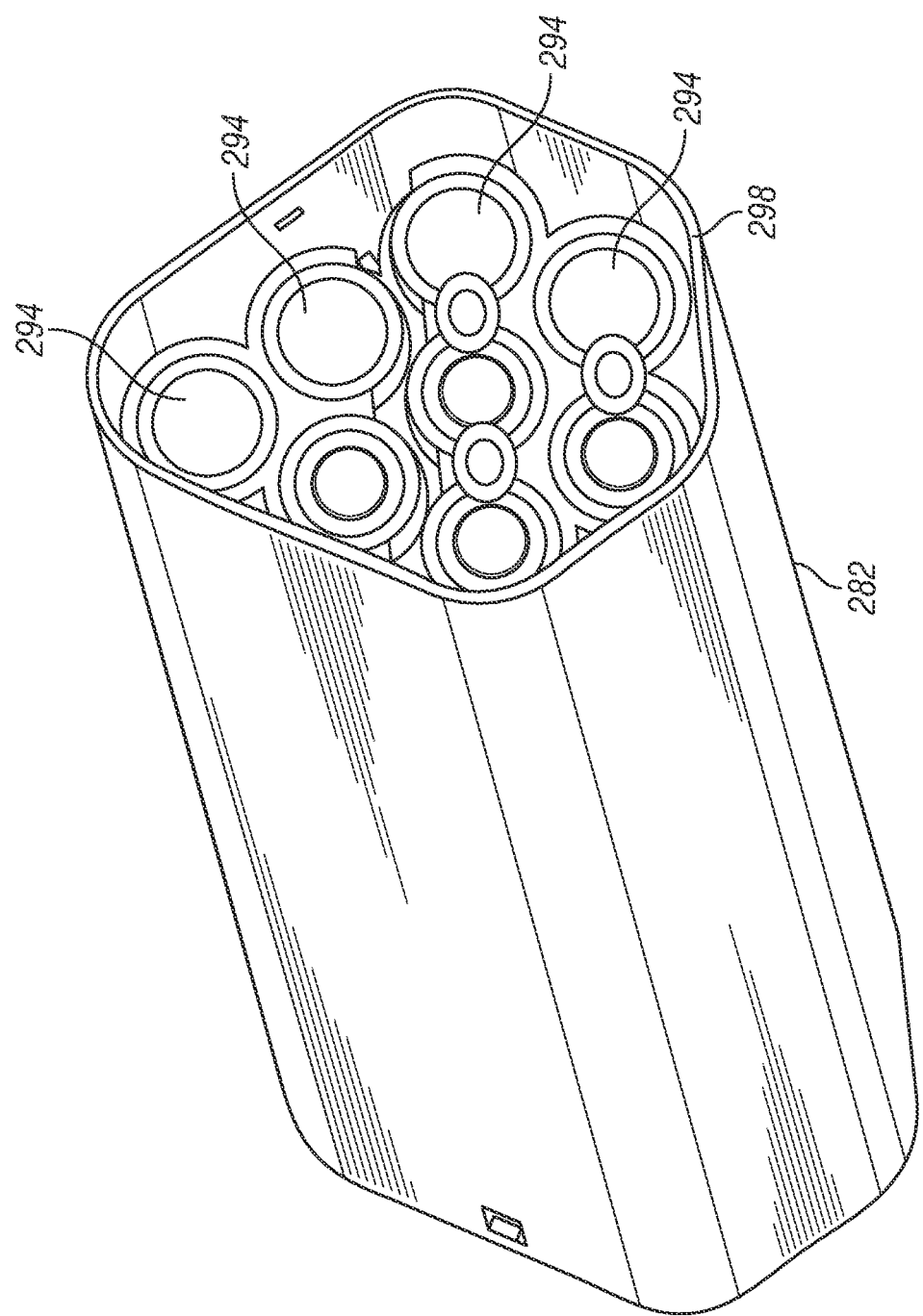
FIGS. 29-30 are partial perspective views of a 3-3-2 cell arrangement in accordance with another embodiment of the invention.
Figure 30:
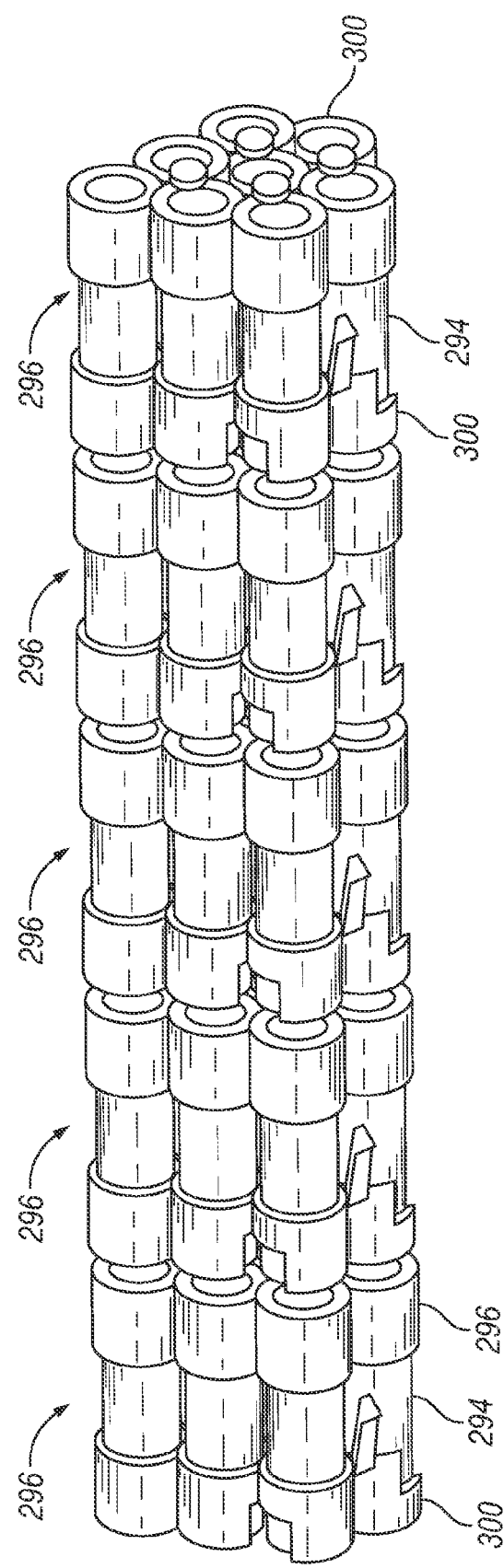

It should be appreciated that the cells 294 may be arranged in different configurations to achieve the forty cell battery. Referring to FIGS. 29-30, an embodiment having a 3-3-2 arrangement is shown. In this embodiment, each set 296 includes eight cells 294. A group of five sets 296 are stacked in series to form the forty cell battery. It should also be appreciated that number of sets and the configurations of the cells 294 may have other arrangements depending on the geometry and size of the frame the battery 228 will be stored and the desired performance.

Figure 31G:
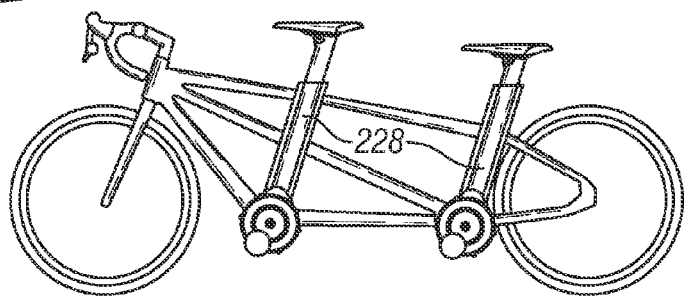

The mounting of the battery 228 within the frame 102 provides a large amount of flexibility and may be adapted to a variety of bicycle 100 styles. In addition to the seat tube 132, the battery 228 may also be configured to be inserted into the down tube 144 as shown in FIG. 31A. The battery 228 may also be adapted to fit within, but not limited to: a ladies style bicycle (FIG. 31B), a men's hard tail bicycle with a rack (FIG. 31C), a full-suspension bicycle (FIG. 31D), a road bicycle (FIG. 31E), a compact city bike/folding bicycle (FIG. 31F), and a tandem bicycle (FIG. 31G).

Figure 31H:
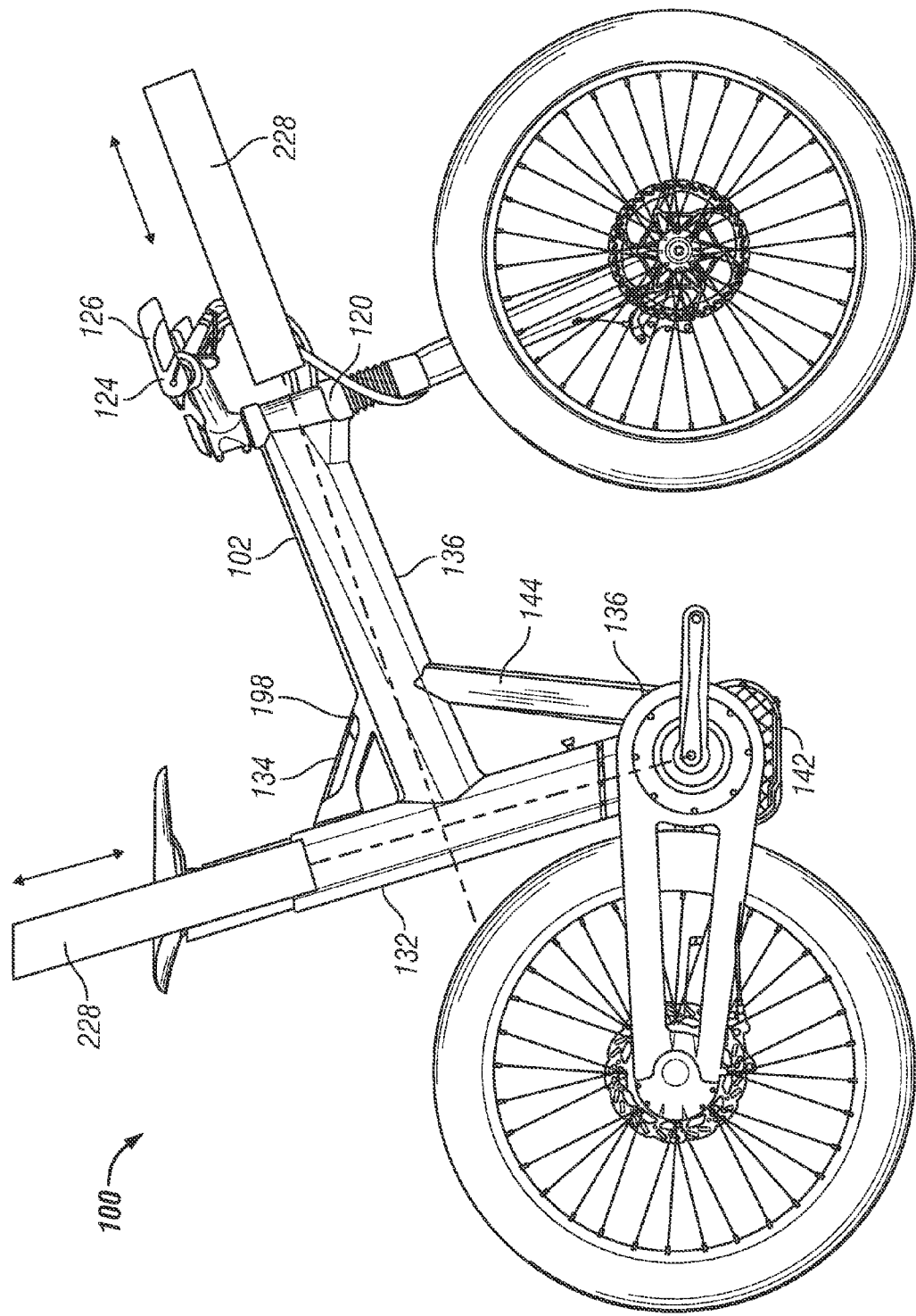

In one embodiment shown in FIGS. 31H-31I, the bicycle 100 has a frame 102 that accommodates two batteries 228. The first battery 228 is positioned within the seat tube 132 and arranged to couple with the motor 142 as described herein. The second battery 228 is positioned within the frame member 136. In one embodiment, the second battery 228 is placed in the frame member 136 for storage. In another embodiment, a connector (not shown) is positioned at the end of the frame member 136 to electrically couple the second battery 228 to the motor 142.

The frame 102 is arranged with the frame member 136 disposed substantially perpendicular to the seat tube 132. This arrangement provides advantages in allowing the second battery 228 to be inserted and removed from the frame member 136 via the head tube 120 without interference from the handle bars 124. This arrangement provides further advantages in that the member 198 may be arranged on desirable angle to provide ergonomically comfortable opening and closing of the seat clamp 134. The member 198 may also be positioned above the center of gravity allowing the member 198 to be used as a handle to facilitate carrying of the bicycle 100. Further advantages are gained in that the angling of the frame member 136 provides a desirable stand over height at location just forward of the seat 130 that allows the rider to comfortably stand while straddling the bicycle frame 102.

The frame 102 may also include a down tube 144 that couples the frame member 136 to the bottom bracket 140. This arrangement of the down tube 144 provides advantages in that the cable from the user interface 126 may be routed to the motor 142 without interfering with the first battery 228 in the seat tube 132.

Figure 32A:
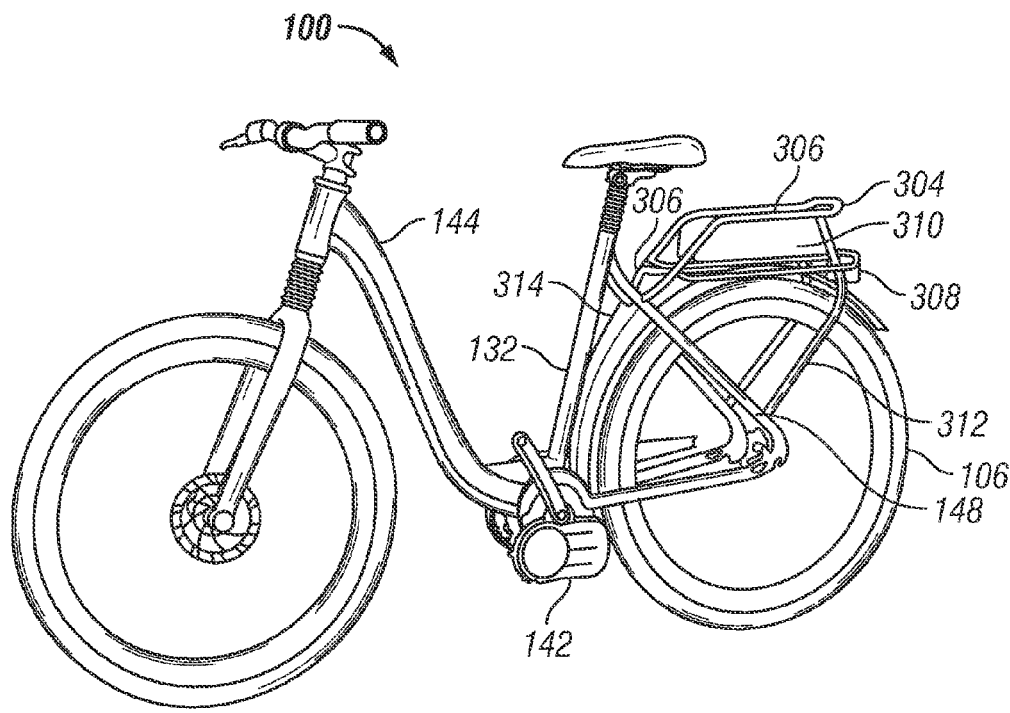
FIGS. 32A-32B are perspective views of a bicycle having a battery mounted on a rack in accordance with an invention.
Figure 32B:
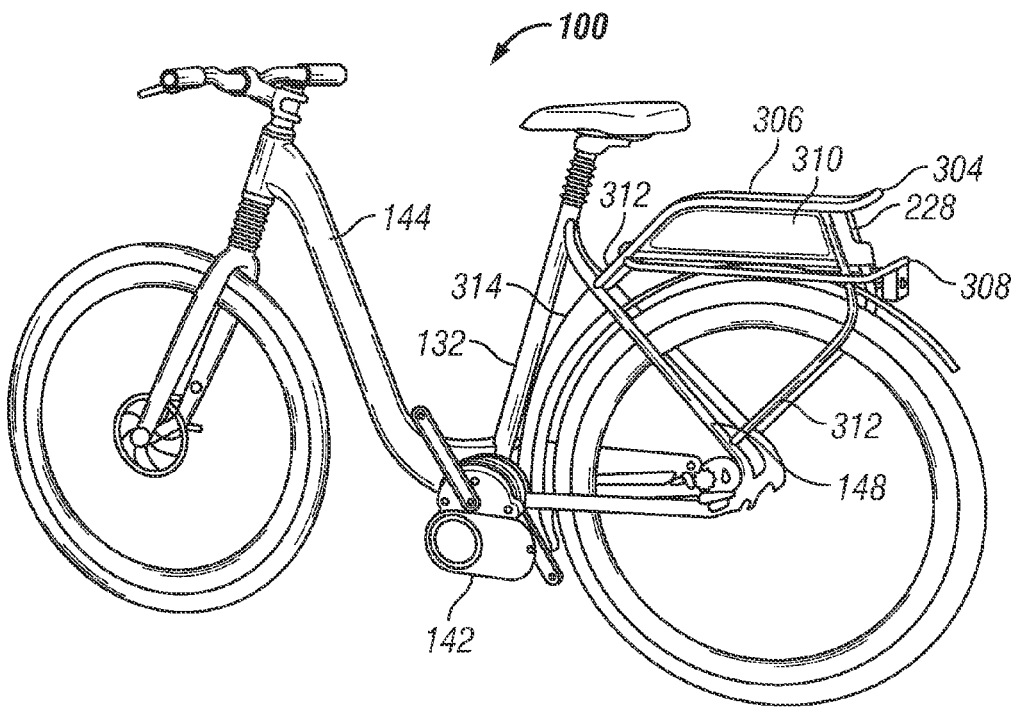

In other embodiments, the battery 228 may be fitted within a rack 304 as illustrated in FIG. 32A and FIG. 32B. In this embodiment, the rack 304 includes an upper frame 306 spaced apart from a lower frame 308. The battery 228 is removable through an opening on one end of the rack 304. The rack 304 may further include a pair of side panels 310 that extend between the upper frame 306 and the lower frame 308. The lower frame 308 is coupled to the upper tube 148 by a pair of legs 312. A curved tube 314 is may be coupled to one of the legs 312 and disposed between the rear wheel 106 and the seat tube 132 to provide a conduit for routing the power conductors from the battery 228 to the motor 142 and a structural mounting element for the rack.

It should be appreciated that a bicycle 100 may be adapted to have multiple batteries, such as in the down tube 144, the seat tube 132 and the rack 304 for example. Where multiple batteries are provided, these batteries may be electrically arranged in series, in parallel or selectively switchable to provide the desired performance.

Figure 33:
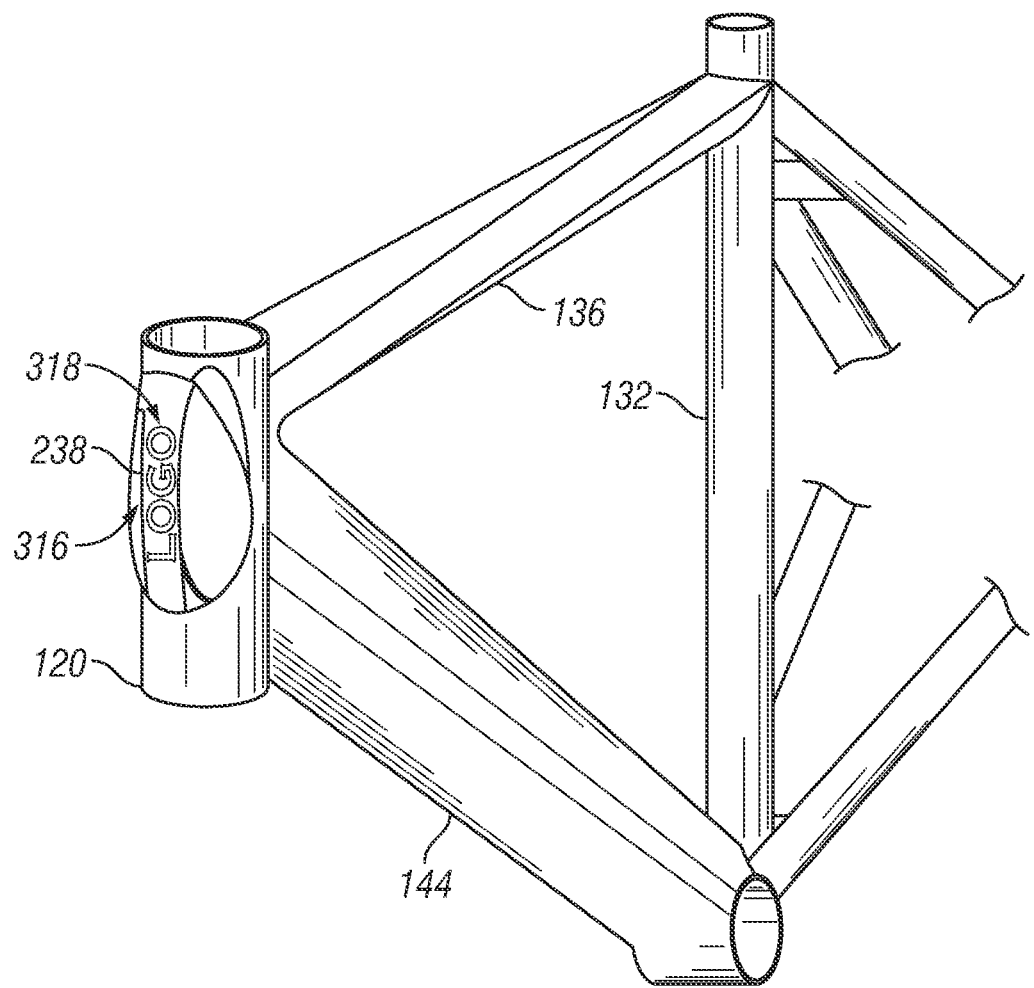
FIG. 33 is a perspective view of a bicycle frame for housing a battery within a down tube in accordance with an embodiment of the invention.
Figure 34A:
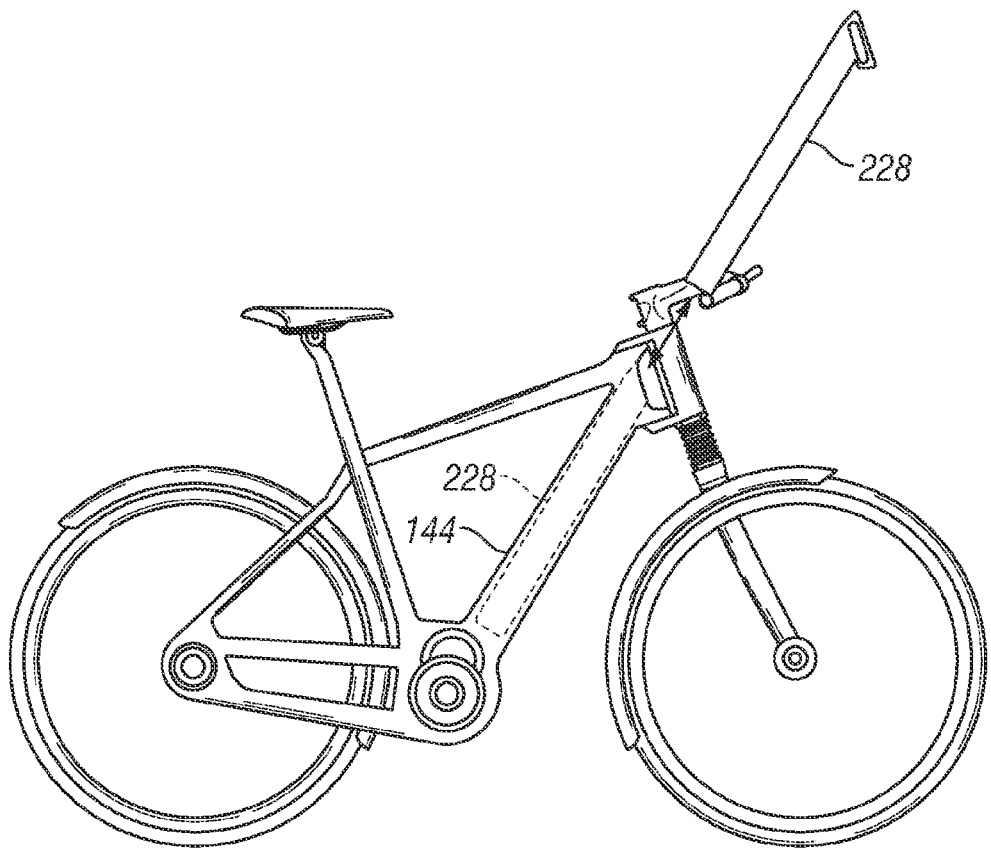
FIGS. 34A-34G illustrate a method of installing and removing a battery from a down tube in accordance with an embodiment of the invention.
Figure 34B:
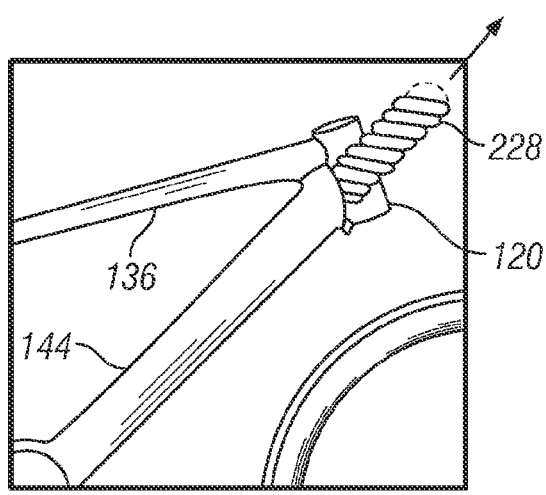
Figure 34C:
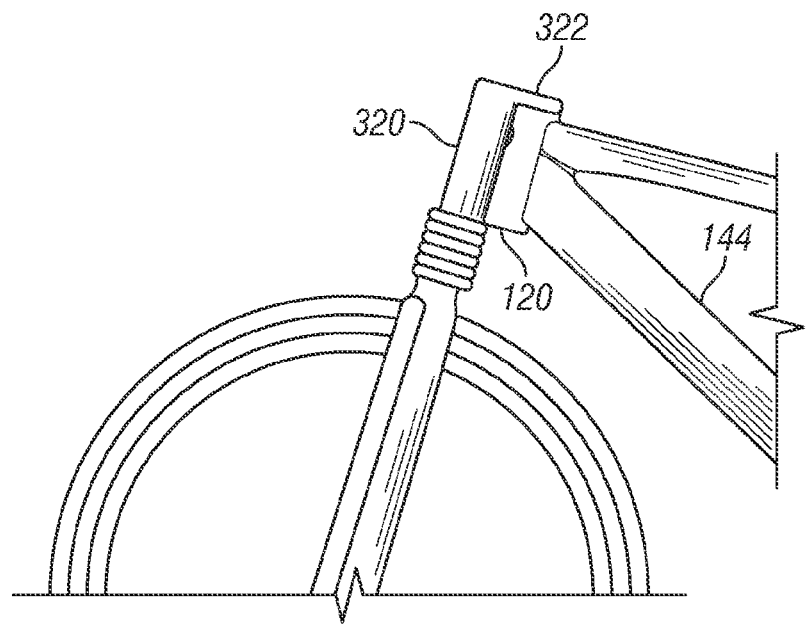
Figure 34D:
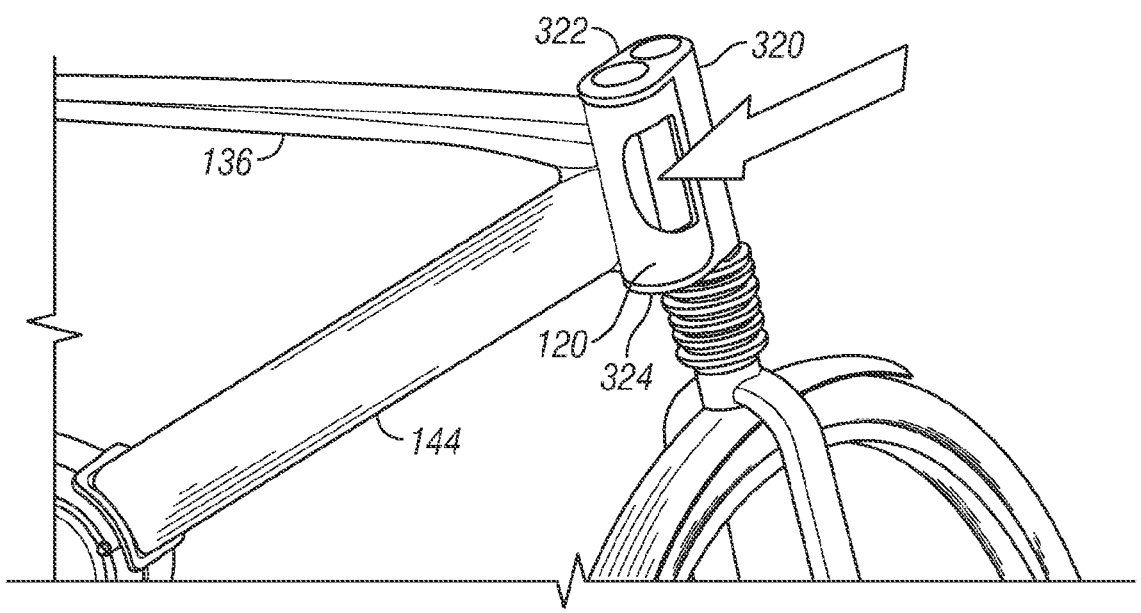

When the battery 228 is arranged in the down tube 144, the head tube 120 may be adapted to allow the insertion and removal of the battery 228 without having to remove any components. In one embodiment shown in FIGS. 33-34, the battery 228 is configured such that the handle 238 is positioned within or adjacent to an opening 316 in the head tube 120. In one embodiment, the handle 238 may include a logo or other graphical representation 318. In one embodiment, the logo 318 includes LED's that illuminate the logo when the bicycle 100 is in operation. The opening 316 is sized to allow the battery 228 to be removed from the down tube 144 as shown in FIG. 34A. In this embodiment, the steerer tube 320 includes a top flange 322 and a bottom flange 324 that couple to the top and bottom of the head tube 120 respectively. When the front wheel 104 is positioned in the typical operating position (e.g. substantially in line with the tube members 136, 144) the opening 316 is covered by the steerer tube 320 as shown in FIG. 34B. When the rider desires to remove the battery 228, the handle bars 124 and the steerer tube 120 are rotated a predetermined angle, such as 90 degrees for example, to expose the opening 316 and allow the battery 228 to be removed. It should be appreciated that the positioning of the battery in the down-tube or seat tube provides advantages in providing a low and centered battery weight distribution for improved bicycle handling.

Figure 34E:
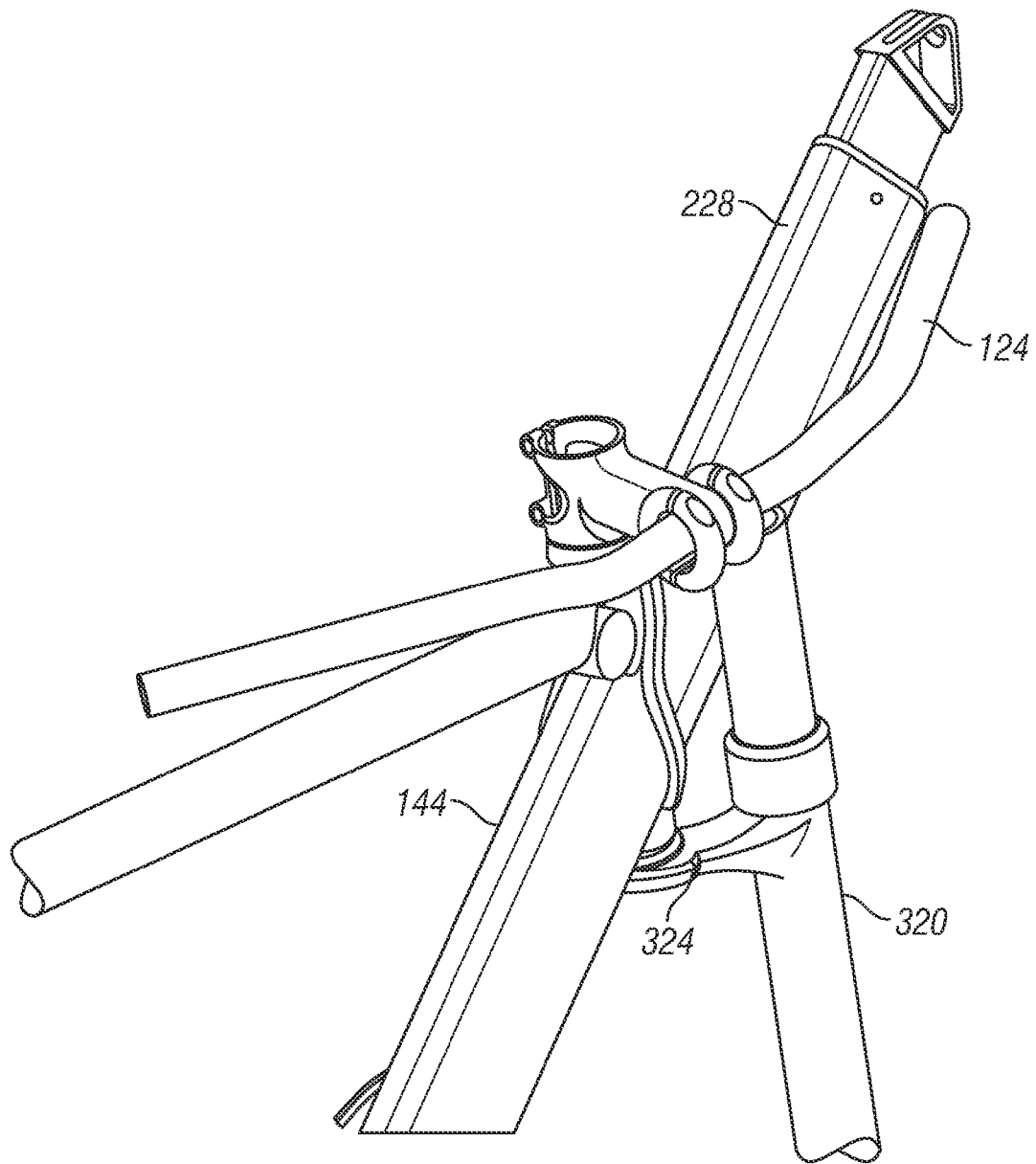
Figure 34F:
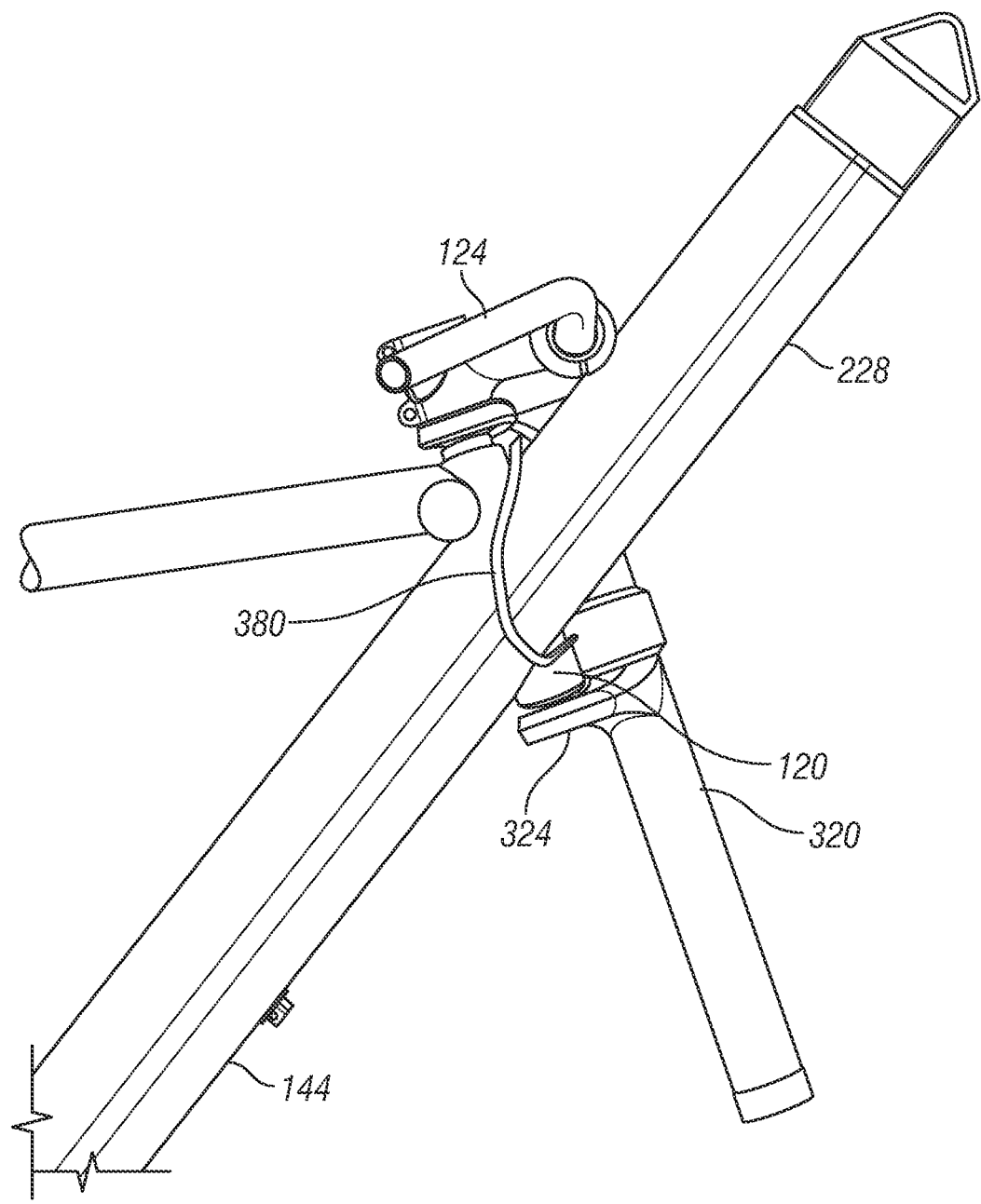
Figure 34G:
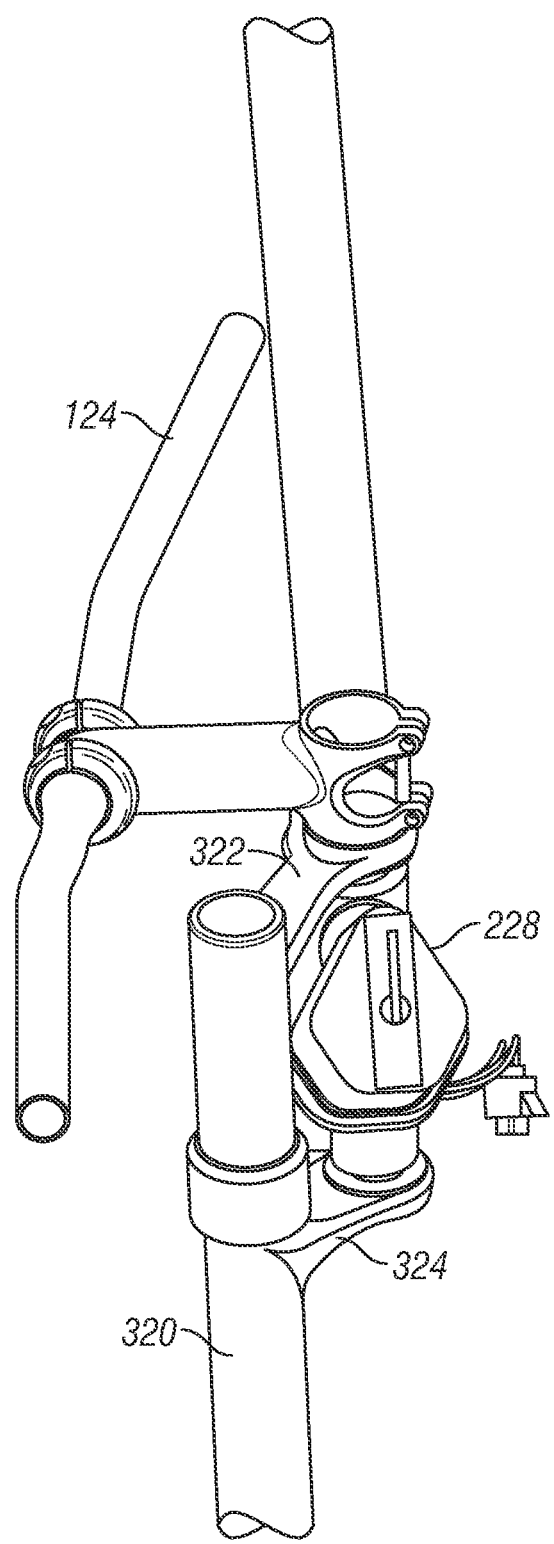

In another embodiment, shown in FIGS. 34E-34G, another arrangement of the head tube 120 is provided that allows for the battery 228 to be removed from the down tube 144. In this embodiment, the handle bar 124 is mounted to the steerer tube 320 by a pair of flanges 322, 324. In this arrangement, the steerer tube 320 is offset from the head tube 120 while the handle bar 124 rotates about the head tube 120. The handle bar 124 is only coupled to the top flange 322 allowing the area within the head tube 120 and down tube 144 to be free from any components or shafts. The offset allows the steerer tube 320 to be rotated to expose an opening 380 in the head tube 120. The opening 380 is an elongated opening that is sized to receive the battery 228. This arrangement provides advantages in allowing the battery 228 to be removed from the down tube 144 without interference from the handle 124.

As described herein, the battery 228 is an energy source for a motor 142 that provides assistance to a rider while they are pedaling. An exemplary embodiment of a crank mounted motor is shown in FIGS. 35-42. It should be appreciated that while embodiments herein describe the electrically assisted bicycle 100 as having a crank mounted motor, the motor 142 may also be a rear hub mounted motor (e.g. directly coupled to the rear wheel 106) or a front hub mounted motor (e.g. directly coupled to the front wheel 104). The motor 142 is coupled to the bottom bracket 140. The motor 142 includes a crank shaft 330 that extends through the motor. The crank shaft 330 is coupled to opposing crank arms 332 when the motor 142 is fully assembled to bicycle 100. The motor 142 applies an assistance force to the crank shaft 330 while the rider is pedaling. The amount of force applied depends on the level of assistance selected by the rider, such as by user interface 178 for example, and the speed at which the bicycle 100 is moving. In the exemplary embodiment, the motor 142 includes clutches (not shown) that provide for free-wheeling of the crank shaft 330 such as when the bicycle moving downhill.

In one embodiment, the bicycle 100 includes a drive unit with sensors, a battery with a charger, and a control computer on the handle bars. The drive unit detects the rider's desire for motor support while pedaling; and the drive system determines the motor output with three sensors for pedaling force, pedaling frequency, and speed of travel. Depending on this sensor data, an integrated controller calculates the force and the electric motor will aid with pedaling. The level of support provided by the motor can then be further configured by selecting one of up to four rider-selected riding programs with the user interface. The result is a high efficiency in the implementation of the rider's desired performance with an improved fluid and useable delivery of power and torque.

Referring now to FIGS. 35-42, the bottom bracket 140 is shown having a semicircular body 326 having a projection 268 extending therefrom. As discussed herein above, the projection 268 is sized and shaped to couple with the seat tube 132. The projection 268 includes a wall 342 that defines an interior space 344. The interior space is substantially sized to receive the terminal connector 258. The interior space is further defined by a surface 346 that includes an opening 348. The opening 348 communicates with a cavity 350. The cavity 350 is defined by web members 352 in a flange portion 334 that extends generally about an inner diameter. The cavity 350 and opening 348 define a space for a conduit member 360 that electrically couples the motor 142 with the terminal connector 258. The flange portion 334 may include further cavities 354 defined by web members 356 to reduce the weight of the bottom bracket 140 while maintaining the desired physical characteristics such as strength for example.

A first plurality of holes 328 are formed in the flange portion 334. The first plurality of holes 328 are configured to cooperate with a corresponding set of mounting holes in the motor 142. In the exemplary embodiment, the motor 142 is mounted to the bottom bracket 140 by a first plurality of bolts 336 that extend through the flange portion 334 and couple with a first plurality of fasteners 338. It should be appreciated that the semi-circular shape of the bottom bracket 140 provides advantages in improving the speed of assembly and lowering weight. However, the claimed invention should not be so limited and the bottom bracket 140 may be cylindrical, with the motor 142 being mounted substantially co-axially for example, or the bottom bracket 140 may be semicircular with the motor 142 mounted above the body 326. A shield member 339 may be mounted to the motor 142 by bolts 341 to protect the motor 142 from environmental contaminants and to cover the bolts 336.

The bottom bracket 140 further includes a plurality of slots 340 that are extend through the ends of body 326. The slots 340 are each sized to receive one of a second plurality of bolts 358 that extend through the bottom bracket 140 and couple to threaded holes in an inner chain-case frame 362. The slots 340 are sized allow adjustment of the chain-case frames 362, 364 to provide tensioning of chain 366. In the exemplary embodiment, there are eight slots 340, each slot 340 being sized to allow 6 millimeters of adjustment. The slots 340 are configured such that when a new chain 366 is installed with the desired tension, the chain-case frames 362, 364 are located 2 millimeters from the end of slot 340 closest to the rear wheel 106 (initial position). When the bolts 358 are moved rearward the 2 millimeters (assembly position), there is sufficient slack in the chain 366 to remove the chain 360 from the front gears 368 and rear gears 370. As the chain 366 stretches and wears with use, the rider may adjust the tension of chain 366 by moving the bolts 358 away from the rear wheel 106. When the bolts 358 have been moved 4 millimeters from the initial position (0.75% elongation), the rider will know the chain 366 has reached the end of its useful life and should be replaced. It should be appreciated that while embodiments herein describe the chain tensioning with respect to slots 340, the claimed invention should not be so limited, the chain case and bottom bracket may be coupled by dovetails, square channels, keyed slots, holes, or external bolts on a flange for example.

The inner chain-case frame 362 couples and forms a substantially rigid connection between the front section 116 and the rear wheel 106. The front gears 368 are positioned over the crank shaft 330 and is coupled to the motor 142 by a locking fastener. The chain 366 connects the front gears 368 with the rear gears 370. In the exemplary embodiment, the chain 366 has 92 links and the front gears 368 is a single 34 tooth gear and the rear gears 370 is a single 18 tooth gear that are spaced apart 420.5 millimeters center-to-center. In another embodiment, the chain 366 has 94 links and the front gear 368 is a 37 tooth gear and the rear gears 370 is a 18 tooth gear that are spaced apart 419.5 millimeters center to center.

The outer chain-case frame 364 couples to the inner chain-case frame 362 enclosing the chain 366 and protecting the rider's legs and clothing from debris. In the exemplary embodiment, the outer chain-case frame 364 is epoxy bonded to the inner chain-case frame 362. In one embodiment, a liner 374 is positioned about the inner surface 376 of the inner chain-case frame 362. The liner 374 is made from a soft material, such a loop portion adhesively backed hook and loop tape for example. The liner 374 provides advantages in minimizing or eliminating chain rattle during operation. A bottom bracket cover 372 couples to the outer chain-case cover 364 by fasteners to protect the front gears 368 and chain 366 from environmental contaminants such as water for example. Finally, the crank arm 332 is coupled to the crank shaft 330 by a fastener (not shown) to hold the assembly together.

While certain combinations of features relating to a bicycle have been described herein, it will be appreciated that these certain combinations are for illustration purposes only and that any combination of any of these features may be employed, explicitly or equivalently, either individually or in combination with any other of the features disclosed herein, in any combination, and all in accordance with an embodiment of the invention. Any and all such combinations are contemplated herein and are considered within the scope of the invention disclosed.

As disclosed, some embodiments of the invention may include some of the following advantages: a battery housed within the seat tube or down tube of the frame; a locking arrangement to inhibit theft of the battery, arrangements with multiple batteries that may be electrically coupled to provide increased capacity or power; a seat post clamp integrated into the frame; a chain tensioning integrated into a chain-case frame that provides an indication to the rider when the chain needs to be replaced; a head tube arrangement that allows removal of the battery from the down tube without removing the steerer tube; and a handle bar having an integrated connector to power accessories without external wiring.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A bicycle comprising:
a frame having a seat tube and a bottom bracket coupled to one end of the seat tube, the seat tube having an opening on an end opposite the bottom bracket;
a pedal crank shaft operably coupled to the bottom bracket;
a motor coupled to the bottom bracket and operably coupled to the pedal crank shaft;
a first battery removably coupled to the frame and electrically coupled to the motor; and
a seat having a seat post removably coupled to the seat tube, wherein the first battery is disposed to remain coupled to the frame when the seat post is removed;
wherein the first battery is removably disposed within the opening and within at least a portion of the seat post when the seat post is arranged in the seat tube.

2. The bicycle of claim 1 wherein:
the frame further includes a down tube member having one end coupled to a head tube and a second end coupled to the bottom bracket; and,
a second battery is removably coupled to the down tube member.

3. The bicycle of claim 1 wherein:
the frame further includes a down tube member having one end coupled to a head tube and a second end coupled to the seat tube; and,
a second battery is removably disposed within the down tube member, the second battery being removable through the head tube opposite the down tube member.

4. The bicycle of claim 1 further comprising:
a down tube member having an end coupled to the bottom bracket; and,
a second battery electrically coupled to the motor, the second battery being disposed at least partially within the down tube member.

5. The bicycle of claim 3 further comprising:
a rack arranged adjacent the seat and above a rear wheel; and,
a third battery coupled to the rack and electrically coupled to the motor, wherein the first battery, the second battery and the third battery are configured so that they may be coupled in parallel with each other, in series with each other, or selectively switchable between the first battery, the second battery and the third battery.

6. The bicycle of claim 1 further comprising:
a down tube member having an end coupled to the seat tube, and arranged substantially perpendicular to the seat tube; and,
a second battery electrically coupled to the motor, the second battery being disposed at least partially within the down tube member.

7. The bicycle of claim 1 further comprising a sleeve at least partially disposed in the opening between the seat tube and the battery, wherein at least a portion of the seat post is disposed within the sleeve.

8. A bicycle comprising:
a frame having a seat tube and a bottom bracket coupled to one end of the seat tube;
a pedal crank shaft operably coupled to the bottom bracket;
a motor coupled to the bottom bracket and operably coupled to the pedal crank shaft;
a battery removably coupled to the frame and electrically coupled to the motor;

a seat having a seat post removably coupled to the seat tube, wherein the battery is disposed to remain coupled to the frame when the seat post is removed, wherein the battery is removably disposed at least partially within the seat tube and at least a portion of the seat post is disposed between at least a portion of the seat tube and the battery;

a first pair of clamp pads disposed between the seat post and the seat tube and being positioned on a side of the seat tube;

a clamp pad member disposed adjacent the seat post opposite the first pair of clamp pads; and, a clamp operably coupled to the frame and the clamp pad member, wherein the clamp is adapted to be movable between an engaged and a disengaged position, wherein the engaged position causes the seat post and the seat tube to be clamped and non-movable with respect to each other, and wherein the disengaged position causes the seat post and the seat tube to be unclamped and movable with respect to each other.

9. A bicycle comprising:
a frame having a seat tube and a bottom bracket coupled to one end of the seat tube;
a pedal crank shaft operably coupled to the bottom bracket;
a motor coupled to the bottom bracket and operably coupled to the pedal crank shaft;
a battery removably disposed within the seat tube and electrically coupled to the motor;
a sleeve at least partially disposed in the seat tube, the battery extending through the sleeve;
a seat having a seat post, at least a portion of the seat post being slidably disposed within the sleeve and between the seat tube and the battery, wherein the battery is at least partially disposed within the seat tube.

10. The bicycle of claim 9 wherein the seat is offset from a centerline of the seat post.

11. The bicycle of claim 10 wherein the seat is offset from the centerline a distance equal to 30% of the width of the seat post.

12. The bicycle of claim 9 wherein the sleeve is made from a low friction material.

13. The bicycle of claim 12 wherein the sleeve includes a flange on one end, the flange engaging one end of the seat tube.

14. The bicycle of claim 13 further comprising:
the frame further having a down tube member with one end adjacent the bottom bracket; and,
a second battery removably and slidably disposed within the down tube member.

15. A bicycle comprising:
a frame having a seat tube, a bottom bracket coupled to one end of the seat tube, and a first frame member coupled to the seat tube;
a seat post at least partially disposed within the seat tube adjacent the first frame member;
a pair of first clamp pad members disposed between the seat post and the seat tube and being positioned substantially opposite the first frame member;
a second clamp pad member disposed adjacent the seat post opposite the pair of first clamp pad members, the second clamp pad member being movable between a first position and a second position; and,
a clamp operably coupled to the frame and the second clamp pad member, wherein the clamp is movable between an engaged and a disengaged position.

16. The bicycle of claim 15 wherein:
the clamp is positioned at least partially within the first frame member, the first frame member including a recess; and,
the clamp includes a handle portion arranged within the recess, the handle portion having an outer surface that is substantially contiguous with a surface of the first frame member.

17. The bicycle of claim 15 further comprising a pair of third clamp pad members disposed between the seat post and the seat tube and positioned adjacent the pair of first clamp pad members.

18. The bicycle of claim 15 wherein the pair of first clamp pad members are positioned adjacent a line defined by a force applied by the clamp on the seat post.

19. The bicycle of claim 15 further comprising a locking member coupled to the clamp, the locking member being movable between a locked position and an unlocked position, wherein the clamp is secured in the engaged position when the locking member is in the locked position.

20. A bicycle comprising
a frame comprising:
a seat tube;
a bottom bracket coupled to one end of the seat tube;
a frame member;
a pedal crank shaft operably coupled to the bottom bracket;
a seat having a seat post removably coupled to the seat tube; and
a battery removably disposed within the seat tube, the seat post being disposed about the battery when the seat post is coupled to the seat tube, wherein the battery is configured to stay within the seat tube when the seat post is removed.

21. The bicycle of claim 20 further comprising:
a motor coupled to the bottom bracket and operably coupled to the pedal crank shaft; and,
wherein the battery is electrically coupled to the motor.

22. The bicycle of claim 21 further comprising a second frame member coupled between the frame member and the and the seat post opposite the bottom bracket, the seat post, the frame member and the second frame member defining an opening.

23. The bicycle of claim 20 further comprising a seat clamp coupled to the second frame member, the seat clamp configured to secure the seat post and the battery to the seat tube.

24. The bicycle of claim 20 wherein the frame further comprises a down tube member coupled between the frame member and the bottom bracket.

* * * * *